(12) United States Patent
Choi et al.

(10) Patent No.: US 12,057,805 B2
(45) Date of Patent: Aug. 6, 2024

(54) LOUVER ASSEMBLY CAPABLE OF HAVING MOUNTED THEREON SOLAR CELL PANEL

(71) Applicant: LX Hausys, Ltd., Seoul (KR)

(72) Inventors: Chul Jun Choi, Gangseo-gu Seoul (KR); Jong Tae Kim, Gangseo-gu Seoul (KR)

(73) Assignee: LX HAUSYS, LTD., Seoul (KR)

(*) Notice: Subject to any disclaimer, the term of this patent is extended or adjusted under 35 U.S.C. 154(b) by 127 days.

(21) Appl. No.: 17/785,549

(22) PCT Filed: Dec. 16, 2020

(86) PCT No.: PCT/KR2020/018389
§ 371 (c)(1),
(2) Date: Jun. 15, 2022

(87) PCT Pub. No.: WO2021/125760
PCT Pub. Date: Jun. 24, 2021

(65) Prior Publication Data
US 2023/0016140 A1    Jan. 19, 2023

(30) Foreign Application Priority Data

Dec. 16, 2019  (KR) .................. 10-2019-0168305
Dec. 14, 2020  (KR) .................. 10-2020-0174290
Dec. 14, 2020  (KR) .................. 10-2020-0174292

(51) Int. Cl.
*H02S 40/34*    (2014.01)
*H02S 30/10*    (2014.01)
*H02S 40/22*    (2014.01)

(52) U.S. Cl.
CPC .............. *H02S 40/34* (2014.12); *H02S 30/10* (2014.12); *H02S 40/22* (2014.12)

(58) Field of Classification Search
CPC ........... H02S 40/34; H02S 40/32; H02S 30/10
See application file for complete search history.

(56) References Cited

U.S. PATENT DOCUMENTS

2014/0360561 A1* 12/2014 Meyer .................. F24S 25/13
                                                      136/251
2019/0048656 A1   2/2019 Combee
2019/0252565 A1*  8/2019 Lyons .................... H02S 20/22

FOREIGN PATENT DOCUMENTS

KR    10-2011-0022958 A    3/2011
KR    10-2016-0045458 A    4/2016
(Continued)

OTHER PUBLICATIONS

Int'l Search Report issued Mar. 5, 2021 in Int'l Application No. PCT/KR2020/018389.

*Primary Examiner* — Jayne L Mershon
(74) *Attorney, Agent, or Firm* — Panitch Schwarze Belisario & Nadel LLP

(57) ABSTRACT

A solar cell louver assembly includes: a plurality of solar cell module units having a solar cell panel part, with a pair of terminal portions provided on both end parts, a pair of first electrode terminals electrically connected to the respective terminal portions, and a pair of first caps mounted on the solar cell panel part to surround the respective first electrode terminals; second electrode terminals electrically connected to the first electrode terminals, and second caps accommodating the second electrode terminals and having mounted thereon the first caps; a frame unit having an inner frame such that the second caps are mounted rotatably in the length direction, and an outer frame surrounding the inner frame; and a connector unit between the inner and outer frames and having a pair of third electrode terminals electrically connecting the second electrode terminals of adjacent module units when mounted in the frame unit.

29 Claims, 44 Drawing Sheets

(56) References Cited

FOREIGN PATENT DOCUMENTS

| KR | 10-2019-0089497 A | | 7/2019 |
|---|---|---|---|
| KR | 10-1958432 B1 | | 7/2019 |
| KR | 10195843 | * | 7/2019 |

* cited by examiner

[FIG. 1]
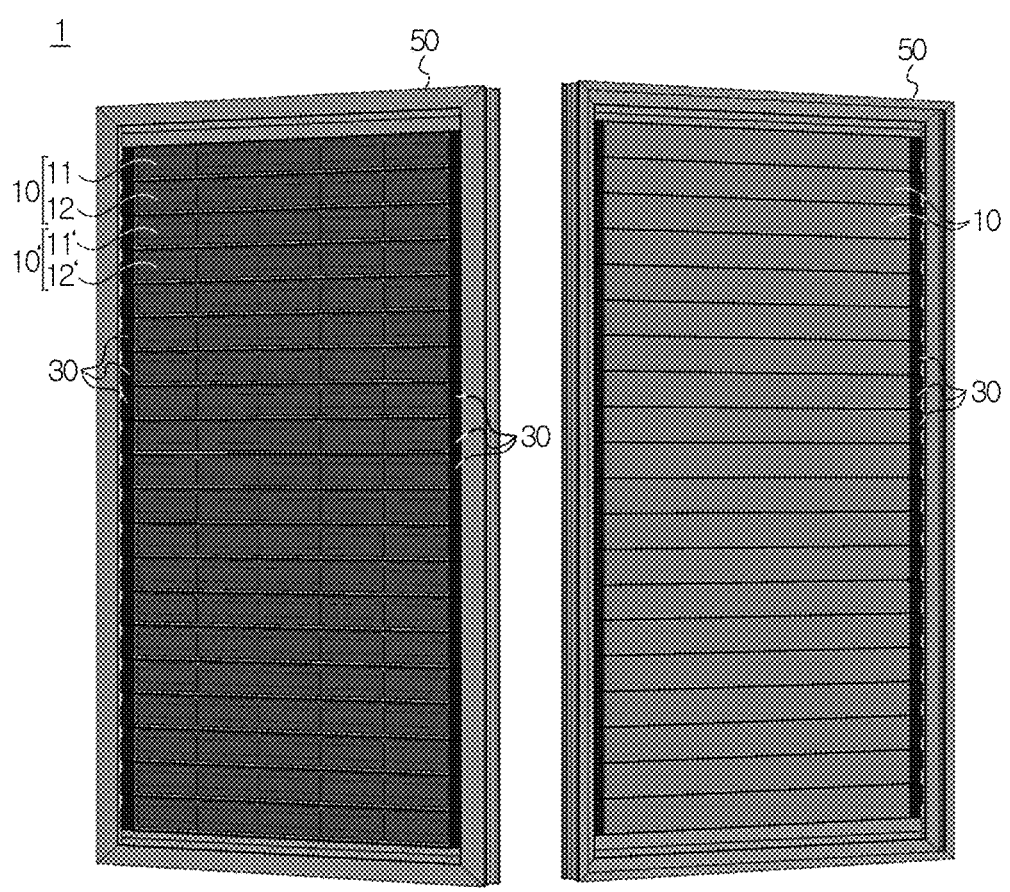

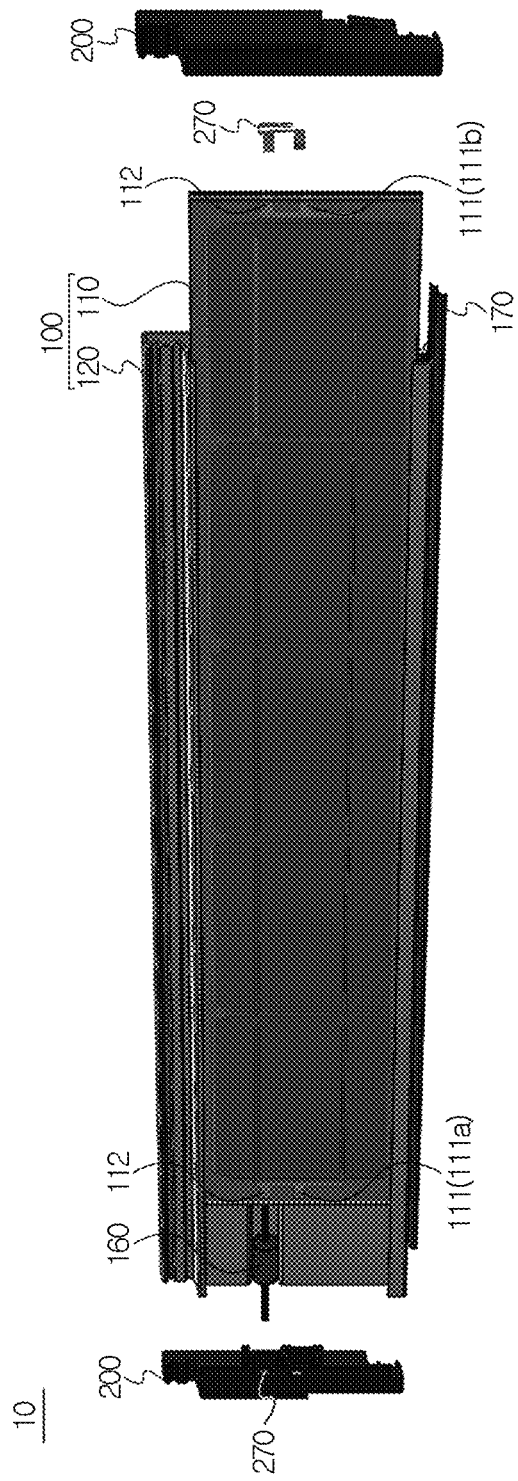
[FIG. 2]

[FIG. 3]
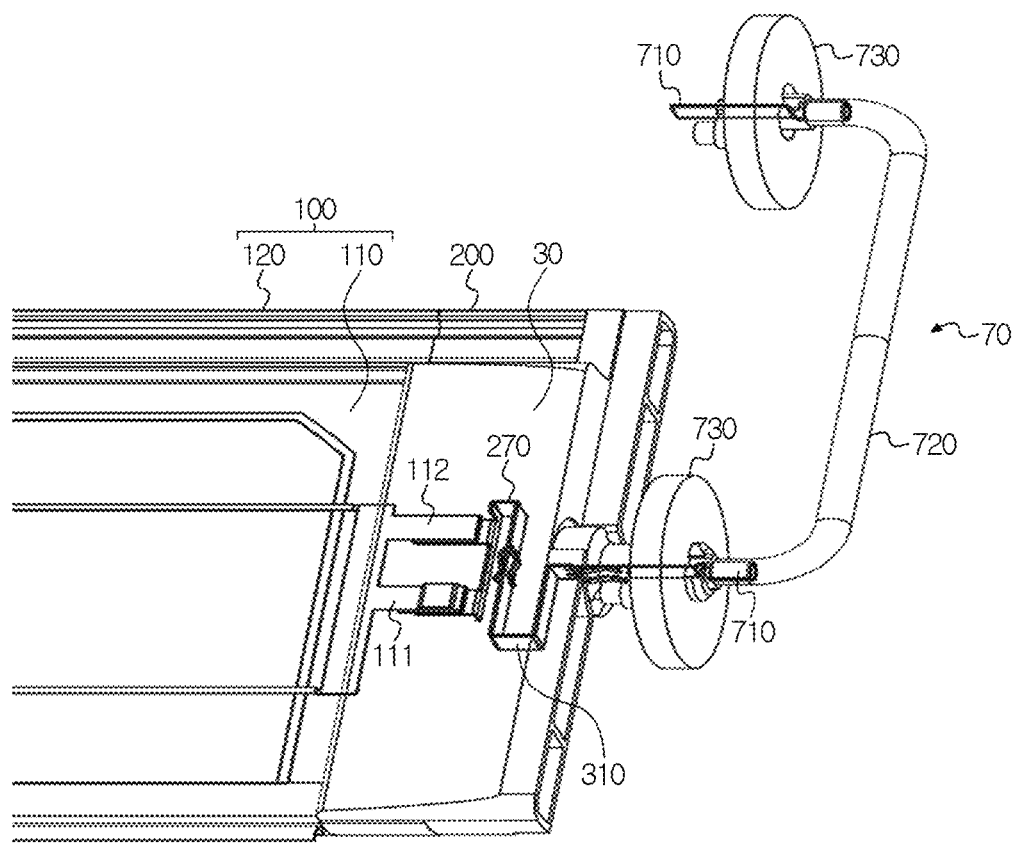
[FIG. 4]
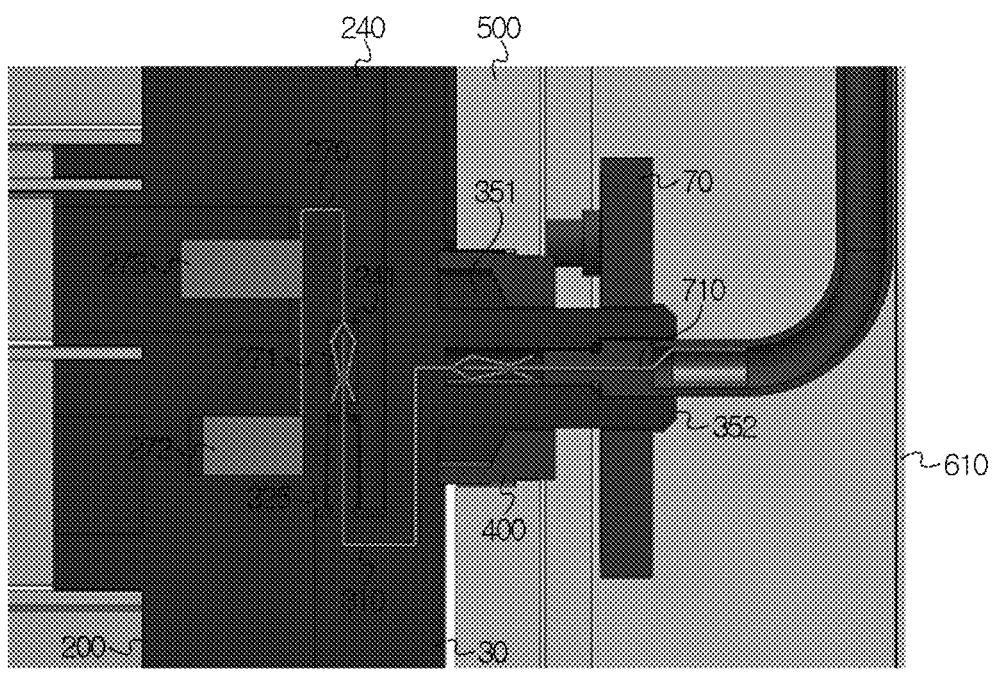

[FIG. 5]
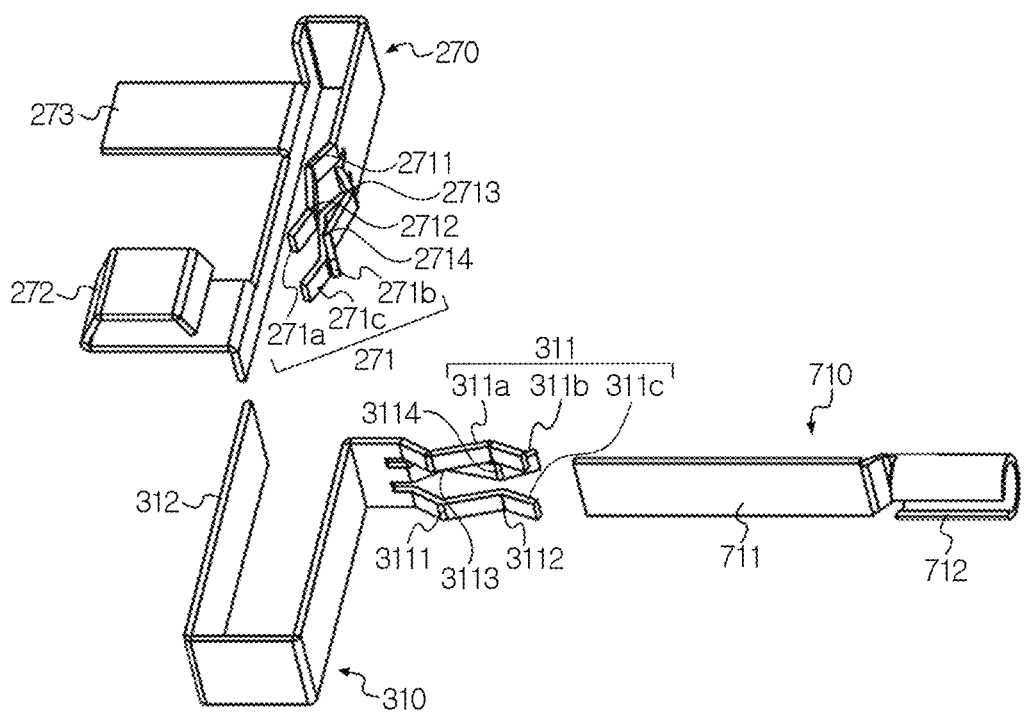

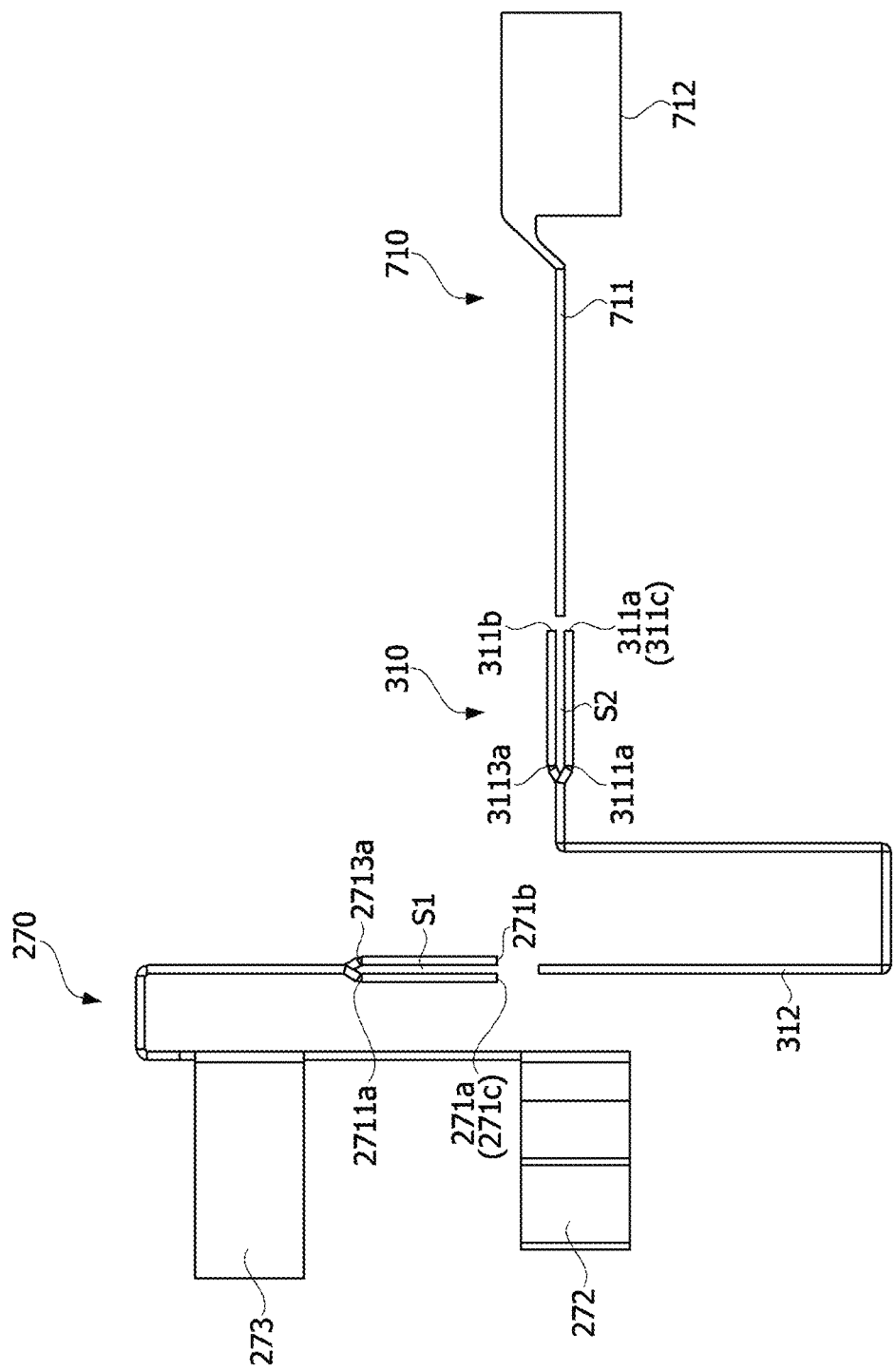
[FIG. 6]

[FIG. 7]
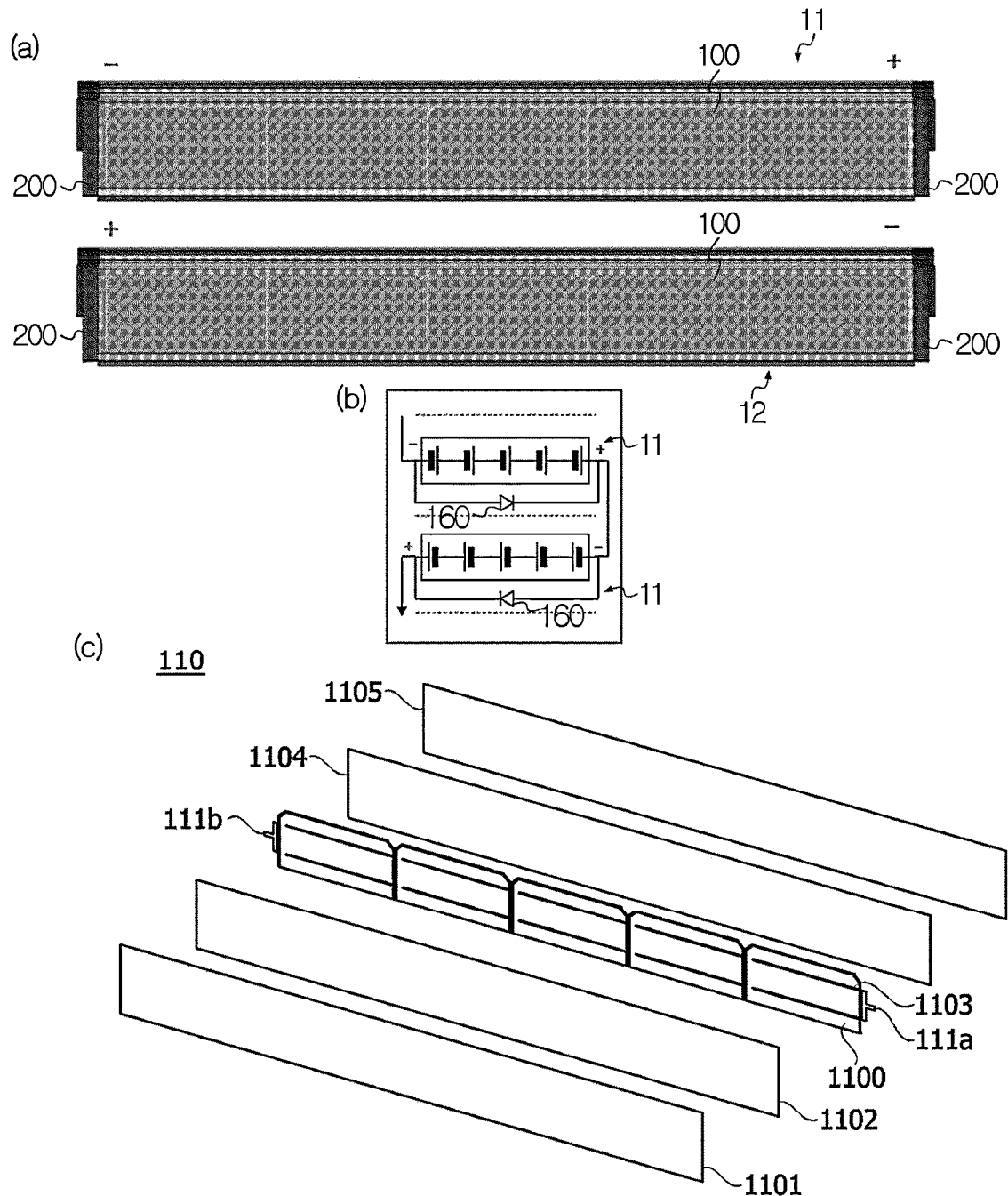

[FIG. 8]
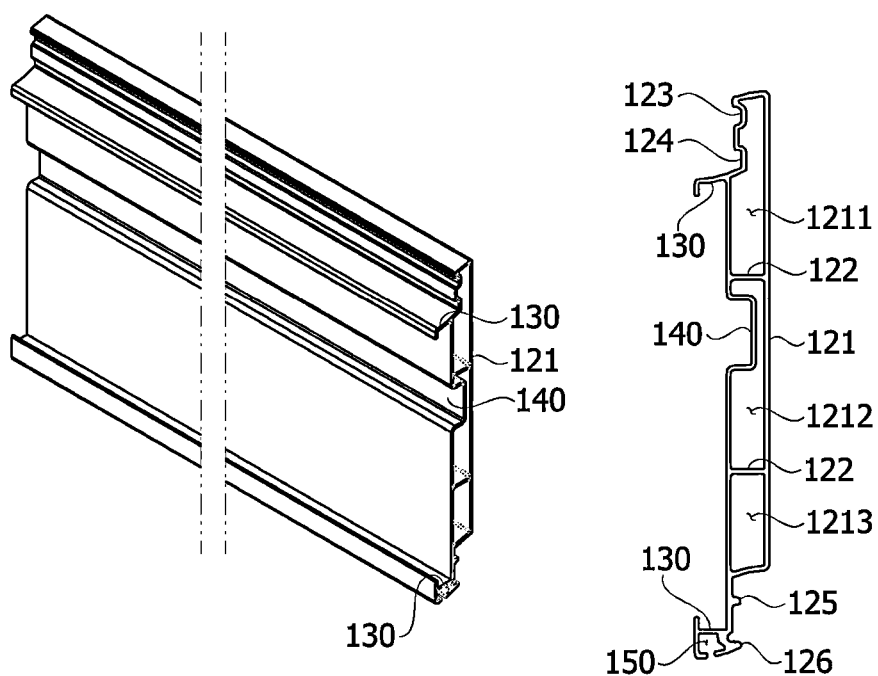

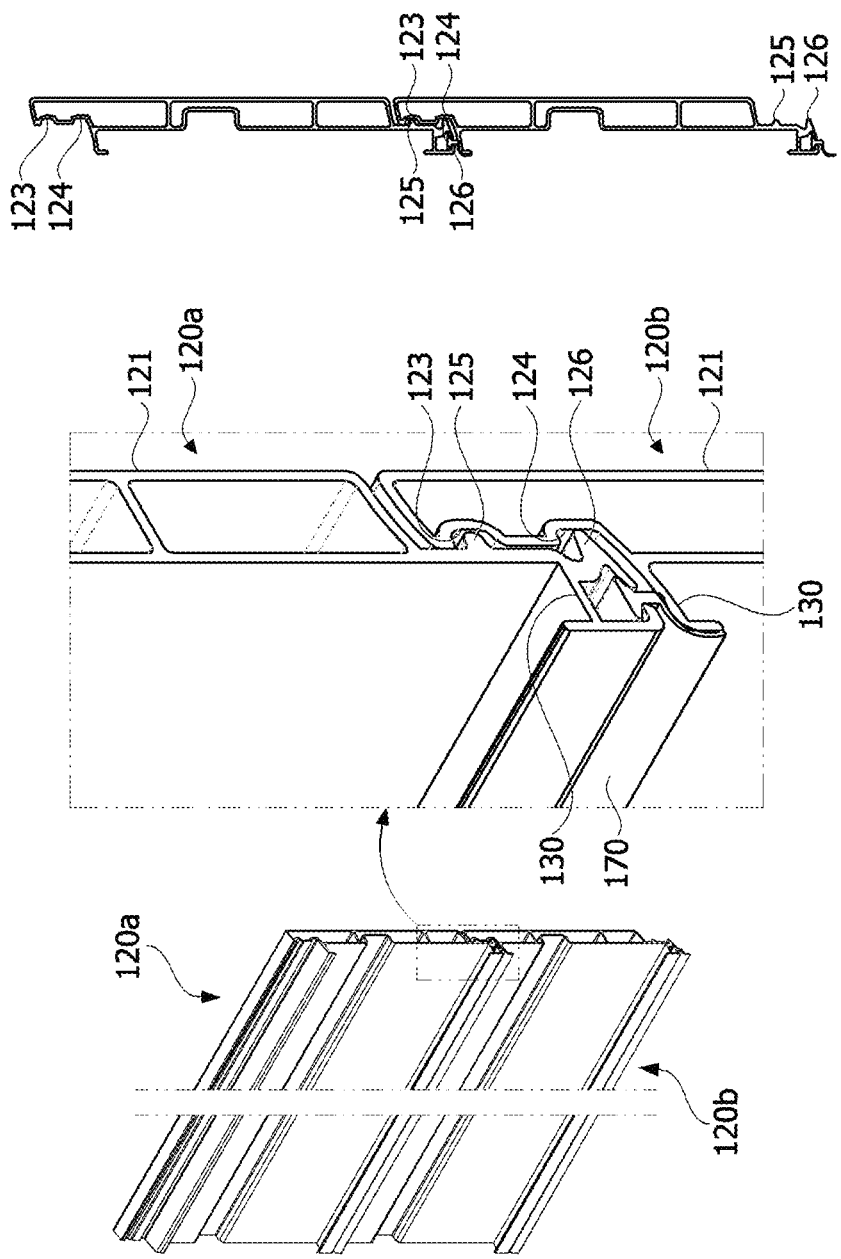
[FIG. 9]

[FIG. 10]
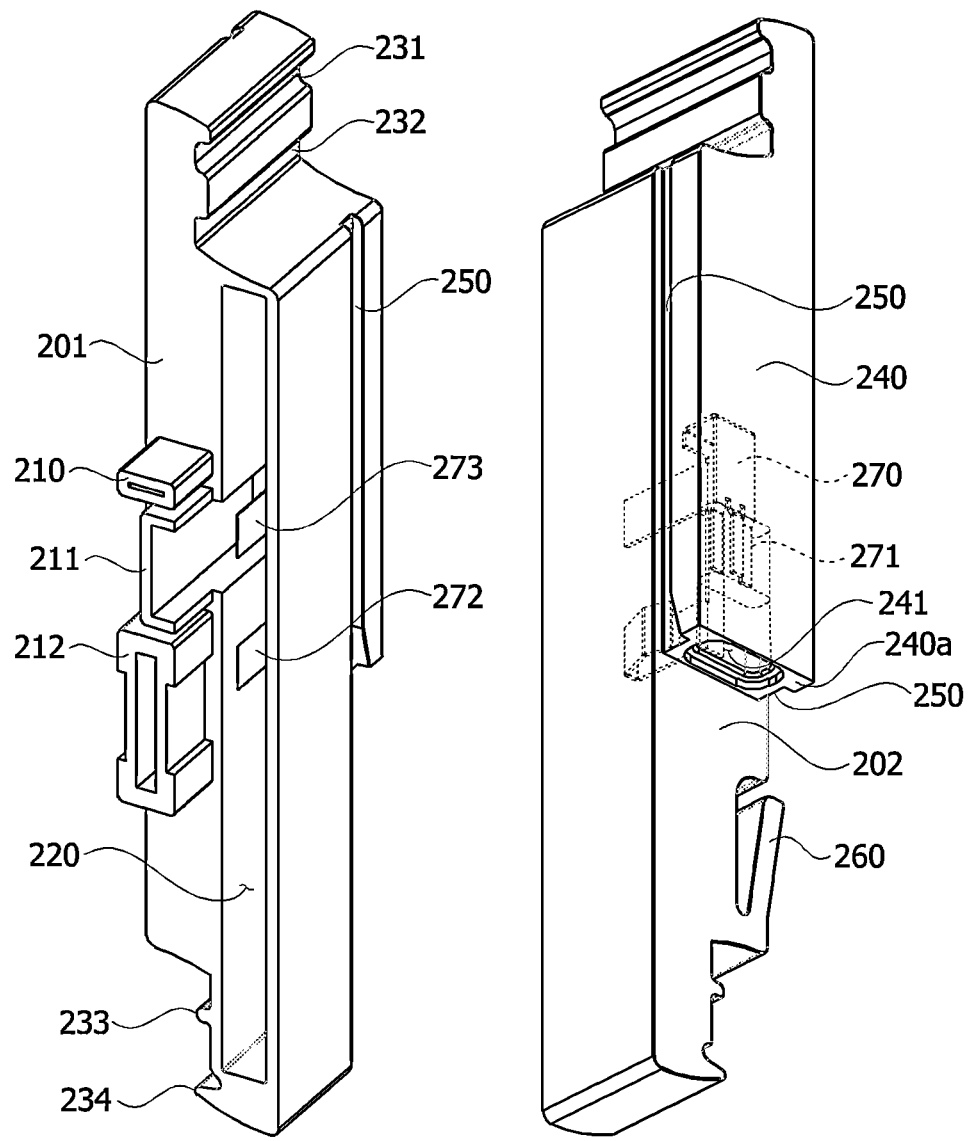

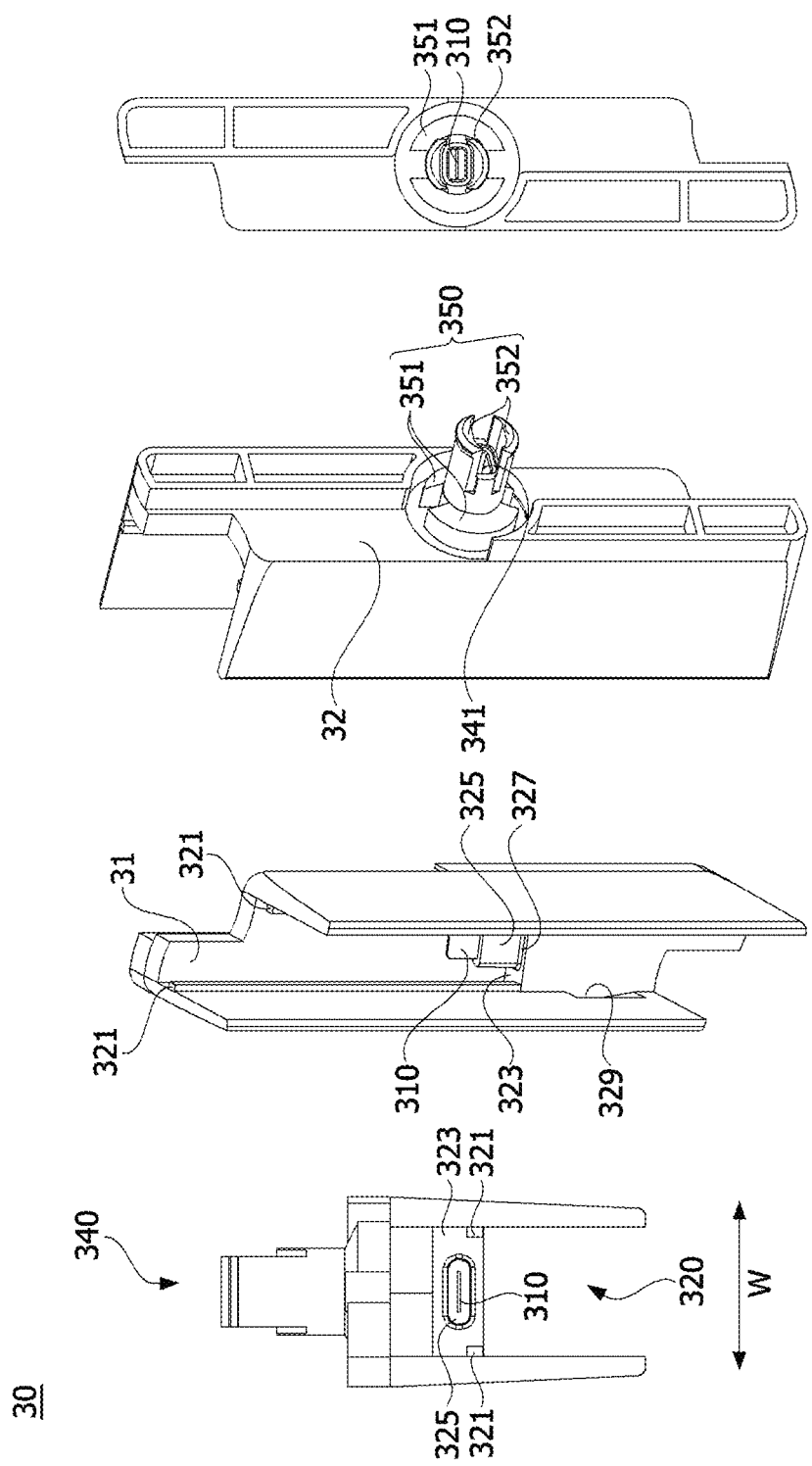
[FIG. 11]

[FIG. 12]
400
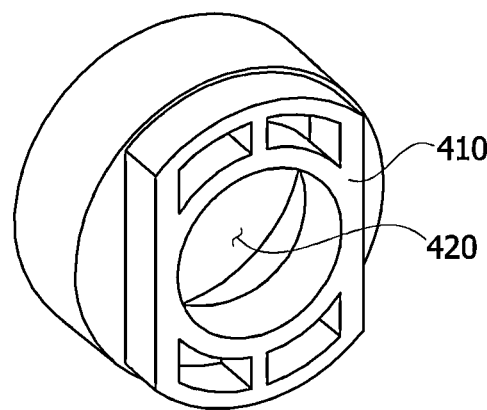
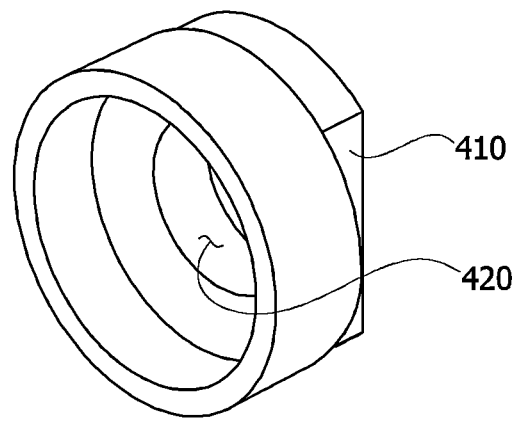

[FIG. 13]
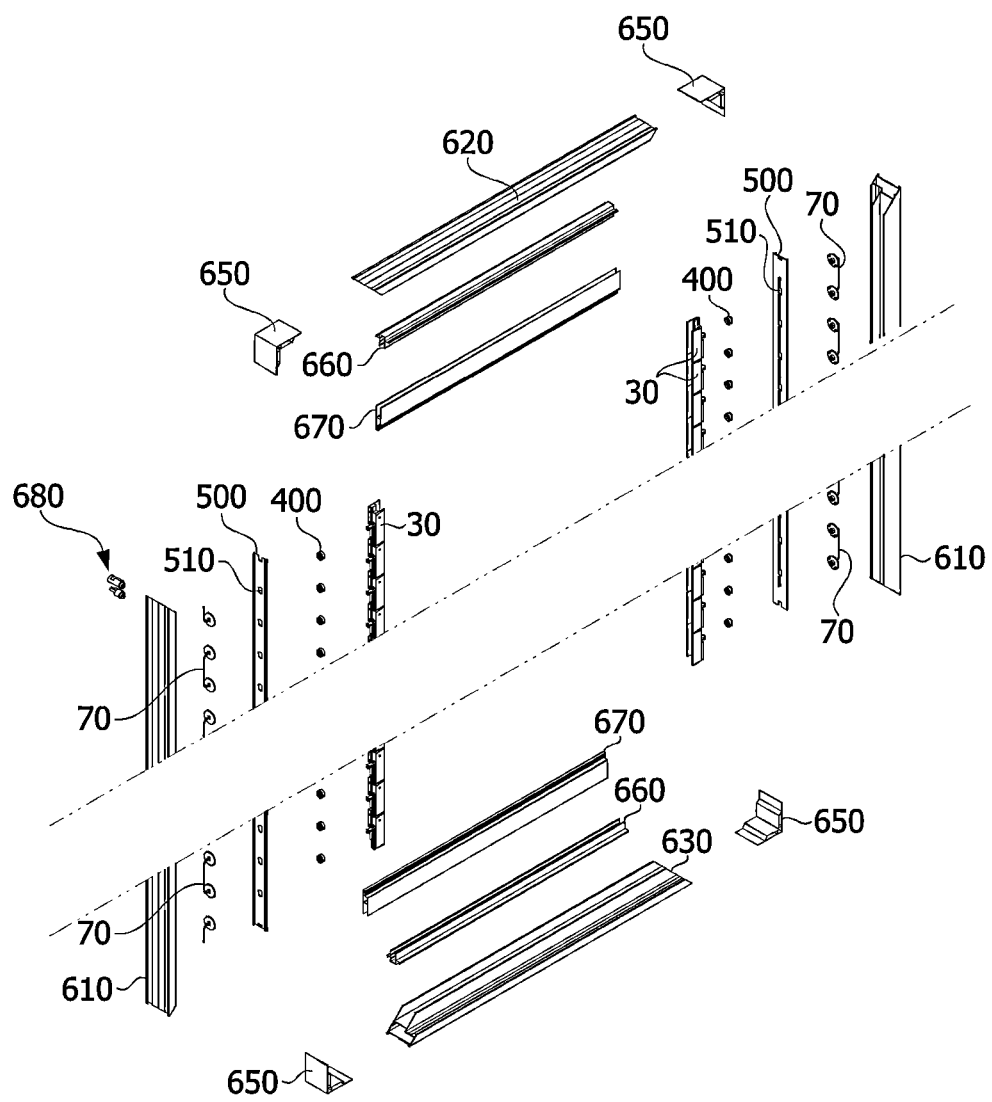

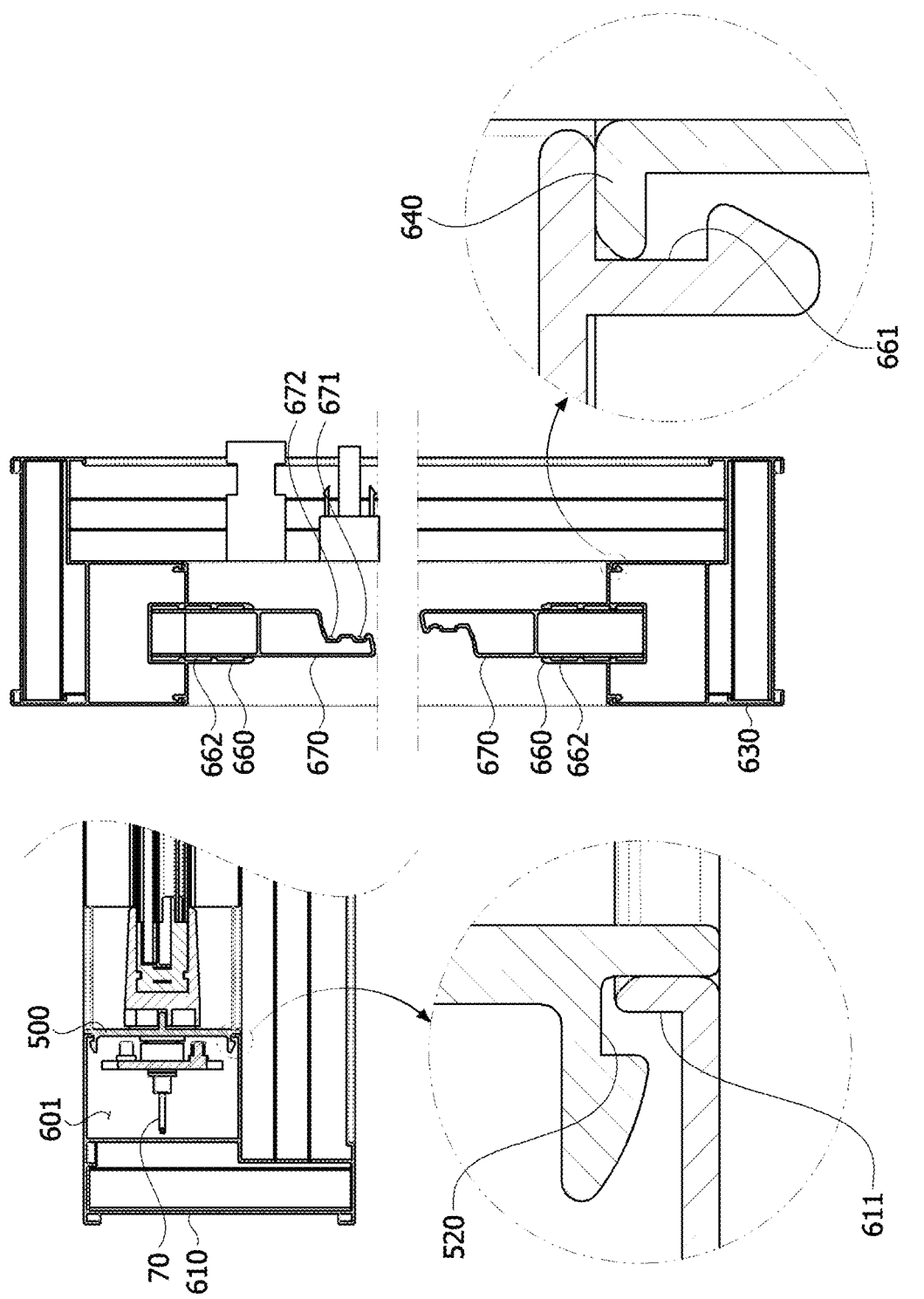

[FIG. 15]
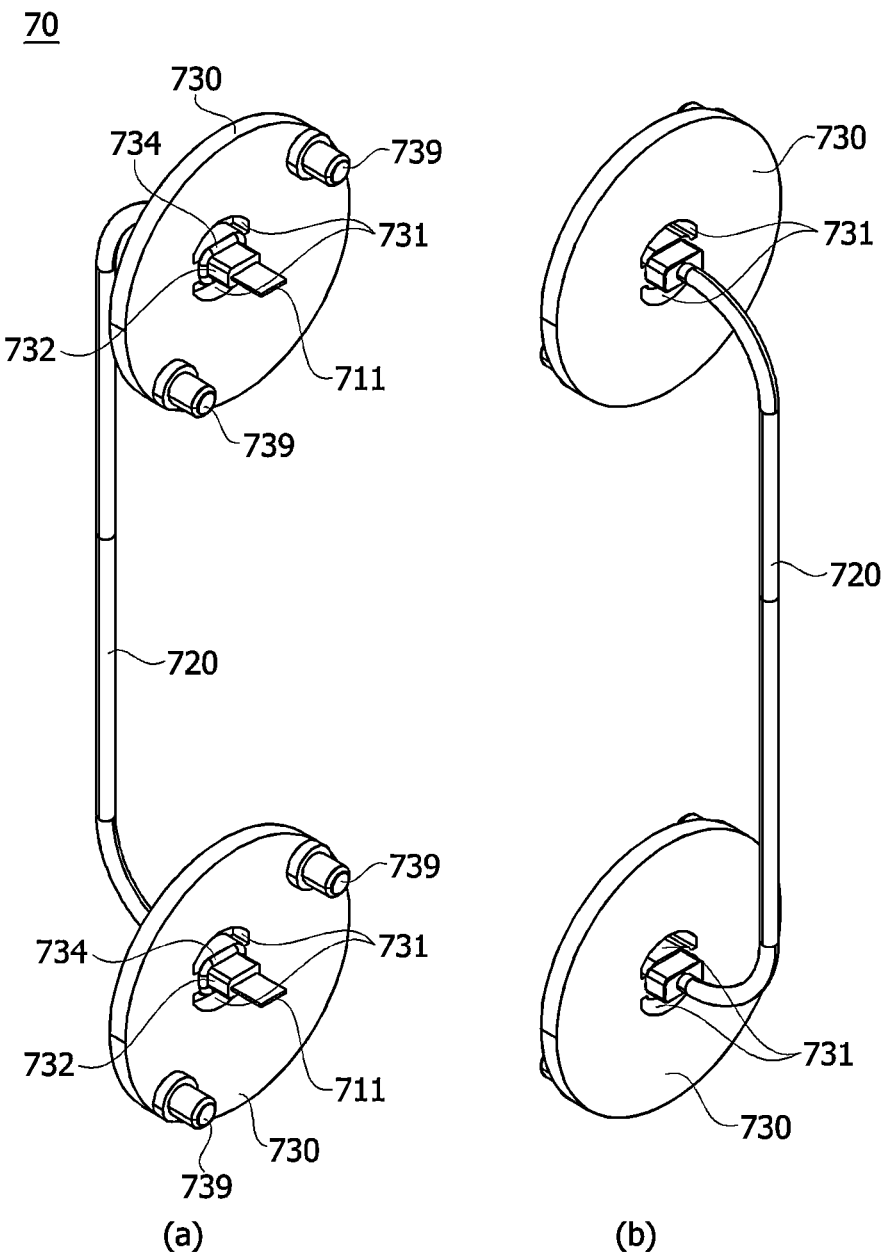

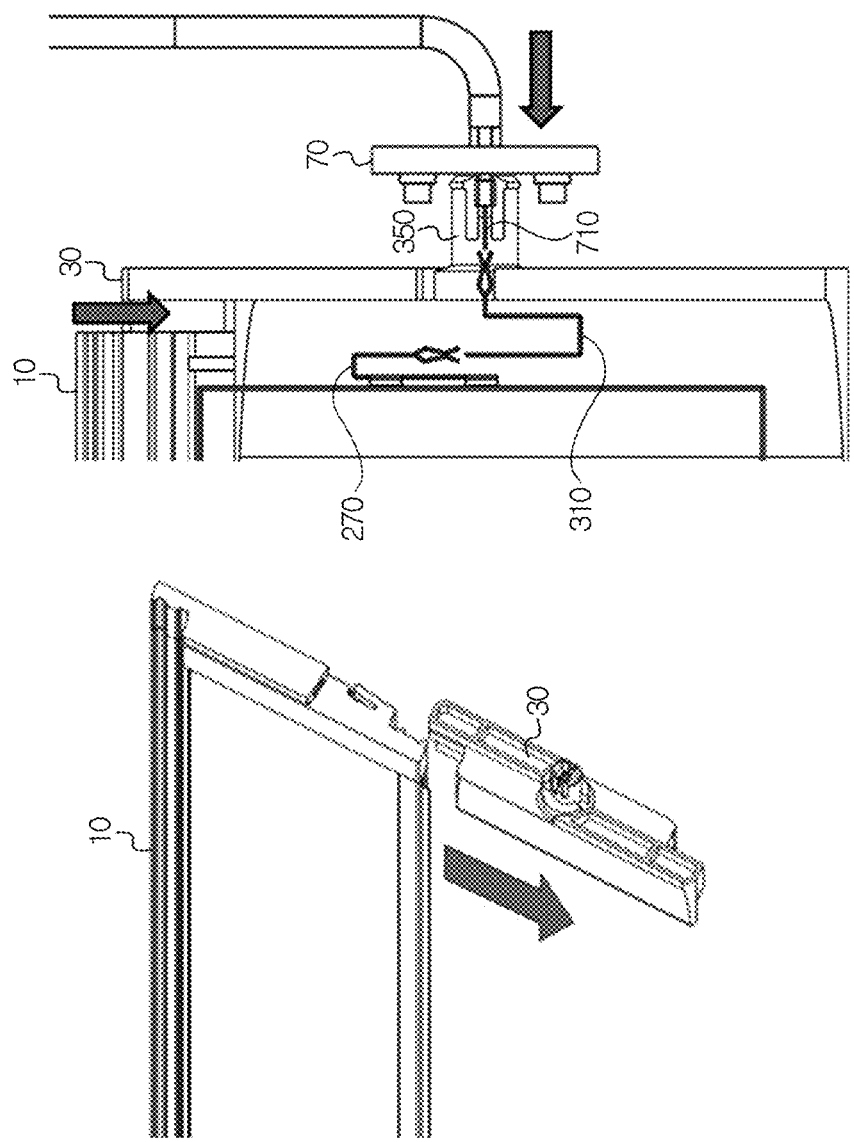
[FIG. 16]

[FIG. 17]
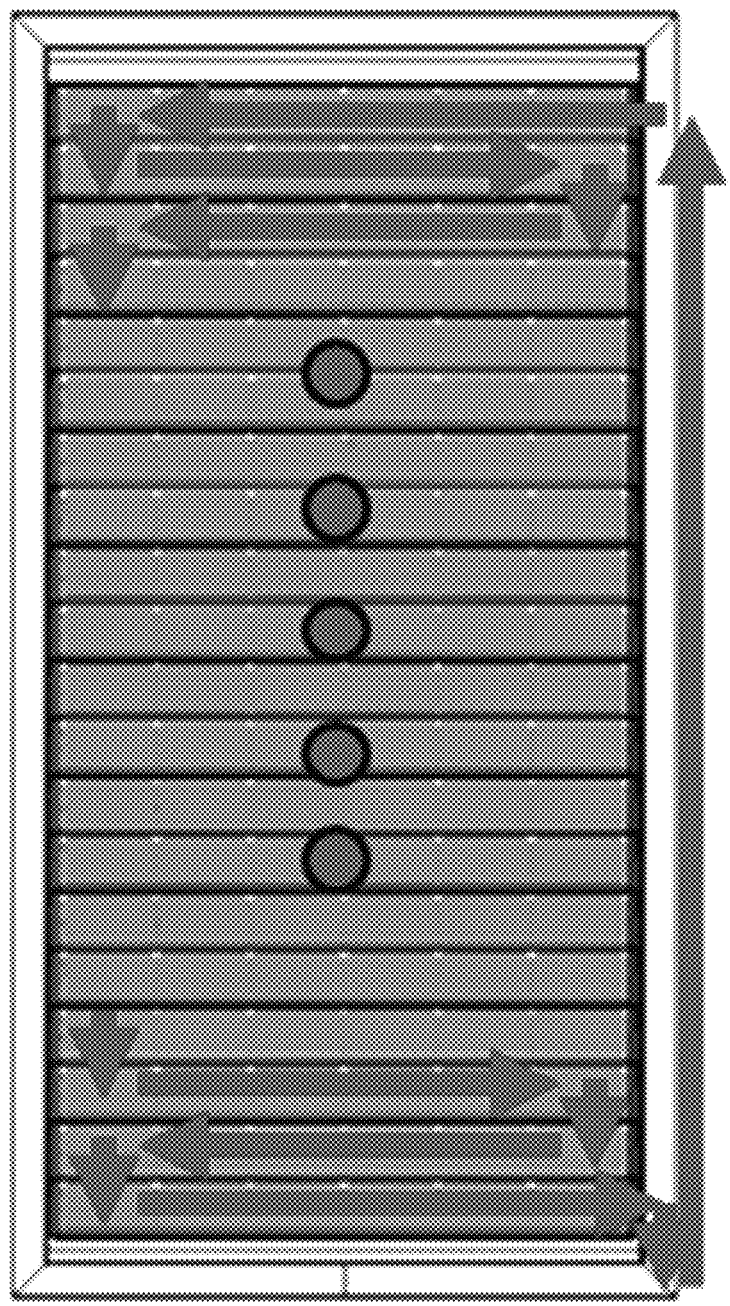

[FIG. 18]
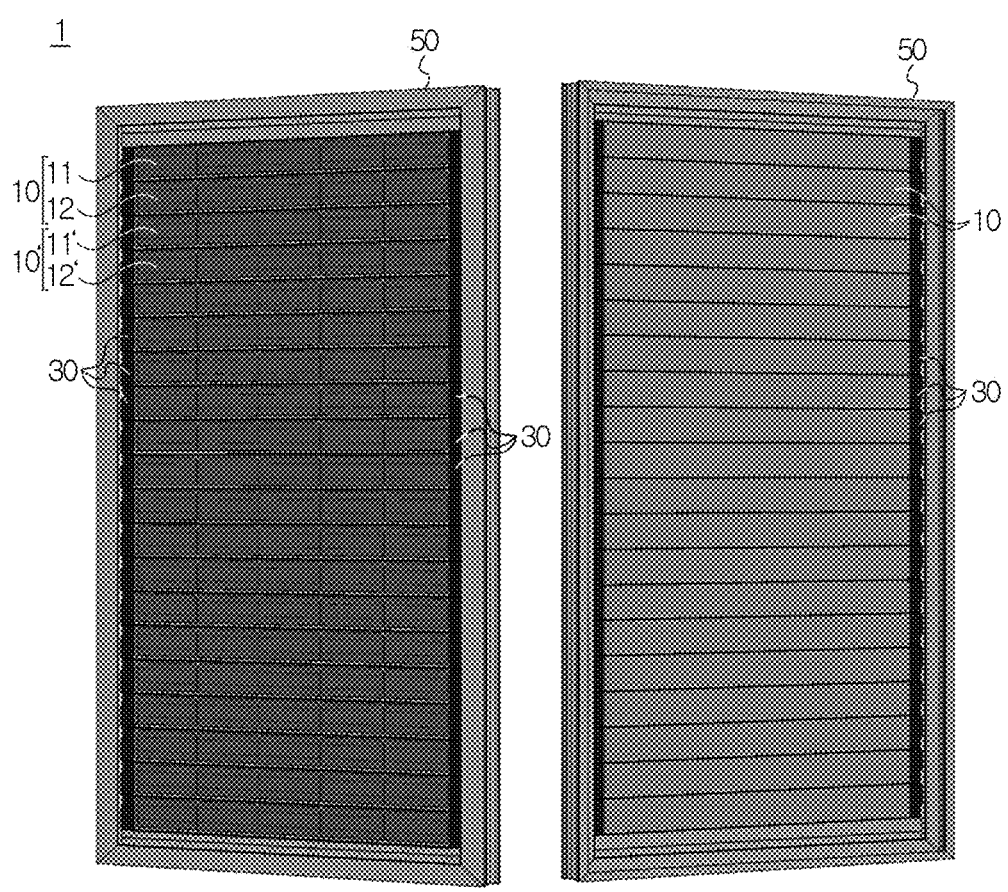

[FIG. 19]
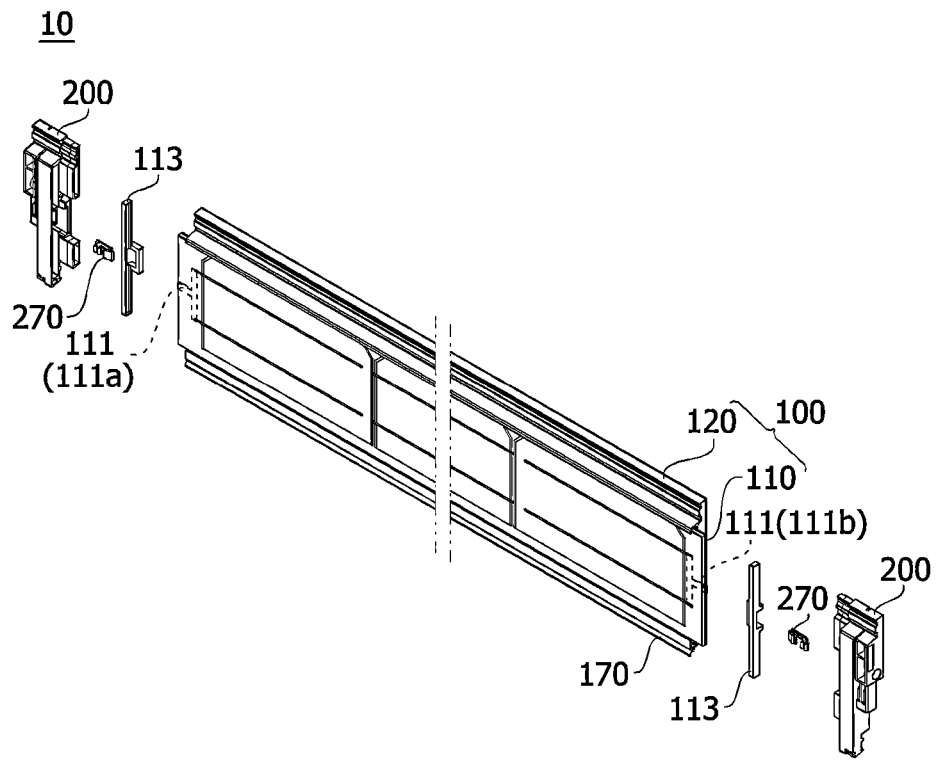
[FIG. 20]
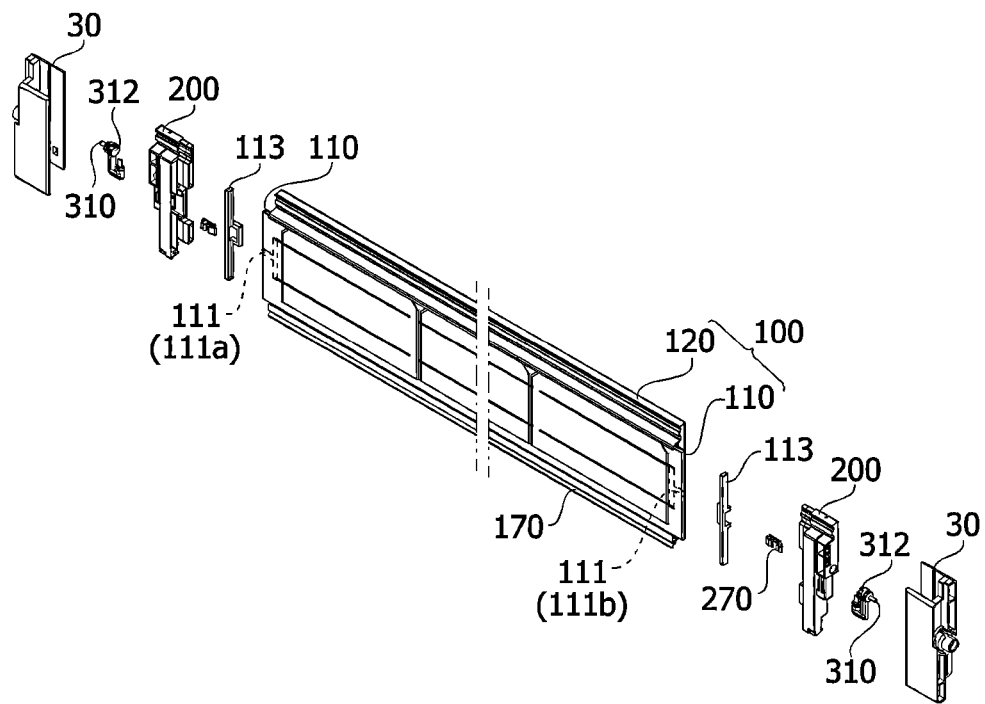

[FIG. 21]
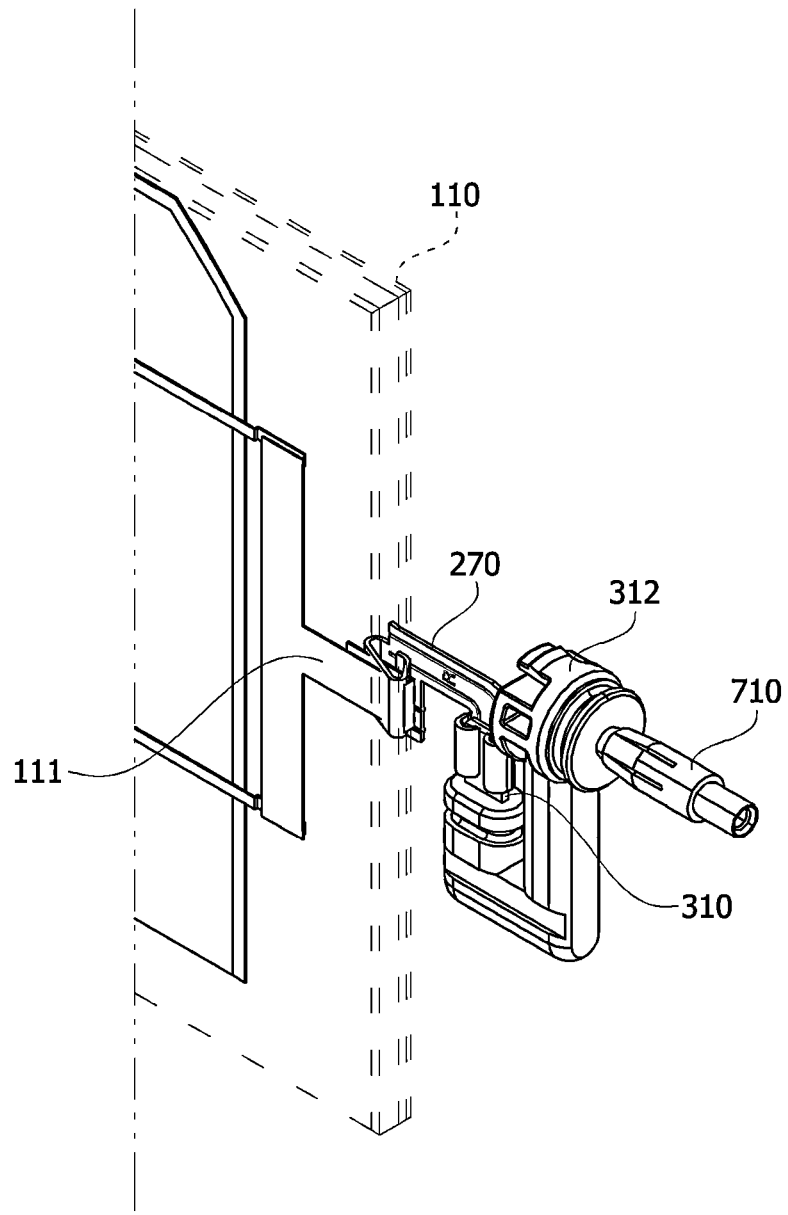

[FIG. 22]
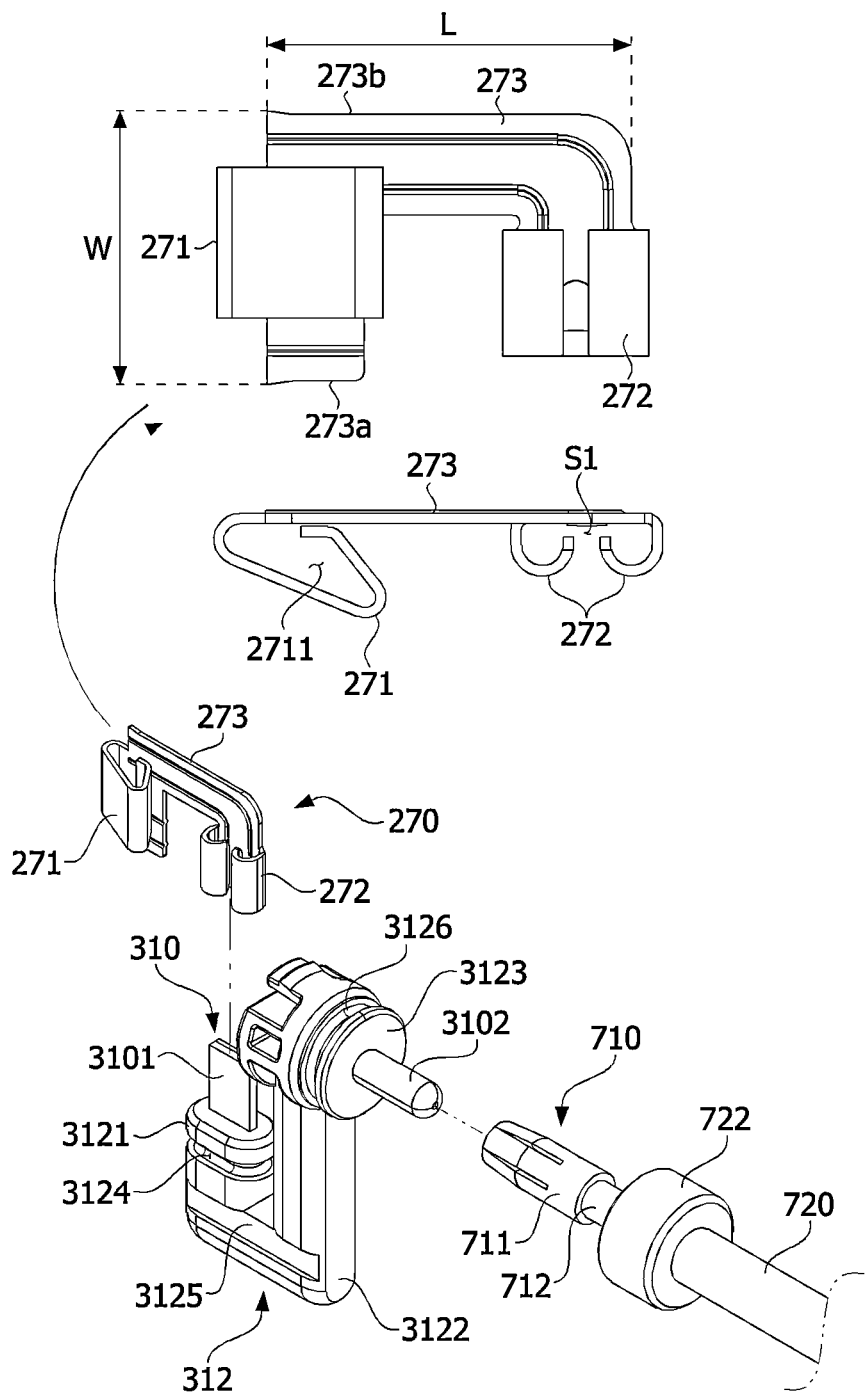

[FIG. 23]
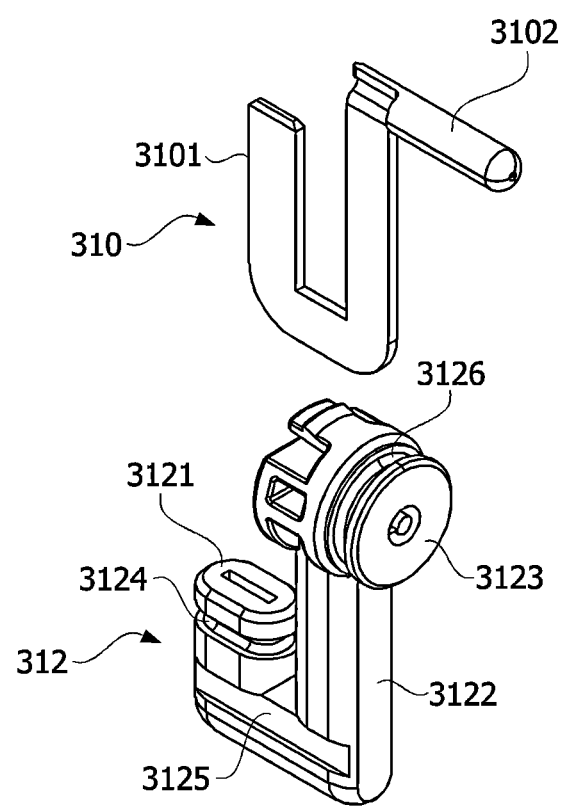

[FIG. 24]
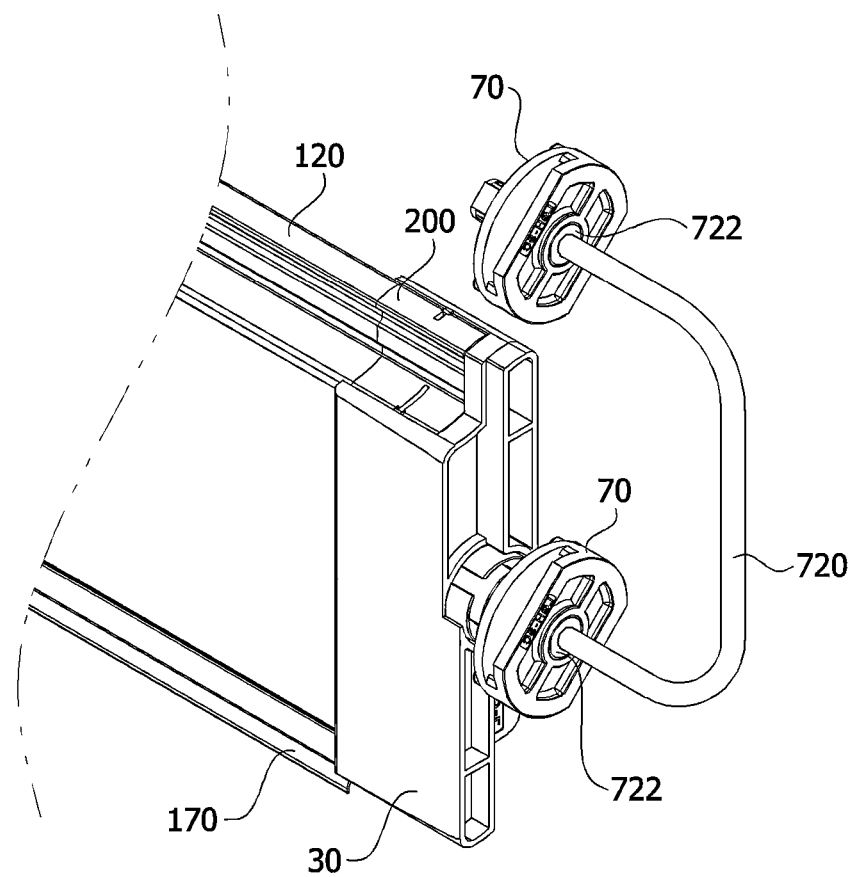

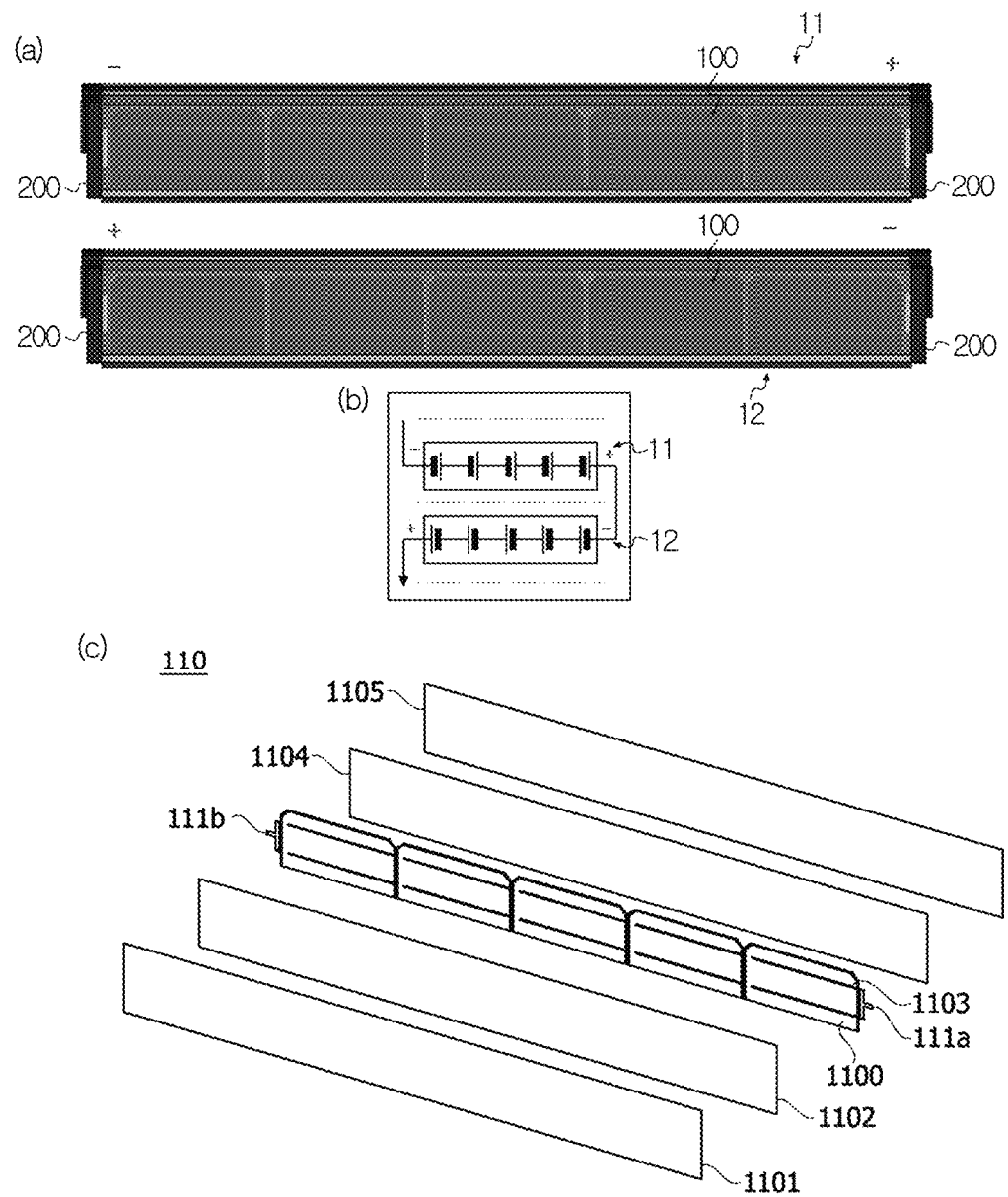
[FIG. 25]

[FIG. 26]
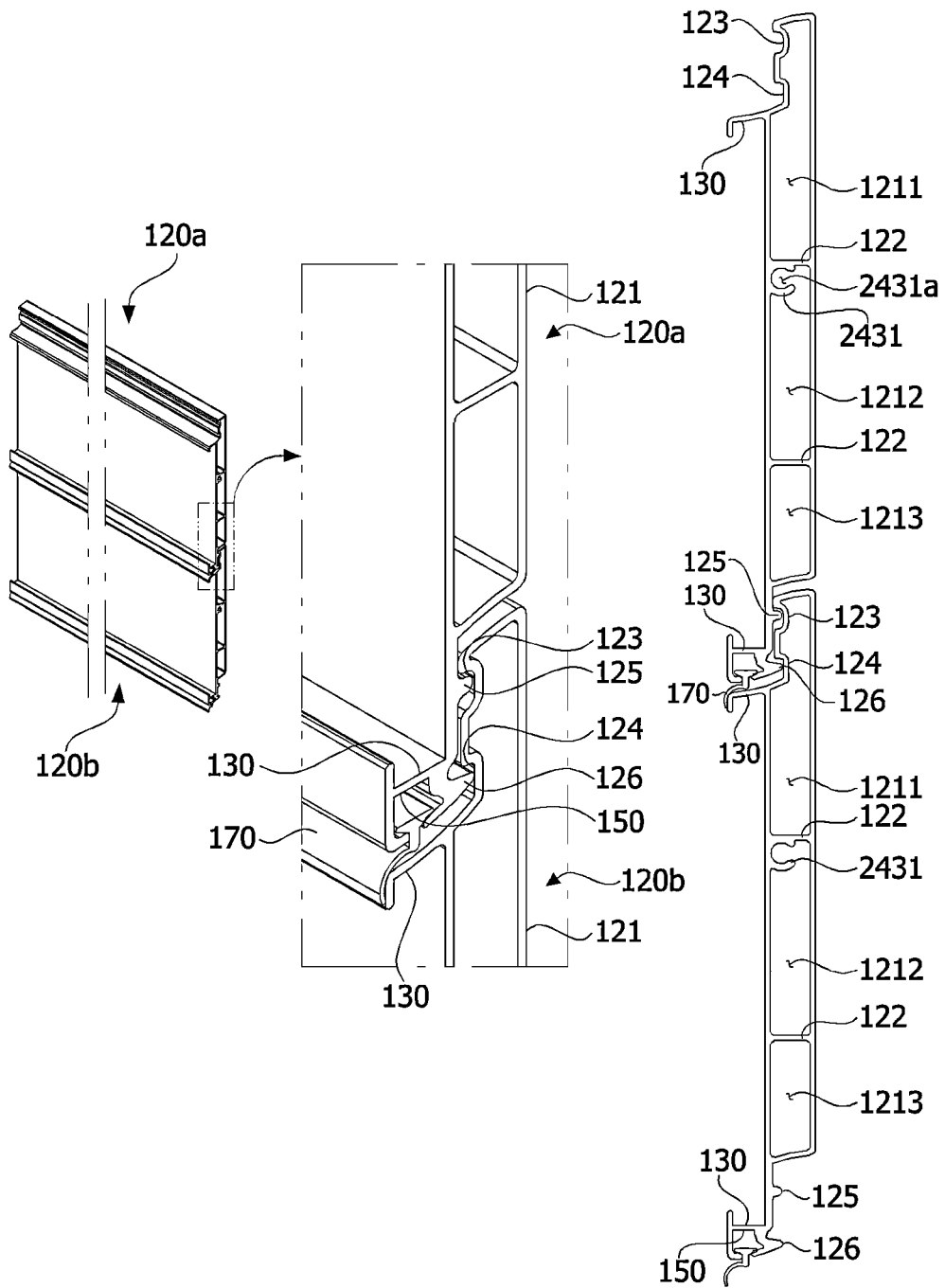

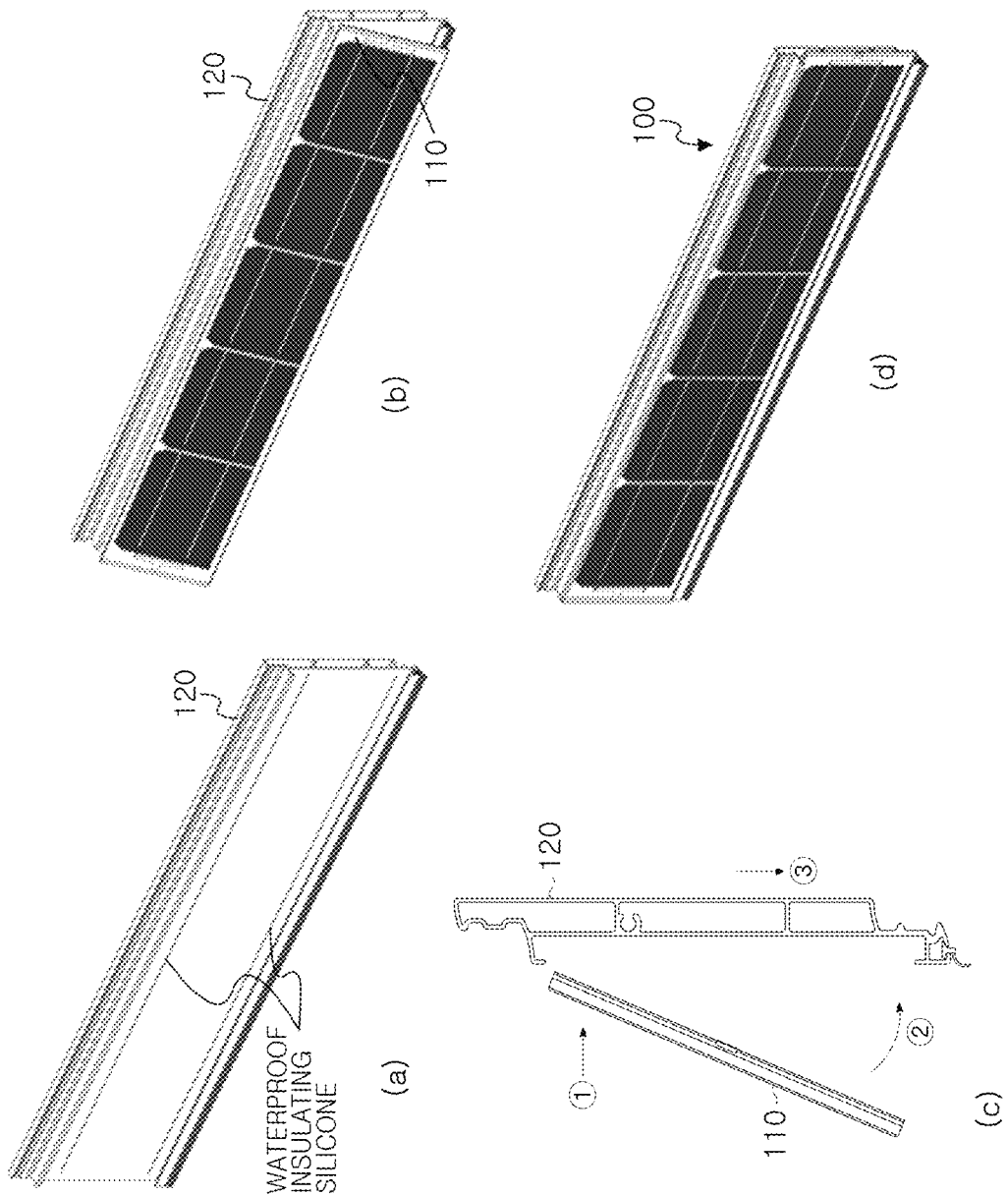
[FIG. 27]

[FIG. 28]
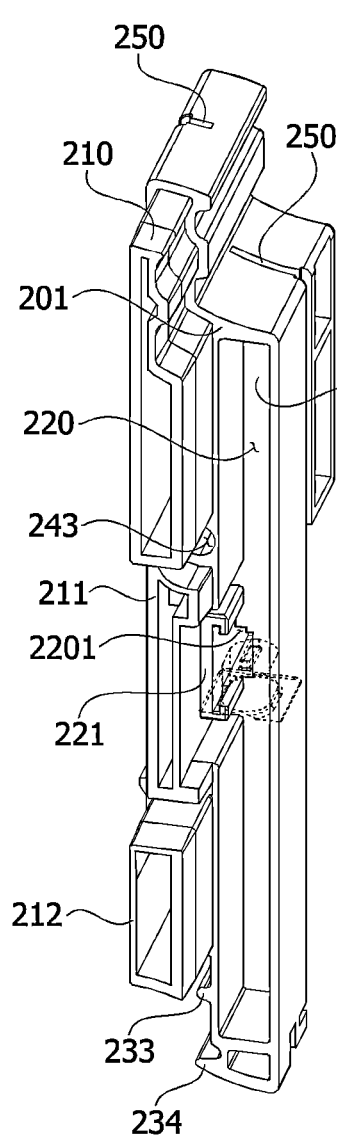
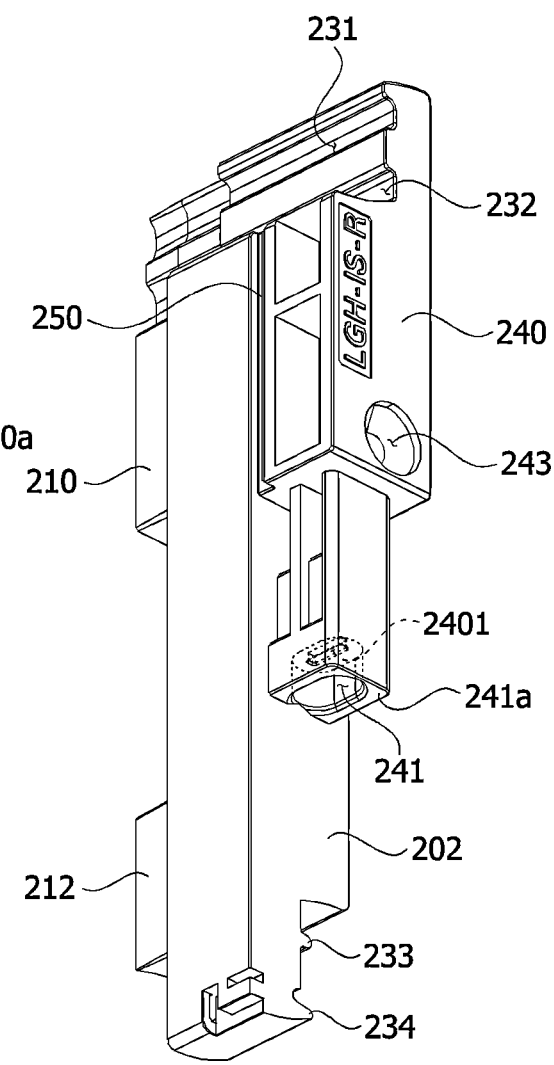
(a)   (b)

[FIG. 29]
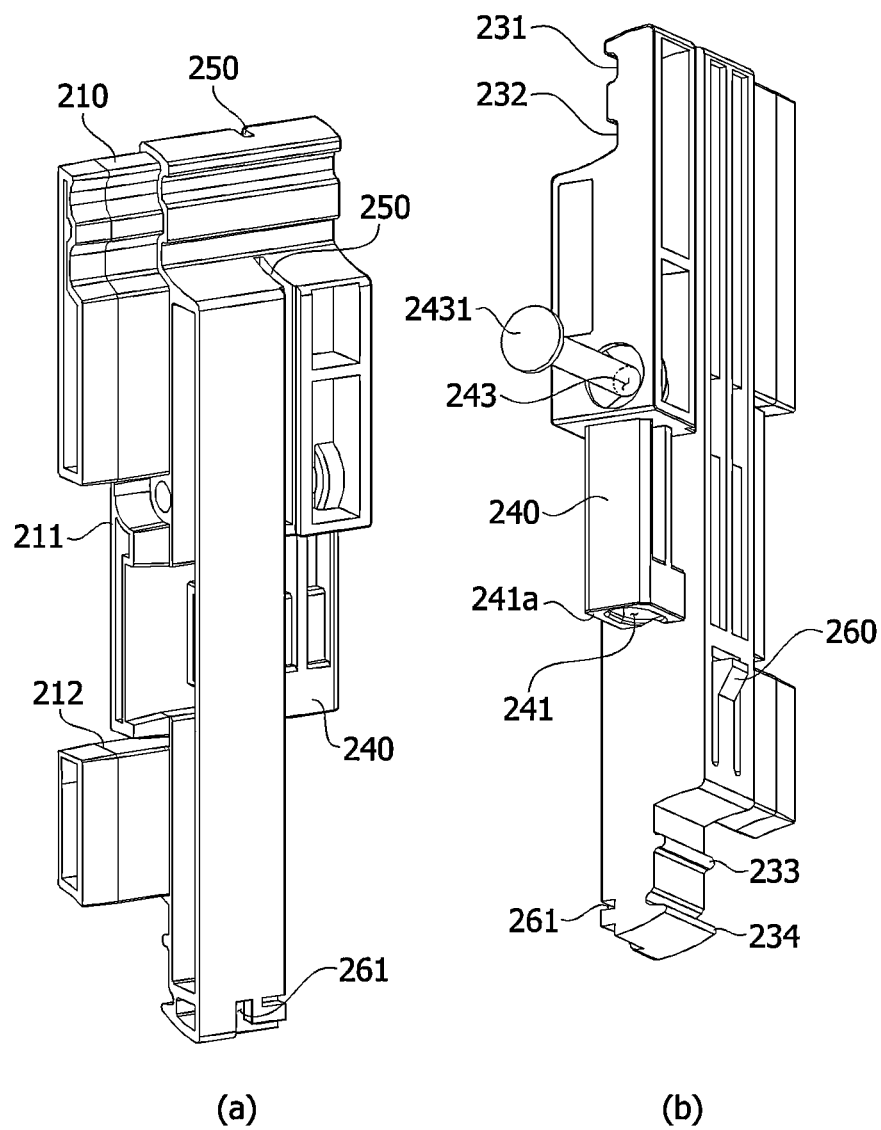

[FIG. 30]
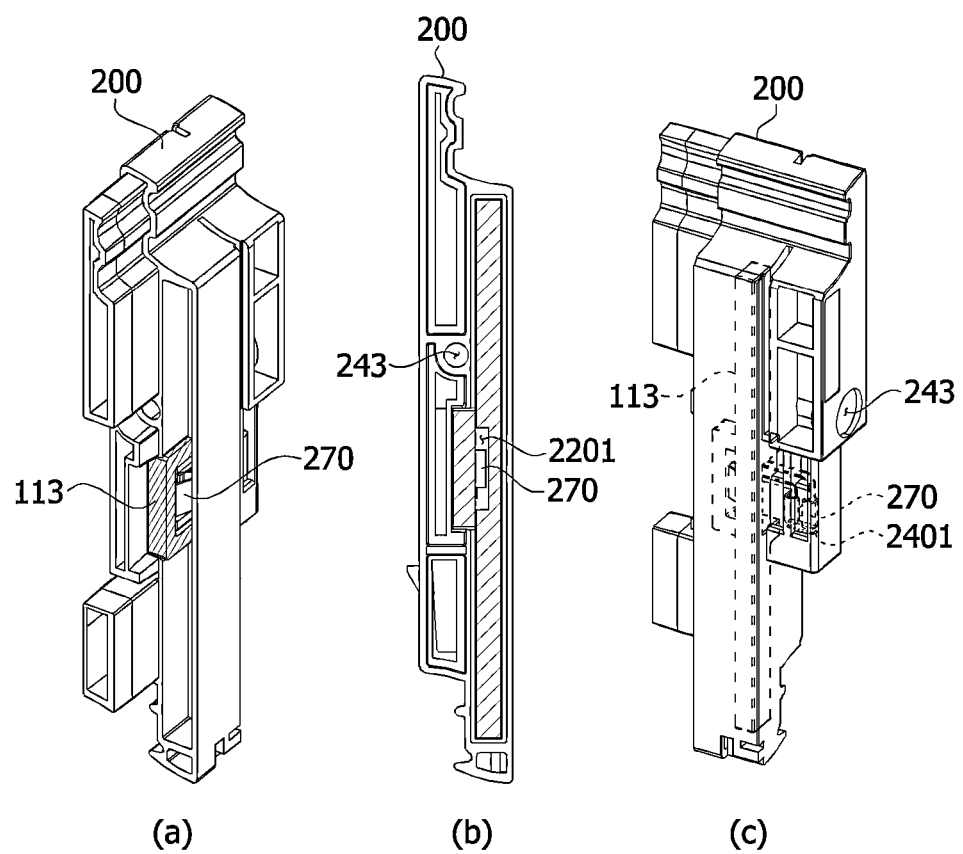

[FIG. 31]
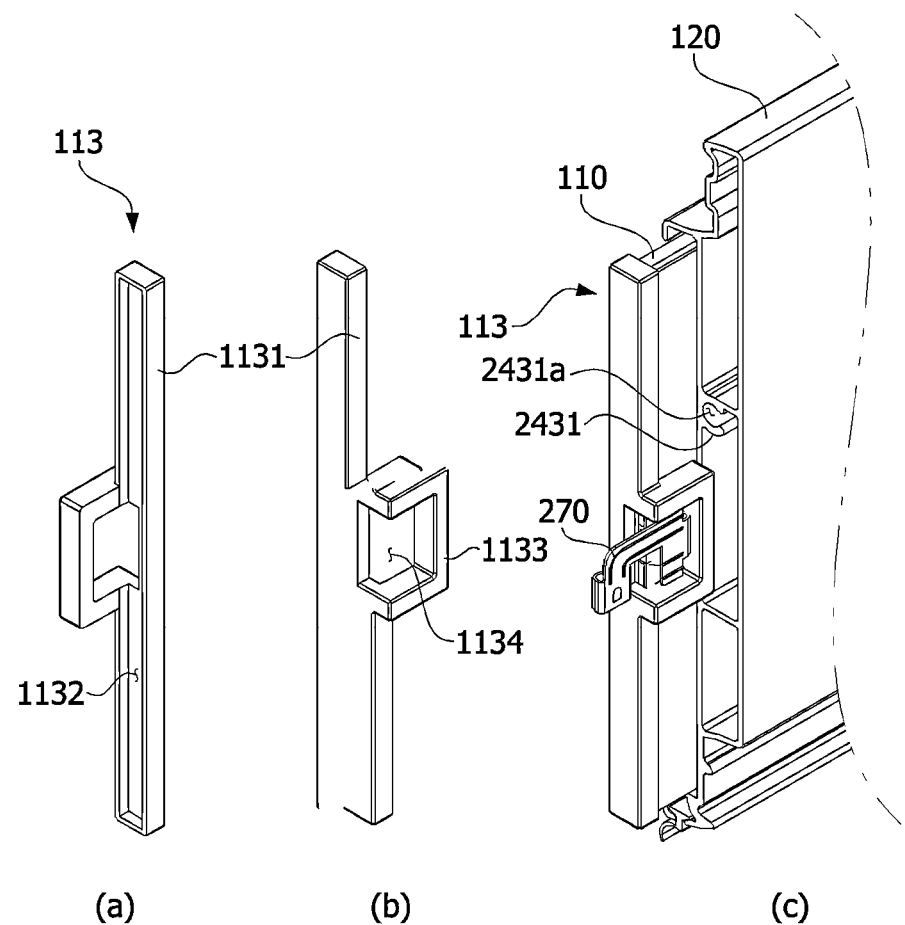

[FIG. 32]
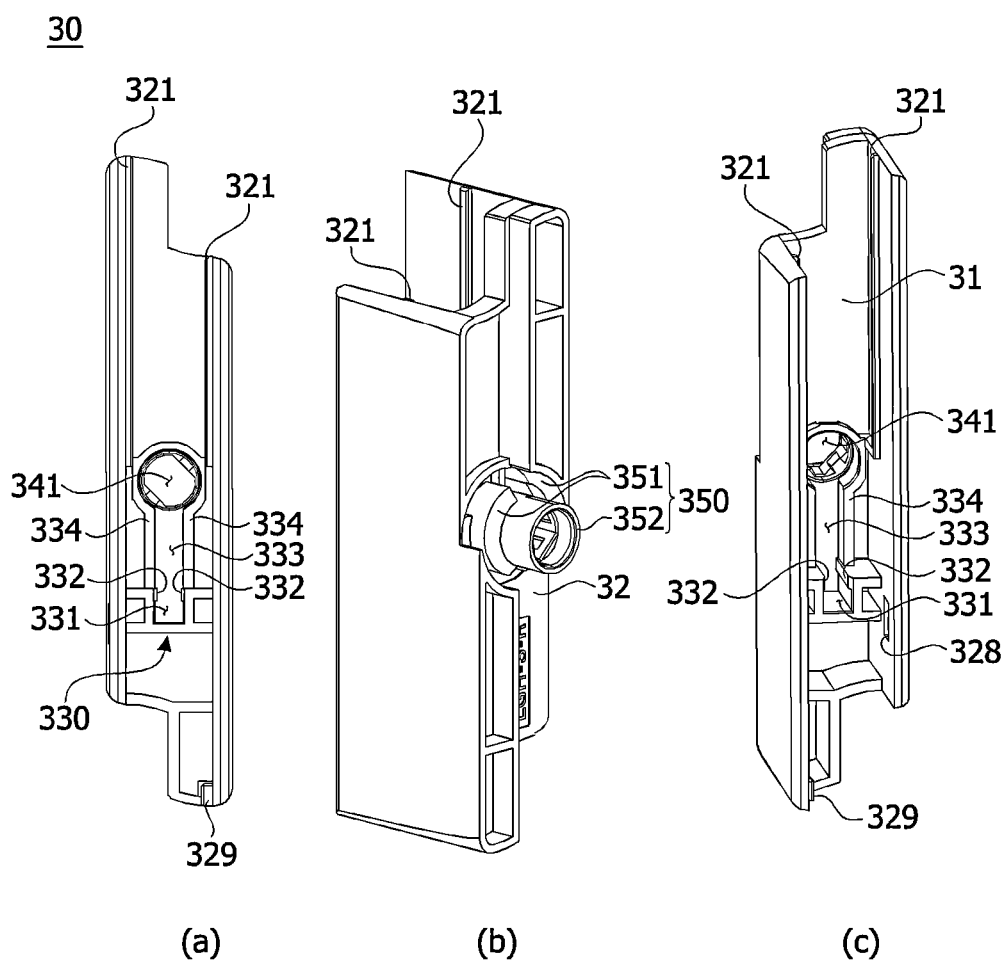

[FIG. 33]
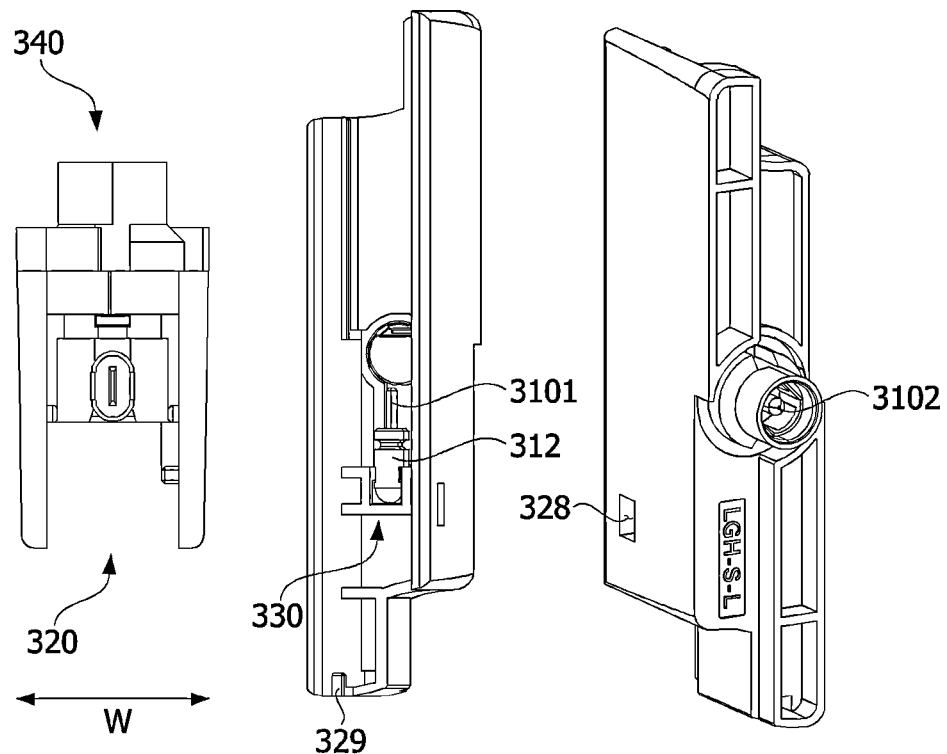
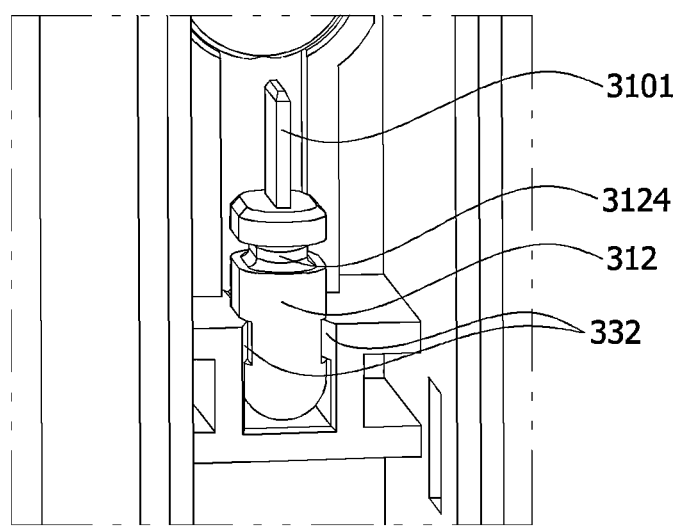

[FIG. 34]
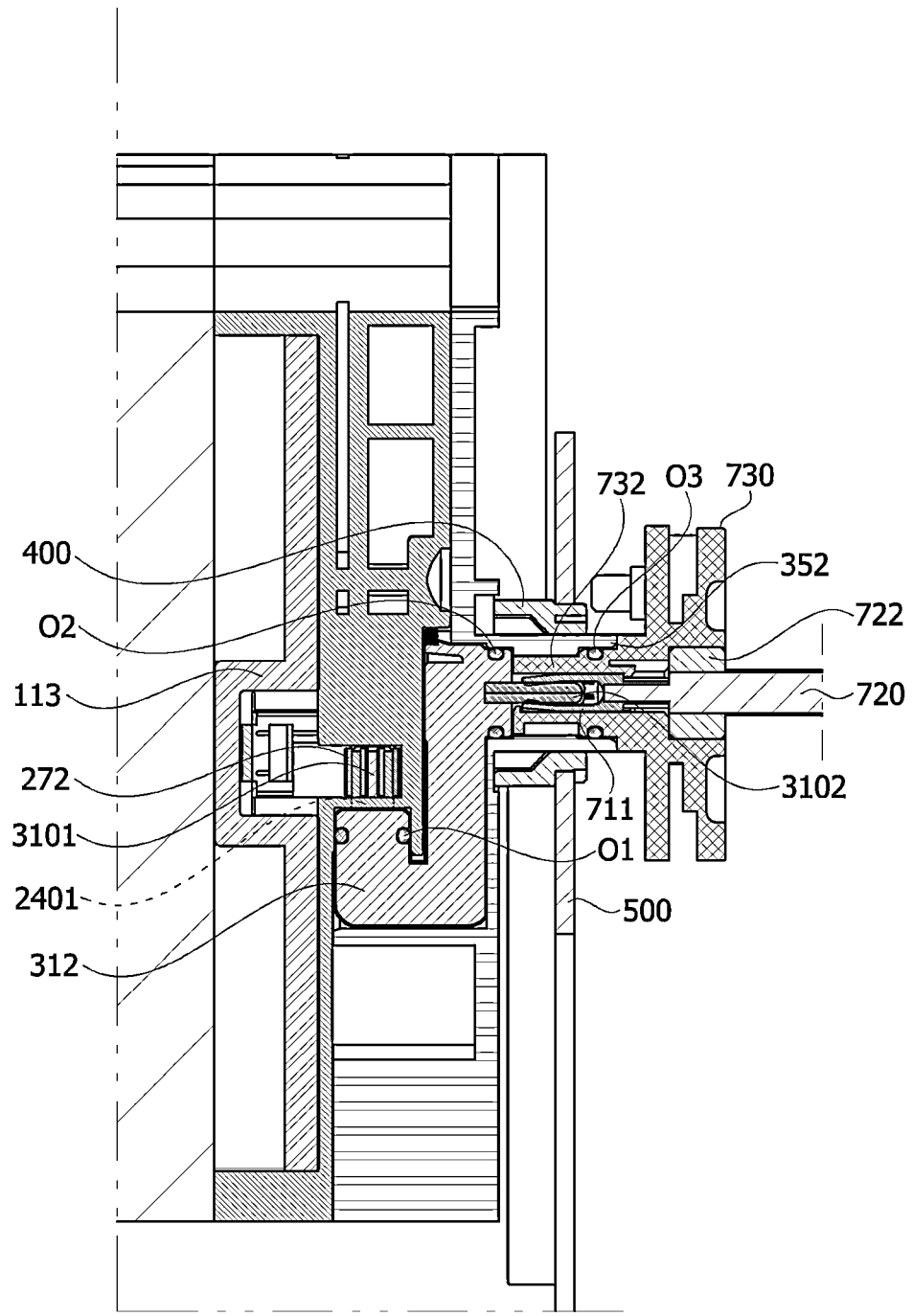

[FIG. 35]
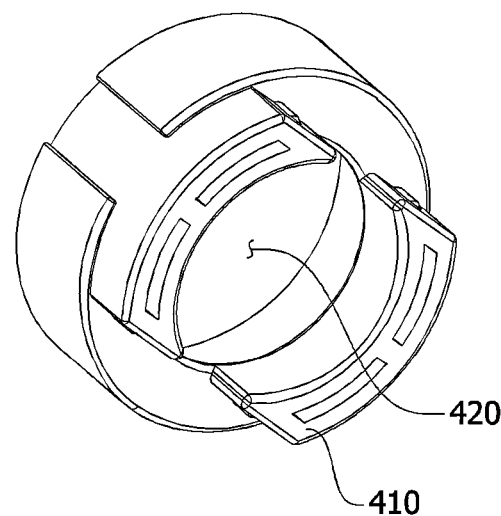
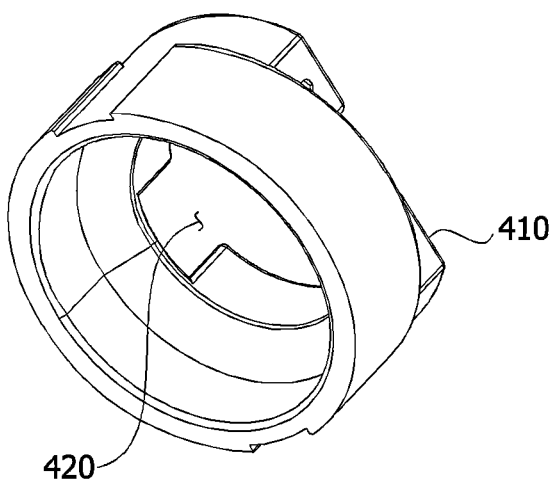

[FIG. 36]
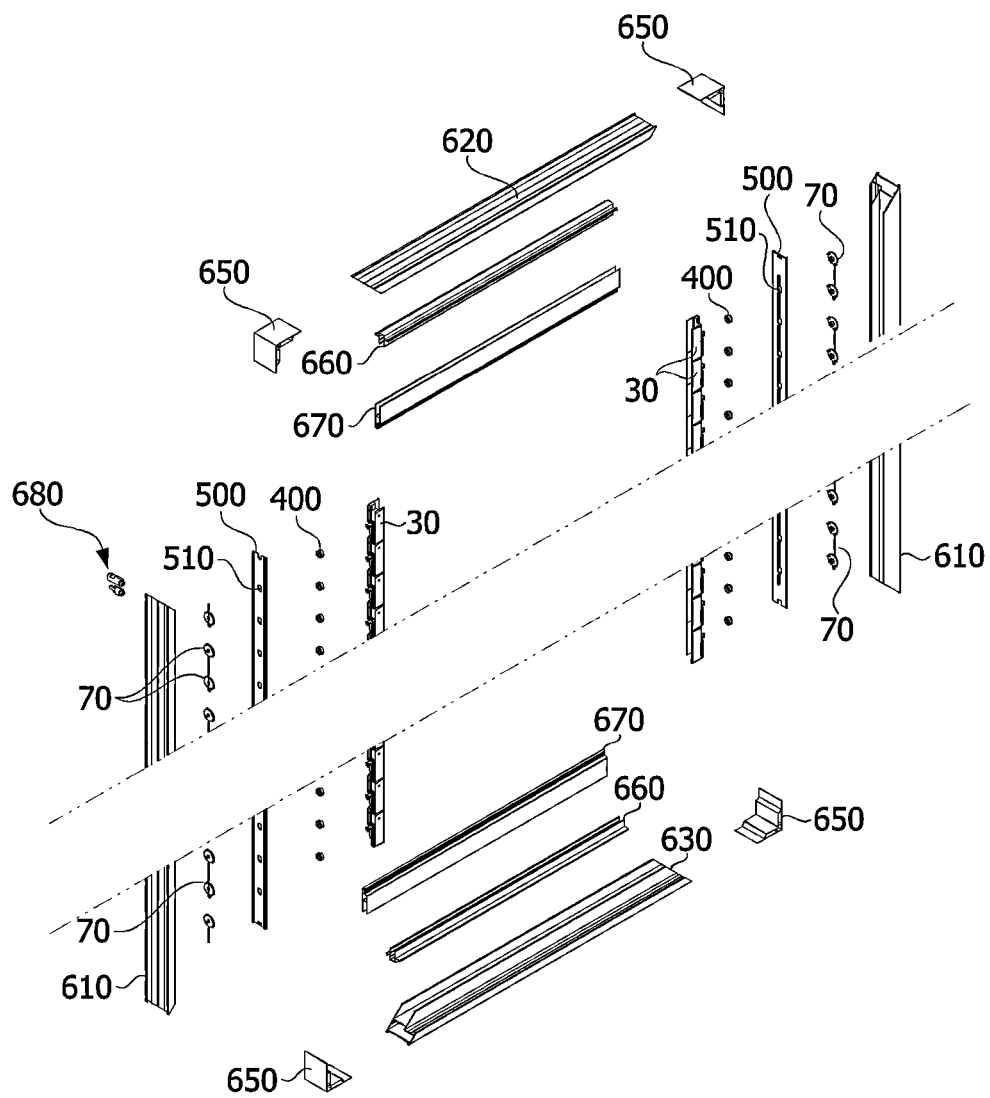

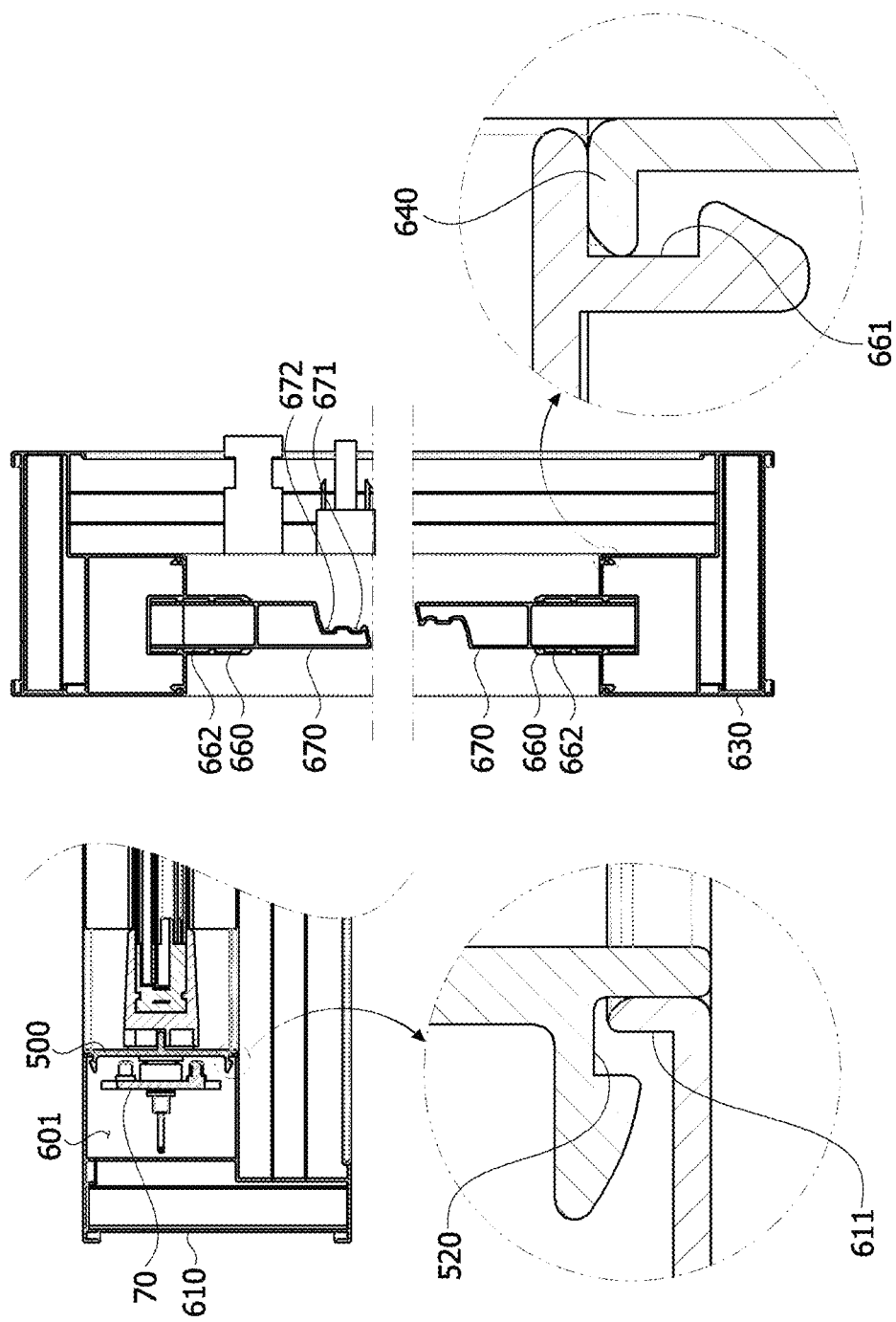

[FIG. 38]
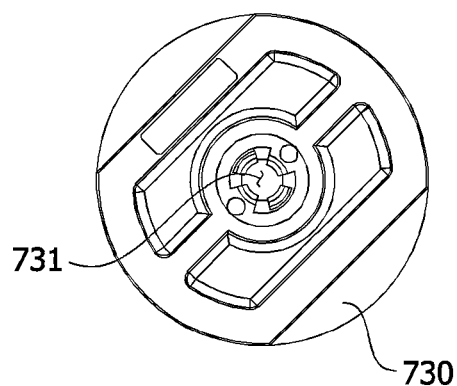
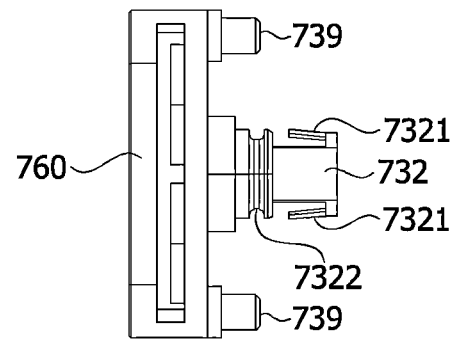
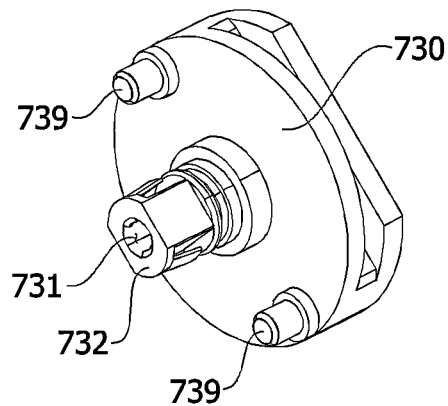
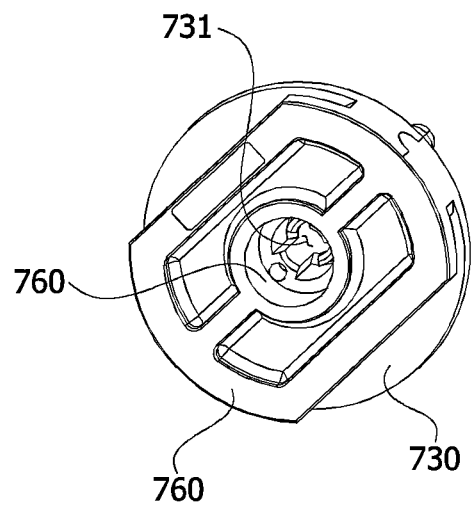

[FIG. 39]
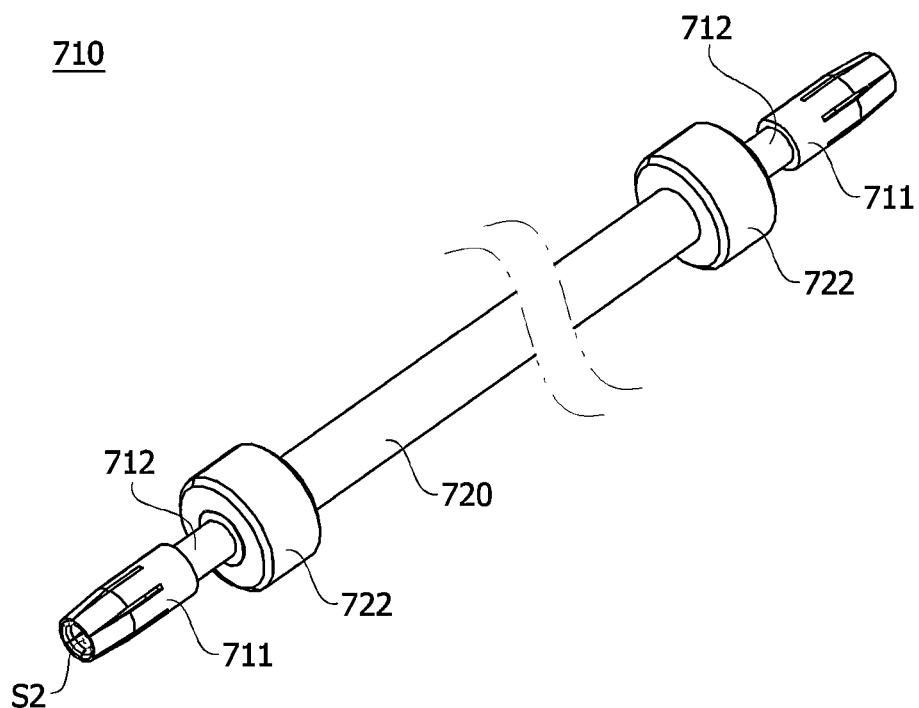
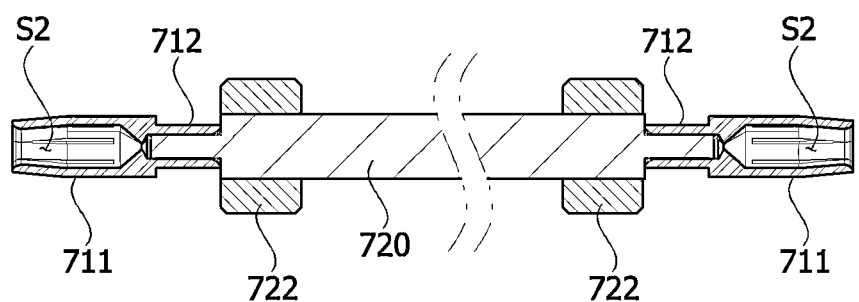

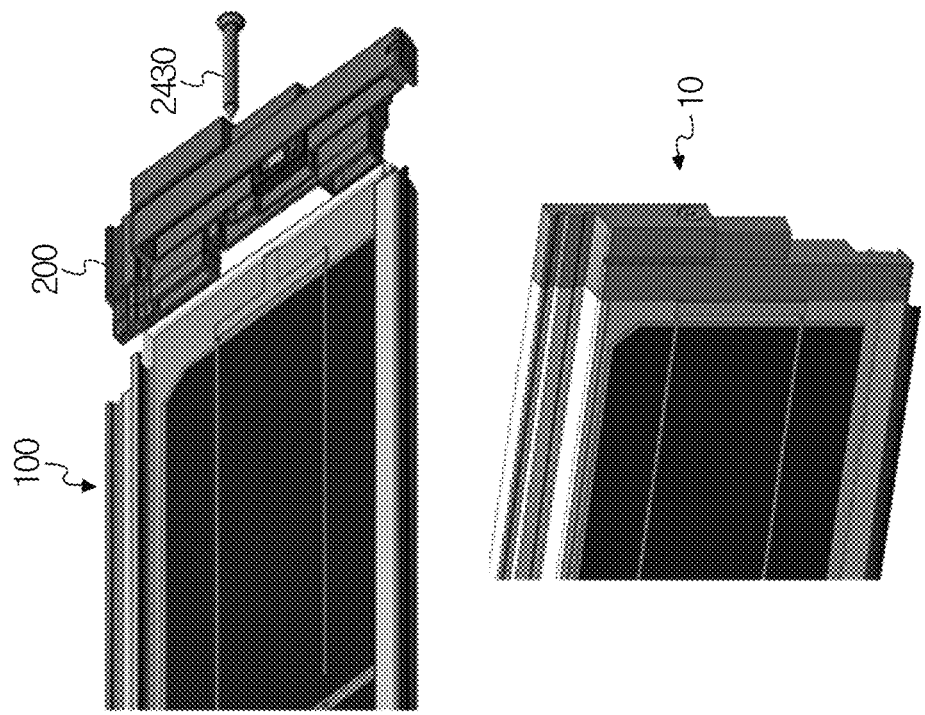
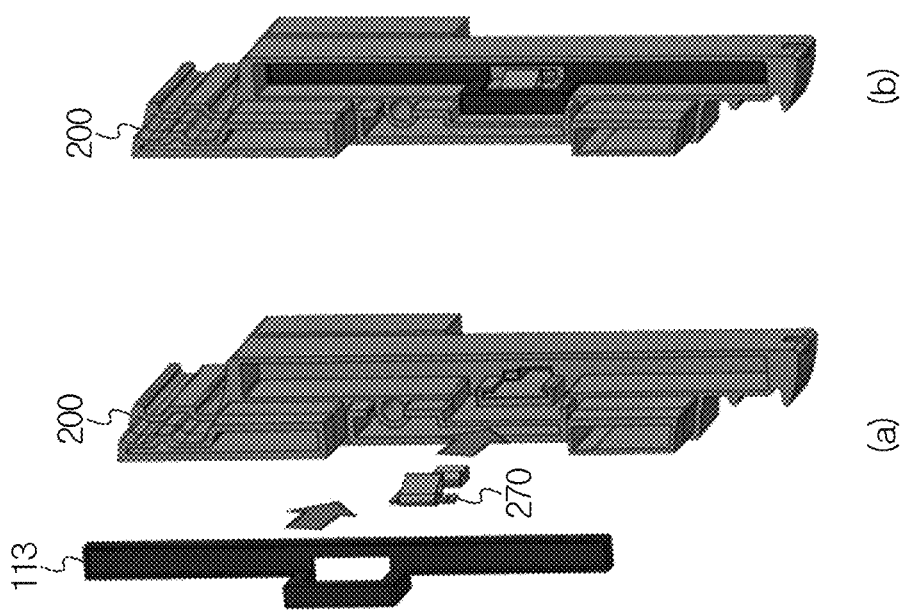
[FIG. 40]

[FIG. 41]
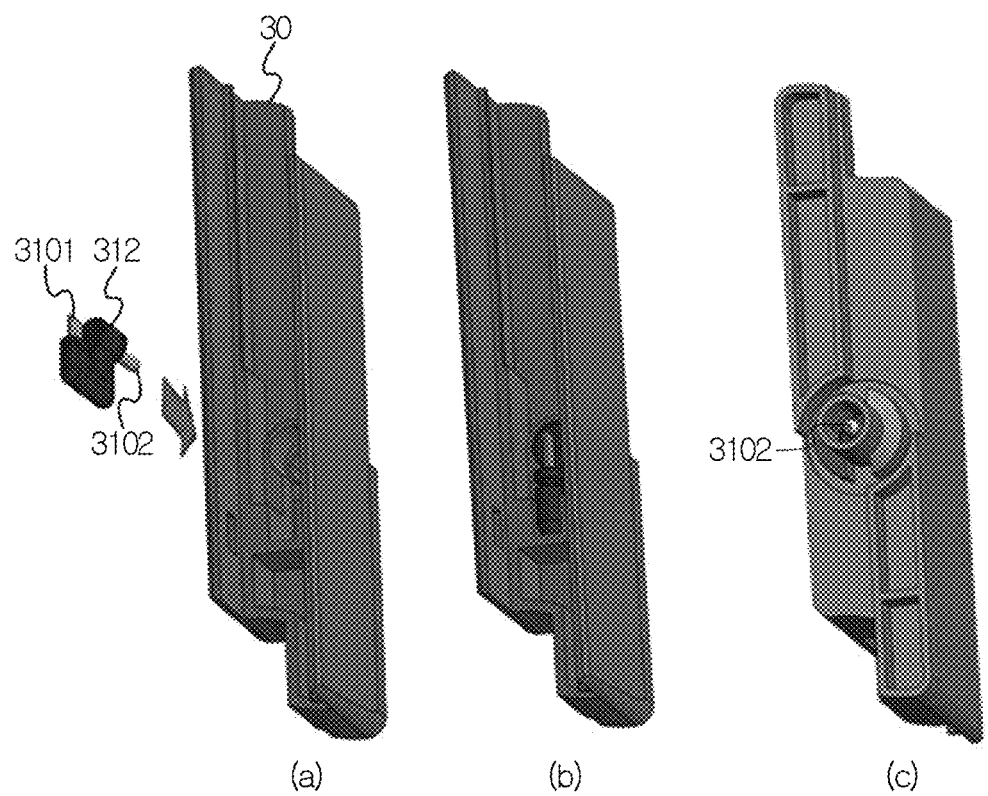

[FIG. 42]
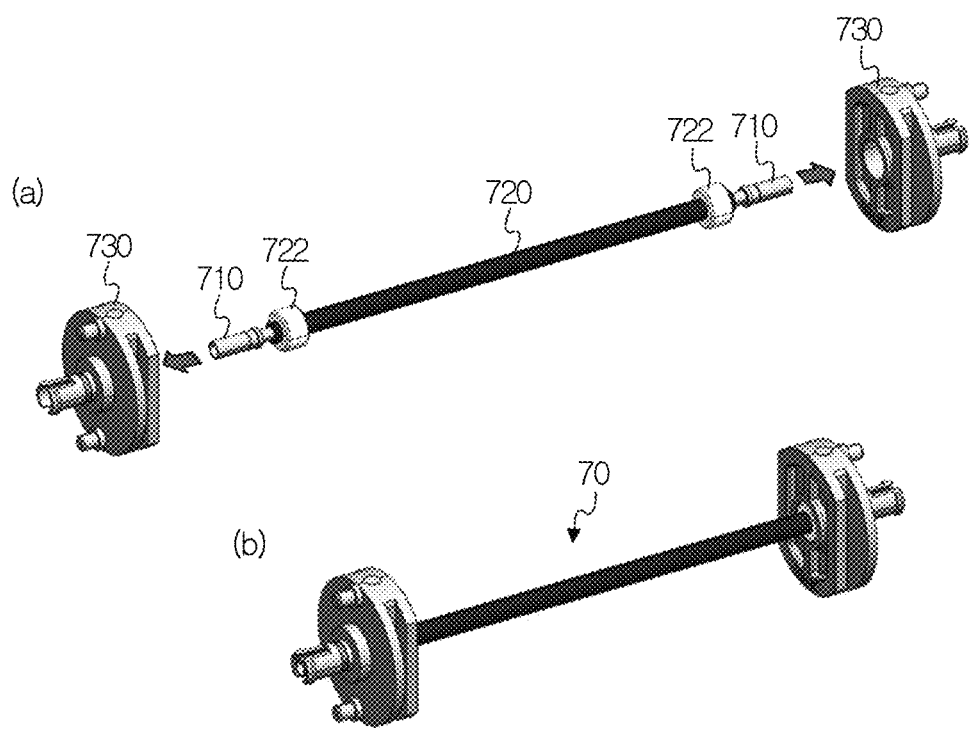

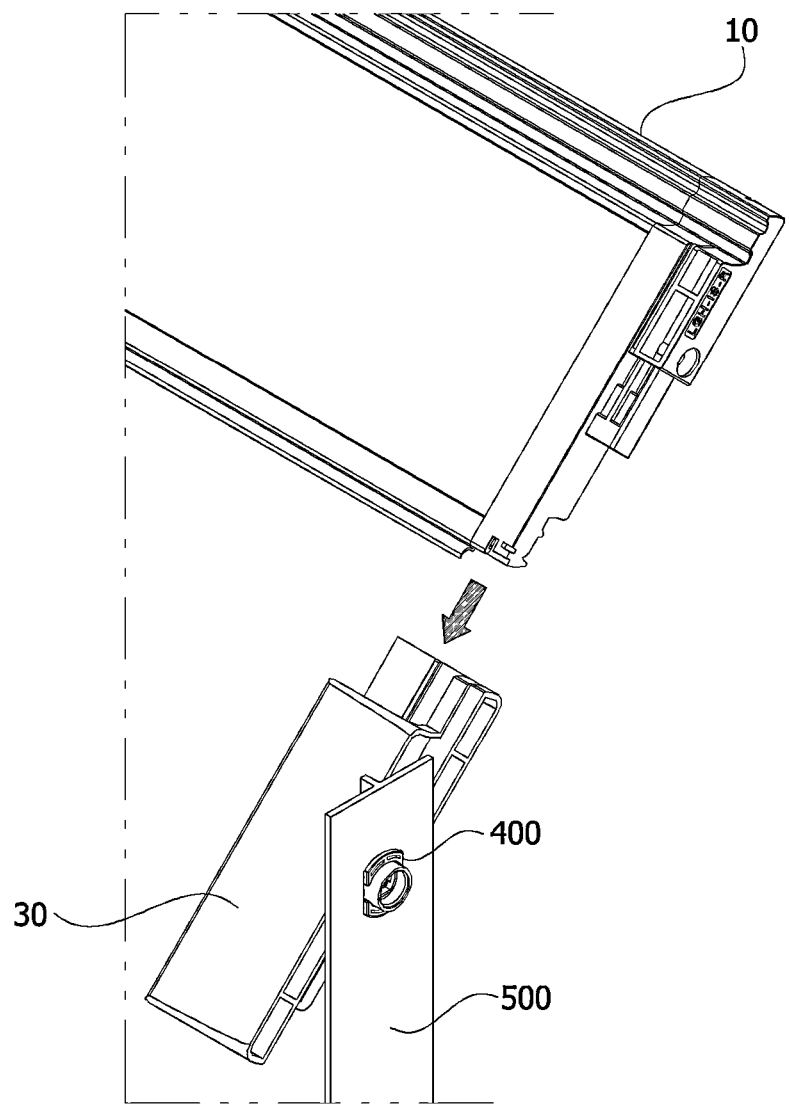
[FIG. 43]

[FIG. 44]
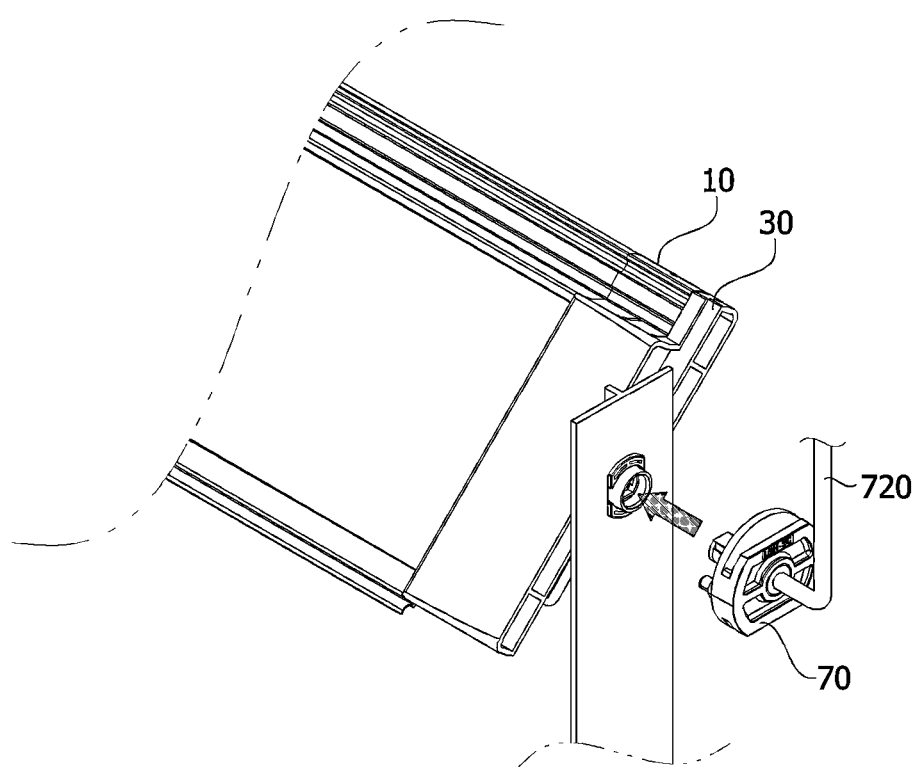

[FIG. 45]
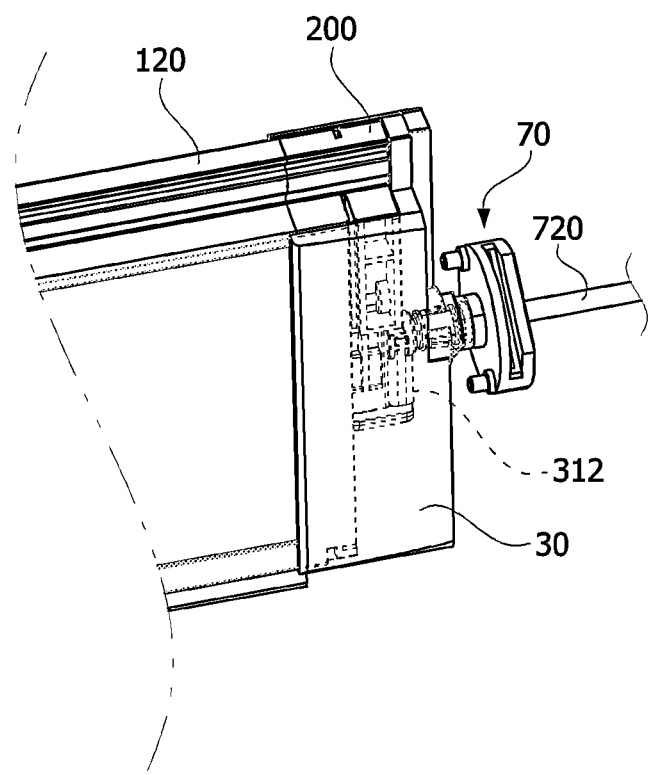

[FIG.46]
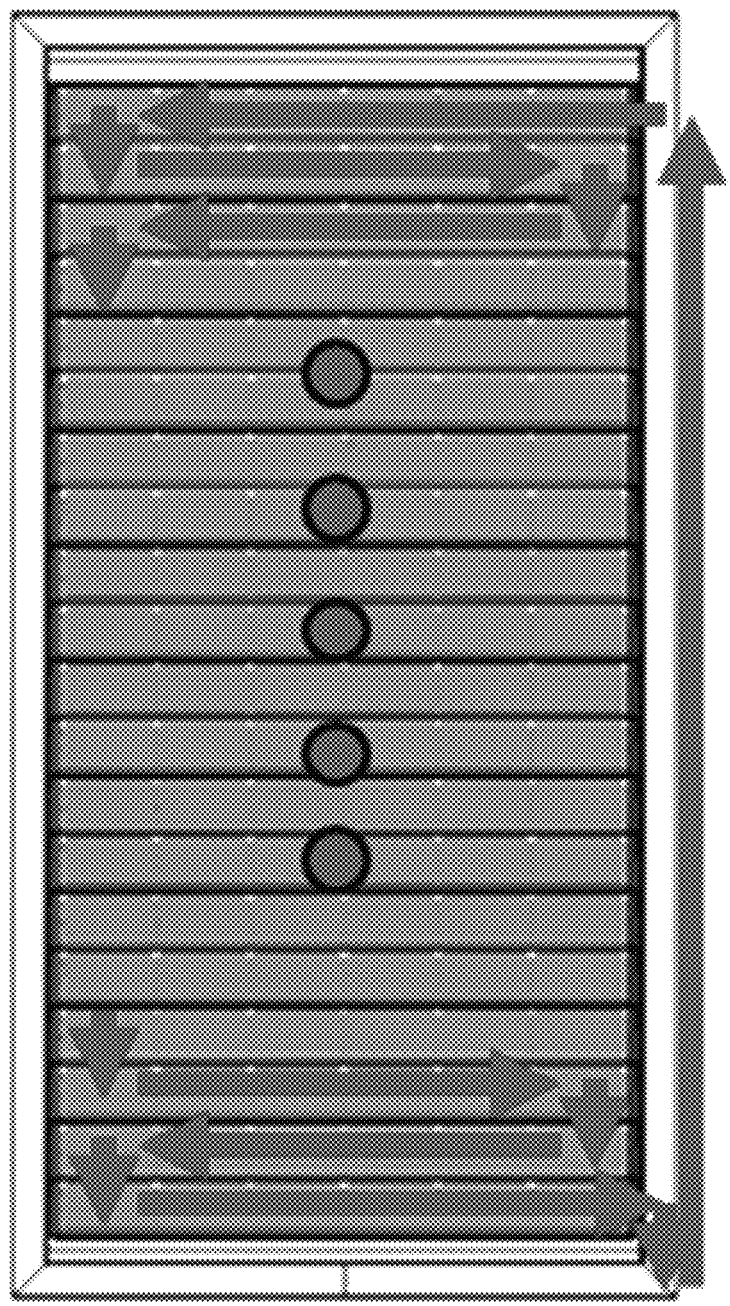

LOUVER ASSEMBLY CAPABLE OF HAVING MOUNTED THEREON SOLAR CELL PANEL

TECHNICAL FIELD

The present invention relates to a louver assembly allowing a solar cell panel to be mounted thereon, in which a solar cell panel (solar module) is integrated with a louver window applicable to a public building.

BACKGROUND ART

Recently, as a way to reduce energy consumption, efforts to use natural energy such as solar energy as alternative energy have been attempted. In photovoltaic systems using sunlight of the solar energy, photovoltaic modules are installed on an outer wall on which a large amount of sunlight is present among outer walls of a building, and after the photovoltaic modules collect sunlight, the collected sunlight is converted into electric energy and the electric energy is supplied to the inside of the building.

When the photovoltaic modules of such a photovoltaic system are connected in series, there are problems in that a connection structure of wires electrically connected is complicated and the wires are damaged or broken by external factors because the wires are exposed to the outside.

Thus, not only the manufacturing costs and installation costs of the photovoltaic module increase, but also there is a problem in that maintenance for failure is not easy.

In addition, when the photovoltaic modules are connected in series, there is a problem in that water easily penetrates into the photovoltaic modules due to the connection structure of the wires.

Therefore, there is a need for a technique for solving the above problems.

DISCLOSURE

Technical Problem

The present invention is directed to providing a louver assembly on which a solar cell panel (photovoltaic module), in which a plurality of solar cell modules are more easily connectable in series without the exposure of wires to the outside, is mounted.

The present invention is also directed to providing a louver assembly in which photovoltaic power generation according to an angle is possible by insertion-mounting a solar cell panel in a louver frame.

The present invention is also directed to providing a louver assembly of which the number of insert injection-molded electrode terminals for serial connection of solar cell modules is minimized to improve productivity, facilitate product production, and further improve waterproof performance.

Technical Solution

According to an embodiment of the present invention, a solar cell louver assembly includes a plurality of solar cell modules which each include a solar cell panel unit including one pair of terminal portions provided at both end portions thereof, one pair of first electrode terminals electrically connected to the terminal portions, and one pair of first caps mounted on the solar cell panel unit to surround the first electrode terminals, a plurality of second caps each including a second electrode terminal electrically connected to the first electrode terminal, a frame unit provided such that each of the plurality of second caps is rotatably mounted in a length direction, and connector parts each including one pair of third electrode terminals configured to electrically connect the second electrode terminals of two adjacent solar cell modules when the plurality of solar cell modules are mounted on the frame unit.

According to another embodiment of the present invention, a solar cell louver assembly includes a plurality of solar cell modules which each include a solar cell panel unit including one pair of terminal portions provided at both end portions thereof, one pair of first electrode terminals electrically connected to the terminal portions, and one pair of first caps mounted on the solar cell panel unit to surround the first electrode terminals, a plurality of second caps each including a second electrode terminal electrically connected to the first electrode terminal and a terminal housing configured to surround at least a partial area of the second electrode terminal, a frame unit provided such that each of the plurality of second caps is rotatably mounted in a length direction, and connector parts each including one pair of third electrode terminals configured to electrically connect the second electrode terminals of two adjacent solar cell modules when the plurality of solar cell modules are mounted on the frame unit, wherein each first electrode terminal is detachably mounted inside the first cap, and each second electrode terminal is formed integrally with the terminal housing through insert injection molding and is detachably mounted inside the second cap.

Advantageous Effects

According to the present invention, since a louver assembly of the present invention can be assembled in the same manner as in a conventional louver window, assembly is easier.

In addition, the louver assembly can serve as a louver window, and concurrently, series-connected solar cell panels can generate electricity.

Furthermore, the plurality of solar cell panels can be more easily connected in series without the exposure of wires to the outside.

In particular, the number of electrode terminals to be insert-injection-molded is minimized in a structure for serial connection of the solar cell panels, thereby facilitating production product and improving productivity.

DESCRIPTION OF DRAWINGS

FIG. 1 shows perspective views illustrating a front surface and a rear surface of a louver assembly on which a solar cell panel is mounted according to a first embodiment of the present invention.

FIG. 2 is an exploded perspective view illustrating a solar cell module according to the first embodiment of the present invention.

FIG. 3 is a partial enlarged view of FIG. 1.

FIG. 4 is a cross-sectional view of FIG. 3.

FIGS. 5 and 6 are a perspective view and a side view illustrating first to third electrode terminals according to the first embodiment of the present invention.

FIG. 7 shows views illustrating a state in which a plurality of solar cell modules of FIG. 2 are electrically connected.

FIG. 8 shows a perspective view and a side cross-sectional view of a blade frame on which a solar cell panel is mounted according to the first embodiment of the present invention."

FIG. 9 shows perspective views and a side cross-sectional view illustrating a state in which the blade frame is disposed in a vertical direction according to the first embodiment of the present invention.

FIG. 10 shows views illustrating a first cap including a first electrode terminal according to the first embodiment of the present invention.

FIG. 11 shows views illustrating a second cap according to the first embodiment of the present invention.

FIG. 12 shows views illustrating a fixing member according to the first embodiment of the present invention.

FIGS. 13 and 14 show views illustrating a frame unit according to the first embodiment of the present invention.

FIG. 15 shows perspective views illustrating a connector part according to the first embodiment of the present invention.

FIG. 16 shows views illustrating a state in which the solar cell module is mounted on the second cap and the connector part is mounted in the second cap according to the first embodiment of the present invention.

FIG. 17 is a view illustrating a state in which a solar cell louver assembly is connected in series according to the first embodiment of the present invention.

FIG. 18 shows perspective views illustrating a front surface and a rear surface of a louver assembly according to a second embodiment of the present invention.

FIG. 19 is an exploded perspective view illustrating a solar cell module according to the second embodiment of the present invention.

FIG. 20 is an exploded perspective view illustrating the solar cell module and second caps according to the second embodiment of the present invention.

FIG. 21 is a partial perspective view illustrating electrical connections of a terminal portion of a solar cell panel and first to third electrode terminals according to the second embodiment of the present invention.

FIG. 22 is an exploded perspective view of the first to third electrode terminals according to the second embodiment of the present invention.

FIG. 23 is an exploded perspective view illustrating the second electrode terminal and a terminal housing of FIG. 22.

FIG. 24 is a perspective view illustrating a configuration in which solar cell modules are electrically connected in series by a connector part according to the second embodiment of the present invention.

FIGS. 25A and 25B illustrate a state in which the solar cell modules are electrically connected according to the second embodiment of the present invention, and FIG. 25C is a view illustrating components of the solar cell panel according to the second embodiment of the present invention.

FIG. 26 shows perspective views and a side cross-sectional view of a blade frame on which the solar cell panel is mounted according to the second embodiment of the present invention.

FIG. 27 shows views illustrating a state in which the solar cell panel is mounted on the blade frame according to the second embodiment of the present invention.

FIGS. 28 and 29 shows views illustrating a first cap in which the first electrode terminal is detachably mounted according to the second embodiment of the present invention.

FIG. 30 shows views illustrating a state in which the first electrode terminal and a first gasket are mounted in the first cap according to the second embodiment of the present invention.

FIG. 31 shows views for describing a state in which the first electrode terminal and the first gasket are mounted in the solar cell panel according to the second embodiment of the present invention.

FIGS. 32 and 33 show views illustrating the second cap according to the second embodiment of the present invention.

FIG. 34 is a cross-sectional view illustrating electrical connections of the first to third electrode terminals in a state in which the first cap, the second cap, and the connector part are mounted on the solar cell module according to the second embodiment of the present invention.

FIG. 35 shows views illustrating a fixing member according to the second embodiment of the present invention.

FIGS. 36 and 37 show views for describing a frame unit according to the second embodiment of the present invention.

FIGS. 38 and 39 show perspective views illustrating the connector part according to the second embodiment of the present invention.

FIG. 40 shows views illustrating a sequence in which the solar cell module is assembled according to the second embodiment of the present invention.

FIG. 41 shows views illustrating a sequence in which the terminal housing and the injection-molded second electrode terminal are assembled in the second cap according to the second embodiment of the present invention.

FIG. 42 shows views illustrating a sequence in which the connector part is assembled according to the second embodiment of the present invention.

FIGS. 43 and 44 are views for describing a sequence in which the solar cell module is mounted according to the second embodiment of the present invention.

FIG. 45 is a view illustrating a state in which the solar cell module is mounted on the second cap and the connector part is mounted on the second cap according to the second embodiment of the present invention.

FIG. 46 is a view illustrating a state in which a solar cell louver assembly is connected in series according to the second embodiment of the present invention.

MODES OF THE INVENTION

Hereinafter, exemplary embodiments of the present invention will be described in detail with reference to the accompanying drawings. Prior to the description, it should be understood that the terms used in the present specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

In addition, for convenience of description, sizes and shapes of the illustrated constituent members may be exaggerated or reduced.

Therefore, the embodiments disclosed in the present specification and the configurations illustrated in the drawings are merely the most exemplary embodiments of the present invention, and not all of them represent the technical ideas of the present invention, and thus it should be understood that there may be various equivalents and modified examples that could substitute therefore at the time of filing the present application.

First, throughout the present specification, a vertical direction refers to a direction perpendicular to a ground surface, and a horizontal direction refers to a direction parallel to the ground surface.

In addition, in the present document, a side of a solar cell panel on which sunlight is incident is referred to as a front surface (front), and a side in a direction opposite to the front surface is referred to as a rear surface (rear).

Here, the front surface may be installed to face the outside, and the rear surface may be installed to face the inside.

In addition, although it will be described below that a first cap 200, a second cap 30, and a connector part 70 are illustrated as being mounted at one side of a solar cell panel, it should be understood that the same may apply to the other side of the solar cell panel.

Hereinafter, a louver assembly 1 on which a solar cell panel is mountable according to a first embodiment of the present invention will be described in detail with reference to the accompanying FIGS. 1 to 17, and a louver assembly 1 on which a solar cell panel is mountable according to a second embodiment of the present invention will be described in detail with reference to FIGS. 18 to 46.

FIG. 1 shows perspective views illustrating a front surface and a rear surface of the louver assembly 1 on which a solar cell panel is mounted according to the first embodiment of the present invention. FIG. 2 is an exploded perspective view illustrating a solar cell module according to the first embodiment of the present invention. FIG. 3 is a partial enlarged view of FIG. 1. FIG. 4 is a cross-sectional view of FIG. 3. FIGS. 5 and 6 are a perspective view and a side view illustrating first to third electrode terminals according to the first embodiment of the present invention.

Referring to FIGS. 1 to 6, the louver assembly 1 on which a solar cell panel is mounted according to the first embodiment of the present invention (hereinafter, referred to as "louver assembly") includes a plurality of solar cell modules 10, second caps 30, a frame unit 50, and connector parts 70.

Specifically, referring to FIG. 2, the plurality of solar cell modules 10 each include a solar cell panel unit 100 including one pair of terminal portions 111 provided at both end portions thereof, one pair of first electrode terminals 270 electrically connected to the terminal portions 111, and one pair of first caps 200 mounted on the solar cell panel unit 100 to surround the first electrode terminals 270.

In addition, the second cap 30 may accommodate the first electrode terminal 270 and the second electrode terminal 310 to be electrically connected to the first electrode terminal 270 and may be provided as a plurality of second caps 30 such that the first caps 200 are mounted thereon.

The first electrode terminal 270 in each of the first caps 200 may be integrally formed with the first cap 200 while insert-injected into the first cap 200.

In addition, the second electrode terminal 310 in each of the second caps 30 may be integrally formed with the second cap 30 while insert-injected into the second cap 30.

In the present document, insert injection refers to commonly used insert injection molding and means that a certain insert member is installed in an insert injection molding device in advance, and then a molten resin is injected onto the insert member to manufacture an insert-molded product as a final product.

That is, in the present invention, the first cap or the second cap may be manufactured by injecting a molten resin onto the first electrode terminal or the second electrode terminal as an insert member.

In addition, the frame unit 50 includes an inner frame 500 provided such that the plurality of second caps 30 are each mounted thereon to be rotatable in a length direction and an outer frame 600 surrounding the inner frame 500.

In addition, the connector part 70 is disposed between the inner frame 500 and the outer frame 600 and includes one pair of third electrode terminals 710 for electrically connecting the second electrode terminals 310 of two adjacent solar cell modules 10 (11 and 12) when the plurality of solar cell module 10 are mounted on the frame unit 50.

Here, the third electrode terminal 710 in each of the connector parts 70 may be integrally formed with the connector part 70 while insert-injected into the connector part 70.

More specifically, referring to FIGS. 2 to 4, when the first cap 200 is mounted on the second cap 30, the second electrode terminal 310 may be in contact with the first electrode terminal 270, and when the connector part 70 is mounted on the second cap 30, the third electrode terminal 710 may be provided in contact with the second electrode terminal 310.

That is, the first electrode terminal 270 and the second electrode terminal 310 may be electrically connected in physical contact (direct contact) with each other, and the second electrode terminal 310 and the third electrode terminal 710 may be electrically connected in physical contact (direct contact) with each other so that the first electrode terminal 270 and the third electrode terminal 710 may be electrically connected.

In addition, one terminal of the first and second electrode terminals 270 and 310 may be provided with a space into which the other terminal thereof is inserted, and when the first cap 200 is mounted on the second cap 30, one terminal of the first and second electrode terminals 270 and 310 may be inserted into the other terminal thereof.

Specifically, referring to FIGS. 5 and 6, the first electrode terminal 270 may include a plurality of first electrode rods 271 (271*a*, 271*b*, and 271*c*) forming a space S1 into which the second electrode terminal 310 is inserted. At least one first electrode rod 271 may be bent one or more times and may be provided such that the second electrode terminal is in contact with a bent portion of the first electrode rod or is inserted into a space between bent portions of the first electrode rods.

That is, a space S1 into which the second electrode terminal 310 is inserted may be a space between the first electrode rods, wherein the space is formed by bending the plurality of first electrode rods 271 one or more times.

As one embodiment in the first embodiment, as shown in FIG. 5, when three first electrode rods 271 are provided, two first electrode rods 271*a* and 271*c* spaced apart from each other by a certain interval may be formed to each include a first bent portion 2711 bent toward a solar cell panel (leftward) and a second bent portion 2712 formed to extend from the first bent portion and bent toward the second cap 30 (rightward).

In this case, on the other hand, the remaining first electrode rod 271*b* formed between the two first electrode rods 271*a* and 271*c* may be formed to include a third bent portion 2713 bent toward the second cap 30 and a fourth bent portion 2714 formed to extend from the third bent portion 2713 and bent toward the solar cell panel.

That is, when each of the first electrode rods is bent two or more times, at least one first electrode rod may be provided to be bent in a different direction from the remaining first electrode rods.

In particular, the first bent portion and the third bent portion may be provided to be bent in different directions, and the second bent portion and the fourth bent portion may be formed to be bent in different directions.

As another embodiment of the first embodiment, as shown in FIG. 6, when three first electrode rods 271 are provided, two first electrode rods 271a and 271c spaced apart from each other by a certain interval may be formed to each include a first bent portion 2711a bent toward the solar cell panel.

In this case, on the other hand, the remaining first electrode rod 271b formed between the two first electrode rods may be formed to include a second bent portion 2713b bent toward the second cap 30.

That is, when each of the first electrode rods is formed to be bent one time, the first bent portion and the second bent portion may be formed to be bent in different directions so that a certain space may be formed between the first electrode rods.

In addition, the first electrode terminal 270 includes a first connection portion 272 electrically connected to the solar cell panel and a second connection portion 273 in contact with a bypass diode.

In addition, the plurality of first electrode rods 271 (271a, 271b, and 271c), the first connection portion 272, and the second connection portion 273 may be formed integrally.

Furthermore, one terminal of the second and third electrode terminals 310 and 710 may be provided with a space S2 into which the other terminal thereof is inserted, and when the connector part 70 is mounted on the second cap 30, one terminal of the second and third electrode terminals 310 and 710 may be provided to be inserted into the other terminal thereof.

Specifically, the second electrode terminal 310 includes a plurality of second electrode rods 311 (311a, 311b, and 311c) forming a space into which the third electrode terminal 710 is inserted. At least one second electrode rod 311 may be bent one or more times and may be provided such that the third electrode terminal 710 is in contact with a bent portion of the second electrode rod 311 or is inserted into a space between bent portions of the second electrode rods 311.

That is, a space S1 into which the third electrode terminal 710 is inserted may be a space between the first electrode rods, wherein the space is formed by bending the plurality of second electrode rods 311 one or more times.

As one embodiment of the first embodiment, as shown in FIG. 5, when three second electrode rods 311 are provided, two second electrode rods 311a and 311c spaced apart from each other by a certain interval may be formed to each include a first bent portion 3111 bent downward (downward direction) and a second bent portion 3112 formed to extend from the first bent portion and bent upward (upward direction).

In this case, on the other hand, the remaining second electrode rod 311b between the two second electrode rods 311a and 311c may be formed to include a third bent portion 3113 bent upward (upward direction) and a fourth bent portion 3114 is formed to extend from the third bent portion 2713 and bent downward (downward direction).

That is, when each of the second electrode rods is bent two or more times, at least one second electrode rod may be provided to be bent in a different direction from the remaining second electrode rods.

In particular, the first bent portion and the third bent portion may be provided to be bent in different directions, and the second bent portion and the fourth bent portion may be formed to be bent in different directions.

As another embodiment of the first embodiment, as shown in FIG. 6, when three second electrode rods 311 are provided, two second electrode rods 311a and 311c spaced apart from each other by a certain interval may be formed to each include a first bent portion 3111a bent downward.

In this case, on the other hand, the remaining second electrode rod 311b formed between the two second electrode rods may be formed to include a second bent portion 3113a bent upward.

That is, when each of the second electrode rods is formed to be bent one time, the first bent portion and the second bent portion may be formed to be bent in different directions so that the certain space S2 may be formed between the second electrode rods.

In addition, the second electrode terminal 310 may include a third connection portion 312 which is formed to extend from the second electrode rod 311 and is electrically connected to the first electrode terminal.

The plurality of second electrode rods 311 and the third connection portion 312 may be formed integrally.

That is, the third connection portion 312 may be in contact with the bent portion of the first electrode rod or may be inserted into the space between bent portions of the first electrode rods to be electrically connected to the first electrode terminal.

In addition, when the second cap 30 is mounted on the inner frame 500, the plurality of second electrode rods 311 may be provided such that at least partial areas thereof are exposed at a space between the inner frame 500 and the outer frame 600.

In addition, the third electrode terminal 710 may include a fourth connection portion 711 which is in contact with the bent portion of the second electrode rod of the second electrode terminal or is inserted into the space S2 between bent portions of the second electrode rods and a fifth connection portion 712 which is formed to extend from the fourth connection portion 711 and electrically connects two solar cell modules 10 (11 and 12) adjacent to each other in the length direction of the inner frame 500.

In addition, the connector part 70 includes a connection member 720 which surrounds each of the third electrode terminals 710 and one pair of mounting members 730 which are connected to the connection member 720, are positioned at vertical end portions of the third electrode terminals 710 to expose the third electrode terminals 710, and are provided to be mounted on the second cap 30.

Here, the fourth connection portion 711 of the third electrode terminal 710 may be positioned at a side of the mounting member 730 exposed to the outside, and the fifth connection portion 712 may be provided at a side of the connection member 720.

Due to such a configuration, there is an effect that the first to third electrode terminals can be electrically connected more stably.

Meanwhile, FIG. 7 is a perspective view illustrating the solar cell panel 110 according to the first embodiment of the present invention.

Referring to FIG. 7, the solar cell panel 110 includes the one pair of terminal portions 111 provided at both end portions thereof.

The solar cell panel 110 (also referred to as "photovoltaic module") is provided to extend in a length direction and includes first and second terminals 111a and 111b at both end portions thereof (first and second end portions).

The first terminal 111a may have any one of positive polarity and negative polarity, and the second terminal 111b may have the other one of positive polarity and negative polarity.

In addition, the solar cell panel may include, for example, a glass 1101, one or more encapsulants (EVA) 1102 and 1104, one or more solar cells 1100, a cell string 1103 for connecting the solar cells 1100 in series, and a back sheet 1105.

Here, the solar cells 1100 may be connected in series through the cell string 1103 to constitute a solar battery (also referred to as "solar cell string").

The glass 1101 may be a surface on which sunlight is incident and may serve to protect the solar battery disposed thereunder from an external environment and to scatter light to allow reflected light to be incident again.

As an example, the glass may protect the solar battery, which is easily broken when external hail or fire occurs, from an impact and an external flame.

Here, although a thickness of the glass may be 2.8 mm, the present invention is not limited thereto, and the thickness of the glass may be 2.8 mm or less or less than 2.8 mm.

Specifically, the thickness of the glass may be in a range of 0.1 mm to 2.8 mm, 0.2 mm to 2.7 mm, 0.3 mm to 2.6 mm, 0.4 mm to 2.5 mm, 0.5 mm to 2.4 mm, 0.6 mm to 2.3 mm, 0.7 mm to 2.2 mm, 0.8 mm to 2.1 mm, 0.9 mm to 2.0 mm, 1.0 mm to 1.9 mm, 1.1 mm to 1.8 mm, 1.2 mm to 1.7 mm, 1.3 mm to 1.6 mm, or 1.4 mm to 1.5 mm, but the present invention is not limited thereto.

More specifically, the glass 1101 of the solar cell panel 110 may have a first surface on which light is incident and a second surface which faces the solar battery in a direction opposite to the first surface. The first surface may be a surface that is anti-reflection-coated (AR-coated) and may be a non-patterned surface.

Due to the AR coating, when light reaches the first surface, an amount of the light which does not pass through the first surface and is reflected from the first surface and emitted to the outside is reduced.

Here, the first surface and the second surface may be AR-coated, or only the first surface may be AR-coated.

More preferably, the first surface on which a pattern is not formed is AR-coated, thereby uniformly forming the thickness of the glass.

The light (sunlight) may sequentially pass through the first surface and the second surface of the glass to be incident on the solar battery.

In addition, a certain pattern may be formed on the second surface of the glass 1101. As an example, the certain pattern may be an embossed pattern forming an unevenness on the second surface (not shown).

The certain pattern formed on the second surface of the glass scatters incident light and serves to scatter light reflected from the solar battery or the back sheet to allow the reflected light to be incident again.

That is, due to the certain pattern, incident light is scattered, light reflected from the solar battery is not immediately emitted to the outside, and the reflected light toward the outside is scattered and incident again, thereby increasing an amount of power generated by the solar battery.

Here, when the certain pattern is formed on the first surface, the pattern is vulnerable to contamination such as dust, and thus the pattern may be formed only on the second surface, but the present invention is not limited thereto.

The glass 1101 may be low iron tempered glass but is not limited thereto.

Here, the glass 1101 may be manufactured using a thermal strengthening method, but when the glass 1101 is manufactured using chemical strengthening, the glass 1101 having a thickness of 1 mm or less may be manufactured.

The solar battery may be manufactured by serially connecting cells, which are cut in half corresponding to a size of a conventional louver blade, through the cell string 1103.

For example, like a general battery, in the case of P-type solar cells, a surface on which light is incident forms a negative pole, and a surface opposite thereto forms a positive pole. In this case, in order to arrange solar cells in a row to connect a positive pole and a negative pole to each other, a ribbon (electrode wire) attached to an upper surface (negative surface) of a solar cell is attached and connected in series to a rear surface (positive surface) of an adjacent solar cell to form a cell string that is one line in which the solar cell and the solar cell are connected, thereby forming a solar battery (solar cell string).

In addition, the encapsulants 1102 and 1104 surround the solar battery and are positioned between the glass 1101 and the back sheet 1105, thereby serving to mitigate a direct impact transmitted to the solar battery and prevent moisture or contaminants from directly affecting the solar battery.

In addition, like the glass 1101, the back sheet 1105 serves to protect the solar battery from an external environment.

FIG. 8 shows views illustrating a state in which the plurality of solar cell modules of FIG. 2 are electrically connected.

Referring to FIG. 8, the plurality of solar cell modules 10 each include the solar cell panel unit 100 including the one pair of terminal portions 111 provided at both end portions thereof, the one pair of first electrode terminals 270 electrically connected to the terminal portions 111, and the one pair of first caps 200 mounted on the solar cell panel unit 100 to surround the first electrode terminals 270.

More specifically, the solar cell panel unit 100 includes the solar cell panel 110 including the one pair of terminal portions 111 provided at both end portions of the solar cell panel 110 and a blade frame 120 on which the solar cell panel is mounted.

In addition, the solar cell panel unit 100 further includes a bypass diode 160 electrically connected to the solar cell panel 110.

Here, the bypass diode 160 may be an element for preventing power loss due to a shadow generated on the solar cell panel 110.

The solar cell modules 10 include a first solar cell module 11 and a second solar cell module 12.

The first solar cell module 11 includes the solar cell panel unit 100 including the one pair of terminal portions 111 provided at both end portions thereof, the one pair of first electrode terminals 270 electrically connected to the terminal portions 111, and the one pair of first caps 200 mounted on the solar cell panel unit 100 to surround the first electrode terminals 270.

In addition, the second solar cell module 12 includes the solar cell panel unit 100 including the one pair of terminal portions 111 provided at both end portions thereof, the one pair of first electrode terminals 270 electrically connected to the terminal portions 111, and the one pair of first caps 200 mounted on the solar cell panel unit 100 to surround the first electrode terminals 270.

Here, in the one pair of terminal portions of the first solar cell module 11, the first terminal 111a of a first end portion (left end portion of FIG. 8) has negative polarity, and the second terminal 111b of a second end portion (right end portion of FIG. 8) has positive polarity.

In this case, in the one pair of terminal portions of the second solar cell module 12, the first terminal 111a of a first end portion (left end portion of FIG. 8) has positive polarity, and the second terminal 111b of a second end portion (right end portion of FIG. 8) has negative polarity.

In other words, when the first terminal 111a of the first solar cell module 11 has any one polarity of positive polarity and negative polarity, the first terminal 111a of the second solar cell module 12 is disposed to have the other polarity of positive polarity and negative polarity.

The first solar cell modules 11 and the second solar cell modules 12 may be alternately disposed in the length direction (vertical direction) of the inner frame 500.

That is, when the plurality of solar cell modules 10 are each disposed in the length direction (vertical direction) of the inner frame 500, terminal portions of two solar cell modules adjacent to each other in the vertical direction may be disposed to have different polarities.

Accordingly, the terminal portions of the first solar cell module 11 and the second solar cell module 12 may be disposed to have different polarities in the vertical direction so that the first solar cell module 11 and the second solar cell module 12 may be connected in series through the connector part 70.

FIG. 9 shows a perspective view and a side cross-sectional view of the blade frame 120 on which the solar cell panel 110 is mounted according to the first embodiment of the present invention.

Referring to FIG. 9, the blade frame 120 is formed to extend in a length direction (horizontal direction) and includes a base frame 121 for supporting the solar cell panel 110.

The base frame 121 includes a plurality of first partition members 122 which partition the interior of the base frame such that each of first to third hollow chambers 1211, 1212, and 1213 having a certain space therein is formed.

In addition, the blade frame 120 includes fixing grooves 130 formed such that the solar cell panel 110 is fixedly inserted therein.

The fixing groove 130 may be formed to have both open ends in a length direction (horizontal direction) such that the solar cell panel 110 may be slide-inserted through a side of the fixing groove 130, and a cross-sectional shape thereof may be formed in an approximately "c" shape so that the solar cell panel 110 may be fit-assembled to the fixing groove 130.

The fixing grooves 130 may be formed in portions protruding from both side end portions of the base frame 121 in the vertical direction, that is, portions protruding from upper and lower side portions of the base frame.

In addition, in an upper end portion of the blade frame 120, first and second grooves 123 and 124, which are recessed inward from a front surface to a rear surface of the base frame 121, may be formed apart from each other by a certain interval in the vertical direction.

Here, the first and second grooves 123 and 124 may be recessed inward in a length direction (horizontal direction).

At a lower end portion of the blade frame 120, first and second protrusions 125 and 126 to be inserted into (seated in) the first and second grooves 123 and 124 of another blade frame may be provided apart from each other by a certain interval in the vertical direction.

The first and second protrusions 125 and 126 may be provided to protrude outward from the base frame in a length direction (horizontal direction).

Here, the first and second protrusions 125 and 126 may be provided to correspond to positions of the first and second grooves 123 and 124 of another adjacent blade frame in the vertical direction.

In addition, the base frame 121 in an area of the second hollow chamber 1212 includes a bypass diode insertion portion 140 formed such that the bypass diode is inserted therein.

The bypass diode insertion portion 140 may be formed to be recessed to a certain depth inward from the front surface to the rear surface in a length direction (horizontal direction).

The bypass diode 160 may be disposed in the bypass diode insertion portion 140 to be electrically connected to the solar cell panel 110.

In particular, bypass diode connection portions 112 to which the bypass diode is electrically connected may be provided at both end portions of the solar cell panel 110.

In addition, the blade frame 120 includes a first mounting groove 150 for mounting a blade gasket 170 provided to shield a partial area of the fixing groove of another blade frame disposed adjacent to the lower portion thereof.

The first mounting groove 150 may be formed as a certain groove at one end portion (lower end portion) of the blade frame 120 such that the blade gasket 170 formed to extend in a length direction (horizontal direction) is insertion-mounted therein.

In particular, the blade gasket 170 may be provided such that one side thereof is mounted in the first mounting groove 150 and the other side thereof is in contact with the fixing groove at an upper portion of another blade frame disposed adjacent to a lower portion thereof to cover the fixing groove.

An amount of air flow between the solar cell modules is suppressed by the blade gasket 170, thereby improving the airtightness of a solar cell louver assembly.

When the solar cell panel 110 is mounted in the fixing groove 130 of the blade frame 120, at least partial areas of the solar cell panel 110 may be mounted to protrude further than both end portions of the blade frame 120 in a length direction.

That is, a length of the solar cell panel 110 in the length direction may be formed to be greater than a length of the blade frame 120 in the length direction.

In particular, partial areas of the solar cell panel 110, in which the first and second terminals 111a and 111b and the bypass diode connection portions 112 are provided, may be provided to protrude outward from both end portions of the blade frame 120.

FIG. 10 shows perspective views and a side cross-sectional view illustrating a state in which the blade frames 120 are disposed in the vertical direction according to the first embodiment of the present invention.

Referring to FIG. 10, when the two blade frames 120 (120a and 120b) are disposed adjacent to each other in the vertical direction, for convenience of description, it will be described that the blade frame at an upper side is referred to as a first blade frame 120a, and the blade frame disposed at a lower side is referred to as a second blade frame 120b.

The first and second protrusions 125 and 126 of the first blade frame 120a may be provided to be respectively inserted into the first and second grooves 123 and 124 of the second blade frame 120b so that the base frames 121 of the first and second blade frames 120a and 120b may be positioned to be approximately coplanar with each other in the vertical direction.

FIG. 11 shows views illustrating the first cap 200 provided with the first electrode terminal 270 according to the first embodiment of the present invention.

Referring to FIGS. 2 and 11, the one pair of first caps 200 may be mounted at both vertical end portions of the solar cell panel unit 100.

Specifically, each of the first caps 200 has a first surface 201 facing the solar cell panel unit 100 and a second surface 202 in a direction opposite to the first surface.

The first cap 200 includes a first protruding member 210 formed to protrude to a certain height from the first surface 201 and provided to be inserted into at least a partial area of the second hollow chamber 1212.

In addition, the first cap 200 includes a second protruding member 211 formed to protrude to a certain height from the first surface 201 and provided to be inserted into at least a partial area of the bypass diode insertion portion 140.

In addition, the first cap 200 includes a third protruding member 212 formed to protrude to a certain height from the first surface 201 and provided to be inserted into at least a partial area of the second hollow chamber 1212.

Here, the first protruding member 210 may be inserted into an upper portion of the second hollow chamber 1212, and the third protruding member 210 or 212 may be inserted into a lower portion of the second hollow chamber 1212.

That is, the first protruding member 210 and the third protruding member 212 may be inserted into the second hollow chamber 1212 with the bypass diode insertion portion 140 interposed therebetween.

The first to third protruding members 210, 211, and 212 may be respectively inserted into a partial area of the second hollow chamber 1212, the bypass diode insertion portion 140, and the remaining partial area of the second hollow chamber 1212 so that the first cap 200 may be fixed to the solar cell panel unit 100.

In addition, a first insertion groove 220, into which at least a partial area of the solar cell panel 110 mounted in the fixing groove 130 is inserted, is formed in the first surface 201 of the first cap 200.

The first insertion groove 220 may be provided to be recessed inward from the first surface 201 toward the second surface 202.

In addition, third and fourth grooves 231 and 232, which are formed to be recessed inward and correspond to the first and second grooves 123 and 124 of the upper end portion of the blade frame 120, may be formed in an upper end portion of the first cap 200.

Furthermore, third and fourth protrusions 233 and 234, which are formed to protrude outward and correspond to the first and second protrusions 125 and 126 of the lower end portion of the blade frame 120, may be provided at a lower end portion of the first cap 200.

Since the first surface 201 of the first cap 200 is formed to have an approximately flat surface, the first surface may be provided to shield an open side surface of the blade frame in a state in which at least a partial area of the solar cell panel is mounted in the first insertion groove 220.

In a state in which the first cap 200 is mounted on the solar cell panel unit 100, any one of the first terminal and the second terminal of the solar cell panel and a bypass diode terminal portion may be positioned inside the first insertion groove 220.

In addition, a first coupling part 240 provided to be coupled to the second cap may be provided on the second surface 202 of the first cap 200.

A certain first hollow portion 241 may be formed inside the first coupling part 240 such that a least a partial area of the first electrode terminal 270 and at least a partial area of the second electrode terminal 310 are each accommodated therein and electrically connected.

One side of the first hollow portion 241 may be open such that the second electrode terminal 310 provided in the second cap 30 is inserted therein.

That is, the first hollow portion may be open toward one end portion 240a (lower side) of the first coupling part 240.

In addition, first coupling grooves 250, which are recessed inward from both side surfaces of the first cap 200 by a certain degree, may be formed in both sides of the first coupling part 240 in a width direction.

In addition, the first cap 200 includes a fourth protruding member 260 provided to protrude outward from a side surface thereof by a certain angle.

The fourth protruding member 260 may be provided at the lower end portion of the first cap 200 and may be provided to protrude outward from a side surface at a rear surface thereof.

The first connection portion 272 and the second connection portion 273 of the first electrode terminal 270 are positioned to be exposed at a space inside the fixing groove 220, and the plurality of first electrode rods 271 are positioned to be exposed at a space inside the first hollow portion 241 of the first coupling part 240.

Accordingly, when each of the first caps 200 is mounted on the solar cell panel unit 100, the terminal portion 111 and the bypass diode connection portion 112 of the solar cell panel are inserted into the fixing groove 220, and the first connection portion and the second connection portion positioned in the fixing groove 220 of the first cap 200 are electrically connected to the terminal portion 111 and the bypass diode connection portion 112 of the solar cell panel, respectively.

Meanwhile, FIG. 11 shows views illustrating the second cap 30 according to the first embodiment of the present invention.

Referring to FIG. 11, the second cap 30 of the present invention may accommodate the first electrode terminal 270 and the second electrode terminal 310 electrically connected to the first electrode terminal 270, and may be provided as a plurality of second caps 30 such that the first caps 200 are mounted thereon.

The second cap 30 has a first surface 31 facing the first cap 200 and a second surface 32 in a direction opposite to the first surface.

In addition, the second cap 30 includes a first mounting part 320 having a certain space therein such that the first cap 200 is slide-insertion-mounted therein.

The first mounting part 320 may be formed to protrude to a certain height from the first surface such that both end portions thereof in a width direction w surround at least a partial area of the first cap, and both end portions thereof in a length direction may be open.

The first mounting part 320 includes one pair of first coupling protrusions 321 provided to be fixedly slide-inserted into the first coupling grooves 250 of the first cap 200.

The first mounting part 320 may include a stepped portion 323 protruding to a certain height outward from the first surface such that the one end portion 240a of the first coupling part 240 of the first cap 200 is fixedly caught thereon when the first cap 200 is slide-inserted in a length direction of the second cap 30.

In addition, the first mounting part 320 includes a first coupling member 325 provided to be fixedly inserted into the first hollow portion 241 of the first cap 200.

The first coupling member 325 may be formed to protrude upward from the first stepped portion 323, and a certain through-path may be formed therein.

In particular, at least a partial area of the second electrode terminal 310 may be exposed to the outside through the certain through-path of the first coupling member 325.

In addition, a first O-ring 327 for improving a fixing force may be fit-coupled to the first coupling member 325 when the first coupling member 325 is fixedly inserted into the first hollow portion 241.

A fitting groove 328, which is formed in a side surface of the first mounting part 320 such that the fourth protruding member 260 of the first cap is fixedly inserted thereinto, may be formed in a corresponding shape at a position corresponding to the fourth protruding member 260.

In addition, the second cap 30 includes a second mounting part 340 which is mounted on the frame unit 50 and is provided such that the connector part 70 is mounted thereon.

The second mounting part 340 includes a rotation member 350 having a certain second hollow portion 341 therein.

The rotation member 350 includes a second stepped portion 351 formed to protrude from the second surface 32 and one pair of first fixing pieces 352 further protruding from the second stepped portion.

The second hollow portion of the second mounting part 340 may be formed inside between the one pair of first fixing pieces 352, and the third electrode terminal may be provided to be inserted into the second hollow portion.

In particular, at least a partial area of the second electrode terminal may be provided to be positioned in the second hollow portion 341 of the second mounting part.

Specifically, the plurality of second electrode rods 311 of the second electrode terminal 310 may be positioned to be exposed at a space inside the second hollow portion 341 of the second mounting part, and the third connection portion 312 may be positioned to pass through the certain hollow of the first coupling member 325 and be exposed to the outside.

Accordingly, when the first cap 200 is mounted on the second cap, the first coupling member 325 of the second cap may be inserted into at least a partial area of the first hollow portion 241 of the first cap 200, and the plurality of first electrode rods 271 positioned in the first hollow portion 241 may be electrically connected to the third connection portion 312 passing through the first coupling member 325 to be exposed to the outside.

Meanwhile, FIG. 12 shows views illustrating a fixing member 400 according to the first embodiment of the present invention.

Referring to FIGS. 12, the second cap 30 includes the fixing member 400 mounted at a side of the second mounting part 340 of the second cap 30 and provided to rotatably support the second cap 30.

The fixing member 400 may be insertion-mounted in a frame through-hole 510 of the inner frame 500 to be described below to rotatably support the second cap 30.

The fixing member 400 is inserted into the frame through-hole 510 to assist the second cap 30 in rotating when the second cap 30 rotates and concurrently serve to reduce friction.

As an example, when the fixing member 400 is not mounted, the second cap 30 made of plastic may be easily worn due to friction with the frame through-hole of the inner frame made of aluminum.

The fixing member 400 may include a third stepped portion 410 fixedly inserted into the frame through-hole 510 to correspond to a shape of the frame through-hole 510 of the inner frame 500 and may have a first through-hole 420 passing through a central portion of the third stepped portion such that the rotation member 350 of the second cap 30 is insertion-mounted therein.

The third stepped portion 410 of the fixing member 400 may be mounted to pass through the frame through-hole 510 of the inner frame 500 to be exposed to the outside.

In this case, the second mounting part 340 of the second cap 30 may be mounted in the fixing member 400, and the first fixing pieces 352 pass through the first through-hole 420 to be exposed at the space between the inner frame 500 and the outer frame 600.

That is, the one pair of first fixing pieces 352 may be positioned in the space between the inner frame and the outer frame.

In addition, the fixing member 400 may surround and support at least partial areas of the second stepped portion 351 and the first fixing piece 352.

Meanwhile, FIGS. 13 and 14 show views illustrating the frame unit 50 according to the first embodiment of the present invention.

Referring to FIGS. 13 and 14, the frame unit 50 includes the inner frame 500 provided such that each of the plurality of second caps 30 is rotatably mounted in the length direction and the outer frame 600 surrounding the inner frame 500.

The frame unit 50 may have a certain space, and the plurality of solar cell modules 10 may each disposed in the certain space in the length direction and may be rotatably mounted.

More specifically, the inner frame 500 is formed to extend in the length direction (vertical direction) and includes a plurality of frame through-holes 510 formed apart from each other by a certain interval in the length direction.

The inner frame 500 may be provided at each end portion of the solar cell module 10.

Here, one pair of rod bars (not shown) may be provided at both sides of the inner frame 500 with the frame through-holes 510 therebetween to rotate the solar cell module 10, and a plurality of protruding bar fixing holes (not shown), which are formed such that one pair of protruding bars 739 provided in the connector part 70 are fixedly inserted therein, may be formed at positions corresponding to the one pair of protruding bars 739.

The inner frame 500 may have one pair of first fitting grooves 520 formed to extend in the length direction.

The one pair of first fitting grooves 520 may be formed in both end portions of the inner frame 500 in a width direction.

The outer frame 600 includes one pair of side frames 610 formed to extend in a length direction and provided to surround side surfaces of the inner frames and upper and lower frames 620 and 630 connecting both end portions of the one pair of side frames 610 in the length direction.

Each of the side frames 610 may include first insertion protrusions 611 inserted into the first fitting grooves 520.

Each of the side frames 610 may be provided with a certain space 601 such that the connector part 70 may be disposed therein in a state in which the inner frame 500 is mounted.

In addition, the outer frame 600 includes assembly members 650 for connecting the side frame and the upper frame or the side frame and the lower frame.

The assembly member 650 may be provided with an approximately "]" shape, at least a partial area thereof may be inserted into the upper frame or the lower frame, and the remaining partial area thereof may be inserted into the side frame to connect the upper frame and the side frame or the lower frame and the side frame.

In addition, the outer frame 600 includes one pair of guide members 660 mounted on the upper and lower frames 620 and 630 and one pair of guide slit members 670 mounted on the guide members 660.

The upper and lower frames 620 and 630 each include one pair of second insertion protrusions 640 provided such that the guide members 660 are fit-coupled thereto.

The one pair of guide members 660 each have a second fitting groove 661 into which each of the one pair of second insertion protrusions 640 is inserted and a third fitting groove 662 into which the guide slit member 670 is inserted and fit-coupled thereto.

The first and second fitting grooves 520 and 661 may be slide-insertion-coupled to the first and second insertion protrusions 620 and 640, respectively.

Each of the guide slit members 670 may be provided with third and fourth grooves 671 and 672 having shapes corresponding to the first and second grooves of the blade frame.

In a state in which the plurality of solar cell modules 10 are mounted on the frame unit 50, the guide slit member 670 may be provided in contact with each of an upper end portion of the solar cell panel unit 100 positioned at an uppermost side and a lower end portion of the solar cell panel unit 100 positioned at a lowermost side.

In particular, the first and second protrusions 125 and 126 of the blade frame may be insertion-mounted in the third and fourth grooves of the guide slit member mounted on the lower frame.

In addition, the outer frame 600 may include an external connector 680 for outputting electricity output through the connector part 70 to an external unit.

The external connector 680 may be fixedly mounted, for example, on the side frame and may be provided to be electrically connected to the connector part 70.

FIG. 15 shows perspective views illustrating the connector part 70 according to the first embodiment of the present invention.

Referring to FIG. 15, the one pair of mounting members 730 each have one pair of second through-holes 731 formed such that the one pair of first fixing pieces 352 of the rotation member are insertion-mounted therein.

In addition, the one pair of mounting members 730 each include a second coupling member 732 provided between the one pair of second through-holes 731 and provided to be inserted into the second hollow portion 341 of the second mounting part 340.

The second coupling member 732 may have a certain through-path formed therein so that the fourth connection portion 711 of the third electrode terminal 710 is exposed to the outside through the through-path.

The second coupling member 732 may be provided to be connected to the connection member 720 surrounding the fifth connection portion 712.

The connection member 720 may electrically connect the fifth connection portions of the third electrode terminals to electrically connect two adjacent solar cell modules 10.

In addition, a second O-ring 734 for improving a fixing force may be fit-coupled to the second coupling member 732 when the second coupling member 732 is fixedly inserted into to the second hollow portion 341.

When the connector part 70 is mounted on the second cap, the second coupling member 732 may be fixedly inserted into the second hollow portion 341 of the second cap, and the plurality of second electrode rods 311 of the second electrode terminal 310 and the fourth connection portion 711, which are exposed at the second hollow portion 341, may be electrically connected.

In addition, the connector part 70 includes one pair of protruding bars 739 provided to rotate the solar cell module 10 at a certain angle.

The one pair of protruding bars 739 are provided to protrude outward from the mounting member 730 and may be positioned apart from each other by a certain interval so as to face each other with the second coupling member 732 interposed therebetween.

FIG. 16 shows views illustrating a state in which the solar cell module is mounted on the second cap and the connector part is mounted on the second cap according to the first embodiment of the present invention. FIG. 17 is a view illustrating a state in which a solar cell louver assembly is connected in series according to the first embodiment of the present invention.

Referring to FIG. 16, the second cap 30 may be in a state of being rotated at a certain angle in a state of being mounted on the inner frame 50.

In the above state, the solar cell module 10 may be slide-insertion-mounted on the second cap 30 downward.

That is, the first electrode terminal 270 and the second electrode terminal 310 may be provided to be inserted in the length direction of the inner frame.

In a state in which the solar cell module is mounted on the second cap as described above, the connector part 70 may be mounted to the rotation member of the second cap.

The connector part 70 of the present invention is a component for connecting the solar cell modules 10 in series, and an arrangement of the connector part 70 for connecting the solar cell modules 10 in series is as follows.

Referring to FIGS. 1, 13, and 16, for convenience of description, when the first solar cell module 11 and the second solar cell module 12 are alternately disposed in a vertical direction of the frame unit, the first solar cell module 11 disposed under the second solar cell module 12 may be referred to as a third solar cell module, and the second solar cell module disposed under the third solar cell module may be referred to as a fourth solar cell module.

In this case, based on a direction from the top to the bottom, connections of right end portions and left end portions of the first to fourth solar cell modules will be described.

For example, in order for a plurality of solar cell modules 10 and 10' to be electrically connected to each other and connected in series, the connector part 70 is disposed at the right end portions of the first solar cell module 11 and the second solar cell module 12 to electrically connect the right end portions of the first and second solar cell modules.

In this case, the connector part 70 is disposed at left end portions of the second solar cell module 12 and another first solar cell module (third solar cell module 11') positioned under the second solar cell module to electrically connect the left end portions of the second solar cell module 12 and the third solar cell module 11'.

In addition, the connector part 70 is disposed at right end portions of the third solar cell module 11' and a fourth solar cell module 12' to electrically connect the right end portions of the third and fourth solar cell modules.

Such a configuration is repeated to install the connector parts, thereby electrically connecting the plurality of solar cell modules in series.

That is, the connector parts 70 may be alternatively connected to the left end portion and the right end portion for serial connection.

Since such connection can be made in the space between the inner frame and the outer frame, electrical wires are not exposed to the outside.

In addition, since the louver assembly of the present invention can be assembled in the same manner as in a conventional louver window, assembly is easier.

In addition, the louver assembly can serve as a louver window, and concurrently, the series-connected solar cell panels can generate electricity.

Hereinafter, the louver assembly 1 according to the second embodiment of the present invention will be described with reference to the accompanying FIGS. 18 to 46.

FIG. 18 shows perspective views illustrating a front surface and a rear surface of the louver assembly 1 according to the second embodiment of the present invention. FIG. 19 is an exploded perspective view illustrating a solar cell module according to the second embodiment of the present invention. FIG. 20 is an exploded perspective view illustrating the solar cell module and second caps according to the second embodiment of the present invention. FIG. 21 is a partial perspective view illustrating electrical connections of a terminal portion of a solar cell panel and first to third electrode terminals according to the second embodiment of the present invention. FIG. 22 is an exploded perspective view of the first to third electrode terminals according to the second embodiment of the present invention. FIG. 23 is an exploded perspective view illustrating the second electrode terminal and a terminal housing of FIG. 22. FIG. 24 is a perspective view illustrating a configuration in which solar cell modules are electrically connected in series by a connector part according to the second embodiment of the present invention.

Referring to FIGS. 18 to 24, the louver assembly 1 on which a solar cell panel is mounted (hereinafter, referred to as "louver assembly") according to one embodiment of the present invention includes one or more solar cell modules 10, second caps 30, a frame unit 50, and connector parts 70.

Specifically, referring to FIGS. 19 to 21, the one or more solar cell modules 10 each include a solar cell panel unit 100 including one pair of terminal portions 111 (111*a* and 111*b*) provided at both end portions thereof, one pair of first electrode terminals 270 electrically connected to the terminal portions 111, and one pair of first caps 200 mounted on the solar cell panel unit 100 to surround the first electrode terminals 270.

The solar cell panel unit 100 includes a solar cell panel 110 provided to generate electricity using incident light and a blade frame 120 on which the solar cell panel is mounted.

That is, the blade frame 120 may support the solar cell panel.

The first cap 200 includes the first electrode terminal 270 electrically connected to the terminal portion 111.

Here, each of the first electrode terminals 270 may be detachably mounted inside one of the first caps 200. That is, the first electrode terminal 270 may be assembled and mounted inside the first cap 200.

In addition, referring to FIG. 3, the second cap 30 includes a second electrode terminal 310 electrically connected to the first electrode terminal 270 and a terminal housing 312 surrounding at least a portion of the second electrode terminal 310.

Here, the second electrode terminal 310 may be formed integrally with the terminal housing 312 through insert injection molding and may be detachably mounted inside the second cap 30.

In the present document, insert injection molding refers to commonly used insert injection molding (insert molding) and means that a certain insert member is installed in an insert injection molding device in advance, and then a molten resin is injected onto the insert member to manufacture an insert-molded product as a final product.

That is, the second electrode terminal formed integrally with the terminal housing may be manufactured by injecting a molten resin onto the second electrode terminal 310 as an insert member to surround at least a portion of the second electrode terminal.

In other words, the second electrode terminal 310 may be insert-molded into the terminal housing 312 and formed integrally with the terminal housing 312 through insert injection molding.

The first cap 200 includes a first mounting part 200*a* provided to be mounted on the solar cell panel unit 100 and a second mounting part 200*b* provided in a direction opposite to the first mounting part 200*a* and mounted on the second cap 30.

Here, the first mounting part 200*a* of the first cap 200 refers to a part facing the solar cell panel unit 100, and the second mounting part 200*b* of the first cap 200 refers to a part facing the second cap 30.

The second cap 30 includes a third mounting part 320 on which the second mounting part 200*b* of the first cap 200 is mounted and a fourth mounting part 340 which is provided in a direction opposite to the third mounting part 320 and in which the connector part 70 is mounted.

In addition, the frame unit 50 may be provided such that each of the plurality of second caps 30 is rotatably mounted thereon.

Specifically, the frame unit 50 includes an inner frame 500 provided such that each of the plurality of second caps 30 is rotatably mounted thereon and an outer frame 600 surrounding the inner frame 500.

The plurality of second caps 30 may be mounted in a length direction of the inner frame 500.

In addition, the connector part 70 is disposed in a space between the inner frame 500 and the outer frame 600 and includes one pair of third electrode terminals 710 for electrically connecting the second electrode terminals 310 of two solar cell modules 10 (11 and 12) adjacent to each other in the length direction of the inner frame when the plurality of solar cell modules 10 are mounted on the frame unit 50.

More specifically, referring to FIGS. 19 to 22, when the first cap 200 is mounted on the second cap 30, the second electrode terminal 310 may be provided in contact with the first electrode terminal 270, and when the connector part 70 is mounted on the second cap 30, the third electrode terminal 710 may be provided in contact with the second electrode terminal 310.

That is, the second electrode terminal 310 may be in physical contact (direct contact) with and electrically connected to the first electrode terminal 270, and the third electrode terminal 710 may be in physical contact (direct contact) with and electrically connected to the second electrode terminal 310. Thus, the first electrode terminal 270 and the third electrode terminal 710 may be electrically connected.

In addition, the first electrode terminal 270 may be physical contact (direct contact) with and electrically connected to the terminal portion 111 of the solar cell panel, and thus, the terminal portion 111 and the third electrode terminal 710 may be electrically connected.

In particular, two solar cell modules 10 adjacent to each other in a vertical direction may be electrically connected by the third electrode terminals mounted inside each of one pair of connector parts 70 and electrically connected.

Here, in a state in which the second cap 30 including the second electrode terminal 310 is mounted on the inner frame 500, the first electrode terminal 270 may be provided to be mounted in the length direction of the inner frame 500, and the third electrode terminal 710 may be provided to be mounted in a direction perpendicular to the length direction of the inner frame 500.

In addition, one terminal of the first and second electrode terminals 270 and 310 may be provided with a space into which the other terminal is inserted, and when the first cap 200 is mounted on the second cap 30, one terminal of the first and second electrode terminals 270 and 310 may be inserted into the other terminal thereof.

In addition, one terminal of the second and third electrode terminals 310 and 710 may be provided with a space into which the other terminal thereof is inserted, and when the connector part 70 is mounted on the second cap 30, one terminal of the second and third electrode terminals 310 and 710 may be inserted into the other terminal thereof.

Referring to FIG. 22, the first electrode terminal 270 includes a first terminal portion 271 electrically connected to the terminal portion 111 of the solar cell panel 110, a second terminal portion 272 electrically connected to the second electrode terminal 310, and a third terminal portion 273 connecting the first terminal portion 271 and the second terminal portion 272.

More specifically, referring to FIGS. 22 to 24, the first terminal portion 271 may be provided to be in physical contact (direct contact) with the terminal portion 111 of the solar cell panel unit 100.

In addition, the second terminal portion 272 may be formed apart from the first terminal portion 272 by a certain interval, and a first space S1 into which the second electrode terminal 310 is inserted may be formed.

In a state in which the first electrode terminal 270 is assembled in the first cap 200, the first terminal portion 271 may have a certain space 2711 formed therein to press the terminal portion 111 of the solar cell panel unit to be in contact therewith and may be formed to protrude outward.

In particular, the first terminal portion 271 may be formed to have a certain inclined surface when the space 2711 is formed therein.

When the first cap 200 is mounted on the solar cell panel unit 100, the first terminal portion 271 may be in contact with the terminal portion 111 and press the terminal portion 111 through the certain inclined surface and concurrently may be slidably inserted into the terminal portion 111 of the solar cell panel unit 100. Thus, the assembly and electrical connection (direct contact) of the terminal portions become easier.

As an example, the first terminal portion 271 may be formed to have the space 2711 therein by an end portion of the first terminal portion 271 being bent inward, but the present invention is not limited thereto.

In addition, the second terminal portion 272 may have an approximately "U" shape
by both end portions of the second terminal portion 272 being bent inward in a width direction.

In this case, the both end portions of the second terminal portion 272 may be provided apart from each other by a certain interval and may form the first space S1 into which the second electrode terminal 310 is inserted.

In a state in which the second electrode terminal 310 is inserted into the first space S1 of the second terminal portion, the second terminal portion 272 may surround at least a partial area of the second electrode terminal 310 and may be in physical contact (direct contact) with and electrically connected to the second electrode terminal 310.

The third terminal portion 273 of the first electrode terminal 270 may be provided with a certain width W and a certain length L so as to be assembled by being fit-coupled inside the first cap 200 and may have an approximately "c" shape with an open lower side.

In addition, one end portion 273a of the third terminal portion 273 may be formed to extend downward from the first terminal portion 271. Here, the first to third terminal portions 271, 272, and 273 may be formed integrally.

In addition, in a state in which the second electrode terminal 310 is formed integrally with the terminal housing 312 through insert injection molding, the second electrode terminal 310 includes a fourth terminal portion 3101 of which at least a partial area is exposed to the outside toward the second terminal portion 272 of the first electrode terminal 270.

The fourth terminal portion 3101 may be formed to have a flat surface with an approximately flat plate shape so as to be easily inserted into the first space S1.

In addition, the second electrode terminal 310 includes a fifth terminal portion 3102 which is formed to extend from the fourth terminal portion 3101 and of which at least a partial area is exposed to the outside toward the third electrode terminal 710.

At least a partial area (also referred to as "first area") of the fourth terminal portion 3101 may be exposed to the outside, and the remaining area (also referred to as "second area") thereof may be positioned inside the terminal housing 312.

As an example, the fourth terminal portion 3101 may have an approximately "U" shape, the first area of the fourth terminal portion 3101 may be positioned at one end portion of the fourth terminal portion, and the fifth terminal portion 3102 may be formed to protrude toward the third electrode terminal 710 from the other end portion in a direction opposite to one end portion of the fourth terminal portion.

The terminal housing 312 includes a first housing portion 3121 surrounding a partial area of the fourth terminal portion 3101, a second housing portion 3122 formed to extend from the first housing portion 3121 and surrounding the remaining area of the fourth terminal portion, and a head portion 3123 formed to extend from the second housing portion 3122 and surrounding at least a partial area of the fifth terminal portion.

The first and second housing portions 3121 and 3122 may have a shape corresponding to the fourth terminal portion 3101 and may have an approximately "U" shape.

In addition, one terminal portion of the second terminal portion 272 of the first electrode terminal 270 and the fourth terminal portion 3101 of the second electrode terminal 310 may be provided with a space into which the other terminal portion thereof is inserted, and when the first cap 200 is mounted on the second cap 30, one terminal portion of the second terminal portion 272 and the fourth terminal portion 3101 may be inserted into the other terminal portion thereof.

In addition, the first housing portion 3121 includes a first O-ring mounting portion 3124 which is recessed inward in at least a partial area thereof in a circumferential direction such that a first O-ring is mounted thereon.

Therefore, when an O-ring O1 is mounted on the first O-ring mounting portion 3124 and the first housing portion 3121 is inserted into a first hollow portion 241 of the first cap 200, a sealing force can be improved.

In addition, a mounting groove 3125 is formed in at least a partial area of the second housing portion 3122 to be recessed inward such that the second housing portion 3122 is fixedly inserted into the second cap.

In addition, the head portion 3123 includes a second O-ring mounting portion 3126 which is recessed inward in at least a partial area thereof in a circumferential direction such that a second O-ring is mounted thereon.

Here, when a second O-ring O2 is mounted on the second O-ring mounting portion 3126 and the second electrode terminal 310 is assembled inside the second cap, a sealing force in the second cap 30 can be improved.

Meanwhile, as another embodiment, although not shown in the drawings, the fourth terminal portion 3101 may be provided with a space, into which the second terminal portion 272 of the first electrode terminal is inserted, formed therein.

That is, the first area of the fourth terminal portion 3101 (at least a partial area of the fourth terminal portion) may be provided with an approximately "U" shape by both end portions thereof in a width direction being bent inward to be provided with a certain space therein.

Accordingly, the second terminal portion 272 inserted into the space formed inside the fourth terminal portion may be formed to have a flat surface with an approximately flat plate shape.

In addition, one terminal of the second and third electrode terminals 310 and 710 may be provided with a space into which the other terminal thereof is inserted, and when the connector part 70 is mounted on the second cap 30, one terminal of the second and third electrode terminals 310 and 710 may be inserted into the other terminal thereof.

Specifically, one of the fifth terminal portion 3102 of the second electrode terminal 310 and a sixth terminal portion 711 of the third electrode terminal 710 may be provided with a space into which the other thereof is inserted, and when the connector part 70 is mounted on the second cap 30, one of the fifth terminal portion 3102 and the sixth terminal portion 711 may be inserted into the other thereof.

More specifically, the sixth terminal portion 711 of the third electrode terminal 710 mounted in the connector part 70 may be formed to have a certain second space S2 therein such that the fifth terminal portion 3102 of the second electrode terminal 310 is inserted therein.

That is, in a state in which the fifth terminal portion 3102 is inserted into the second space S2 of the sixth terminal portion 711, the sixth terminal portion 711 may be provided to surround at least a partial area of the fifth terminal portion 3102.

As an example, the sixth terminal portion 711 may have an hollow cylindrical shape and may be provided such that a diameter thereof decreases toward one end portion thereof (toward the fifth terminal portion), but the present invention is not limited thereto.

Accordingly, the second electrode terminal and the third electrode terminal may be in physical contact (direct contact) with and electrically connected to each other.

In addition, the fifth terminal portion 3102 may have an approximately cylindrical shape to be easily inserted into the second space S2 inside the third electrode terminal 710, and an end portion thereof may be formed to be round.

Meanwhile, as another embodiment, although not shown in the drawings, the fifth terminal portion 3102 may be provided with a space, into which the third electrode terminal 710 is inserted, formed therein.

That is, at least a partial area of the fifth terminal portion 3102, which is exposed to the outside from a space inside a fifth hollow portion of the second cap 30, may be provided with a certain space formed therein so that the third electrode terminal 710 may be inserted therein.

In addition, when the second cap 30 is mounted on the inner frame 500, the fifth terminal portion 3102 of the second electrode terminal 310 may be provided such that at least a partial area thereof is exposed at the space between the inner frame 500 and the outer frame 600.

In addition, the third electrode terminal 710 includes a seventh terminal portion 712 formed to extend from the sixth terminal portion 711.

That is, the third electrode terminal 710 includes the sixth terminal portion 711 having the certain second space S2 therein and the seventh terminal portion 712 formed to extend from the sixth terminal portion 711.

In addition, the third electrode terminal 710 additionally includes a connection portion 720 for electrically connecting two solar cell modules 10 (11 and 12) adjacent to each other in the length direction of the inner frame 500.

Specifically, the connection portion 720 may electrically connect two third electrode terminals 710 adjacent to each other in the length direction of the inner frame 500.

The seventh terminal portion 712 includes a certain space formed such that at least a partial area of the connection portion 720 is inserted therein.

That is, the connection portion 720 electrically connecting the two third electrode terminals 710 adjacent to each other in the length direction of the inner frame 500 may be inserted into the certain space formed inside the seventh terminal portion 712 to electrically connect two adjacent solar cell modules 10.

Here, the connection portion 720 may be provided to be flexible and may be, for example, an electrical wire.

In addition, one pair of sealing portions 722 are included in at least partial areas of the connection portion 720 to seal the third electrode terminals 710 insertion-mounted in the connector parts 70.

In addition, the connector part 70 includes one pair of mounting members 730 which surround the third electrode terminals 710 and provided to be mounted on the second cap 30.

The one pair of mounting members 730 and the third electrode terminals 710 electrically connecting the mounting members 730 may be provided to electrically connect two solar cell modules 10 (11 and 12) which are adjacent vertically.

Due to such a configuration, the first to third electrode terminals can be more stable and can be electrically connected while effectively preventing the penetration of moisture.

FIGS. 25A and 25B illustrate a state in which the solar cell modules 10 are electrically connected according to the second embodiment of the present invention, and FIG. 25C is a view illustrating components of the solar cell panel 110 according to the second embodiment of the present invention.

Referring to FIGS. 19, 24, and 25, the plurality of solar cell modules 10 each include the solar cell panel unit 100 including the one pair of terminal portions 111 provided at both end portions thereof, the one pair of first electrode terminals 270 electrically connected to the terminal portions 111, and the one pair of first caps 200 mounted on the solar cell panel unit 100 to surround the first electrode terminals 270.

More specifically, the solar cell panel unit 100 includes the solar cell panel 110 including the one pair of terminal portions 111 provided at both end portions of the solar cell panel 110 and the blade frame 120 on which the solar cell panel is mounted.

The solar cell panel 110 (also referred to as "photovoltaic module") is provided to extend in a length direction and includes first and second terminals 111a and 111b at both end portions thereof (first and second end portions).

The first terminal 111a may have any one of positive polarity and negative polarity, and the second terminal 111b may have the other one of positive polarity and negative polarity.

In addition, the solar cell panel may include, for example, a glass 1101, one or more encapsulants (EVA) 1102 and 1104, solar cells 1100, and a back sheet 1105.

Here, the solar cells 1100 may be connected in series through a cell string 1103 to constitute a solar battery (also referred to as "solar cell string").

That is, the solar battery may be manufactured by serially connecting one or more solar cells 1100 through the cell string 1103.

The glass 1101 may be a surface on which sunlight is incident and may serve to protect the solar battery disposed thereunder from an external environment and to scatter light to allow reflected light to be incident again.

As an example, the glass may protect the solar battery, which is easily broken when external hail or fire occurs, from an impact and an external flame.

Here, although a thickness of the glass may be 2.8 mm, the present invention is not limited thereto, and the thickness of the glass may be 2.8 mm or less or less than 2.8 mm.

Specifically, the thickness of the glass may be in a range of 0.1 mm to 2.8 mm, 0.2 mm to 2.7 mm, 0.3 mm to 2.6 mm, 0.4 mm to 2.5 mm, 0.5 mm to 2.4 mm, 0.6 mm to 2.3 mm, 0.7 mm to 2.2 mm, 0.8 mm to 2.1 mm, 0.9 mm to 2.0 mm, 1.0 mm to 1.9 mm, 1.1 mm to 1.8 mm, 1.2 mm to 1.7 mm, 1.3 mm to 1.6 mm, or 1.4 mm to 1.5 mm, but the present invention is not limited thereto.

More specifically, the glass 1101 of the solar cell panel 110 may have a first surface on which light is incident and a second surface which faces the solar battery in a direction opposite to the first surface. The first surface may be a surface that is anti-reflection-coated (AR-coated) and may be a non-patterned surface.

Due to the AR coating, when light reaches the first surface, an amount of the light which does not pass through the first surface and is reflected from the first surface and emitted to the outside is reduced.

Here, the first surface and the second surface may be AR-coated, or only the first surface may be AR-coated.

More preferably, the first surface on which a pattern is not formed is AR-coated, thereby uniformly forming the thickness of the glass.

The light (sunlight) may sequentially pass through the first surface and the second surface of the glass to be incident on the solar battery.

In addition, a certain pattern may be formed on the second surface of the glass 1101. As an example, the certain pattern may be an embossed pattern forming an unevenness on the second surface (not shown).

The certain pattern formed on the second surface of the glass scatters incident light and serves to scatter light reflected from the solar battery or the back sheet to allow to the reflected light to be incident again.

That is, due to the certain pattern, incident light is scattered, light reflected from the solar battery is not immediately emitted to the outside, and reflected light emitted to the outside is scattered and incident again, thereby increasing an amount of power generated by the solar battery.

Here, when the certain pattern is formed on the first surface, the pattern is vulnerable to contamination such as dust, and thus the pattern may be formed only on the second surface, but the present invention is not limited thereto.

The glass 1101 may be low iron tempered glass but is not limited thereto.

Here, the glass 1101 may be manufactured using a thermal strengthening method, but when the glass 1101 is manufactured using chemical strengthening, the glass 1101 having a thickness of 1 mm or less may be manufactured.

The solar battery may be manufactured by serially connecting cells, which are cut in half corresponding to a size of a conventional louver blade, through the cell string 1103.

For example, like a general battery, in the case of P-type solar cells, a surface on which light is incident forms a negative pole, and a surface opposite thereto forms a positive pole. In this case, in order to arrange solar cells in a row to connect a positive pole and a negative pole to each other, a ribbon (electrode wire) attached to an upper surface (negative surface) of a solar cell is attached and connected in series to a rear surface (positive surface) of an adjacent solar cell to form a cell string that is one line in which the solar cell and the solar cell are connected, thereby forming a solar battery (solar cell string).

In addition, the encapsulants 1102 and 1104 surround the solar battery and are positioned between the glass 1101 and the back sheet 1105, thereby serving to mitigate a direct impact transmitted to the solar battery and prevent moisture or contaminants from directly affecting the solar battery.

In addition, in the solar cell panel, the glass, the encapsulant, the solar cell, the encapsulant, and the back sheet may be sequentially disposed based on a side on which light is incident.

In addition, like the glass 1101, the back sheet 1105 serves to protect the solar battery from an external environment.

Referring to FIG. 25, the solar cell modules 10 includes a first solar cell module 11 and a second solar cell module 12.

The first solar cell module 11 includes the solar cell panel unit 100 including the one pair of terminal portions 111 provided at both end portions thereof, the one pair of first electrode terminals 270 electrically connected to the terminal portions 111, and the one pair of first caps 200 mounted on the solar cell panel unit 100 to surround the first electrode terminals 270.

In addition, the second solar cell module 12 includes the solar cell panel unit 100 including the one pair of terminal portions 111 provided at both end portions thereof, the one pair of first electrode terminals 270 electrically connected to the terminal portions 111, and the one pair of first caps 200 mounted on the solar cell panel unit 100 to surround the first electrode terminals 270.

Here, in the one pair of terminal portions of the first solar cell module 11, the first terminal 111a of a first end portion (left end portion of FIG. 8) has negative polarity, and the second terminal 111b of a second end portion (right end portion of FIG. 8) has positive polarity.

In this case, in the one pair of terminal portions of the second solar cell module 12, the first terminal 111a of a first end portion (left end portion of FIG. 8) has positive polarity, and the second terminal 111b of a second end portion (right end portion of FIG. 8) has negative polarity.

In other words, when the first terminal 111a of the first solar cell module 11 has any one polarity of positive polarity and negative polarity, the first terminal 111a of the second solar cell module 12 is disposed to have the other polarity of positive polarity and negative polarity.

The first solar cell module 11 and the second solar cell module 12 may be alternately disposed in the length direction (vertical direction) of the inner frame 500.

That is, when the plurality of solar cell modules 10 are each disposed in the length direction (vertical direction) of the inner frame 500, terminal portions of two solar cell modules adjacent to each other in the vertical direction may be disposed to have different polarities.

Accordingly, the terminal portions of the first solar cell module 11 and the second solar cell module 12 may be disposed to have different polarities in the vertical direction so that the first solar cell module 11 and the second solar cell module 12 may be connected in series through the connector part 70.

FIG. 26 shows perspective views and a side cross-sectional view of the blade frame 120 on which the solar cell panel 110 is mounted according to the second embodiment of the present invention.

Referring to FIG. 26, the blade frame 120 is formed to extend in a length direction (horizontal direction) and includes a base frame 121 for supporting the solar cell panel 110.

The base frame 121 includes one or more first partition members 122 which partition the interior of the base frame such that each of first to third hollow chambers 1211, 1212, and 1213 having a certain space therein is formed In addition, the blade frame 120 includes fixing grooves 130 formed such that the solar cell panel 110 is fixedly inserted therein.

In the fixing groove 130, both end portions thereof in a length direction may be formed to be open, and a cross-sectional shape of both end portions thereof in a width direction may be formed as an approximately "c" shape so that the solar cell panel 110 may be fit-assembled into the fixing groove 130.

The fixing grooves 130 may be formed to protrude from both end portions of the base frame 121 in the vertical direction, wherein both of the end portions are upper and lower portions of the base frame.

In addition, in an upper end portion of the blade frame 120, first and second grooves 123 and 124, which are recessed inward from a front surface to a rear surface of the base frame 121, may be formed apart from each other by a certain interval in the vertical direction.

Here, the first and second grooves 123 and 124 may be recessed inward in a length direction (horizontal direction).

At a lower end portion of the blade frame 120, first and second protrusions 125 and 126 to be inserted into (seated in) the first and second grooves 123 and 124 of another blade frame may be provided apart from each other by a certain interval in the vertical direction.

The first and second protrusions 125 and 126 may be provided to protrude outward from the base frame in a length direction (horizontal direction).

Here, the first and second protrusions 125 and 126 may be formed to extend in the vertical direction and may be provided to correspond to positions of the first and second grooves 123 and 124 of another adjacent blade frame.

In addition, the base frame 121 may include a screw fixing portion 2431 in which a screw portion 2430 provided to fix the first cap 200 to the blade frame 120 is mounted.

Specifically, the screw fixing portion 2431 may be provided in the base frame in an area in which the second hollow chamber 1212 is positioned.

The screw fixing portion 2431 may have a first through-hole 2431a formed therein such that the screw portion 2430 is fixedly inserted therein, and the screw portion 2430 may pass through the first cap 200 to be fixedly fit-coupled in the first through-hole 2431a.

In addition, the blade frame 120 includes a blade gasket mounting groove 150 for mounting a blade gasket 170 provided in contact with and shield a partial area of the fixing groove of another blade frame disposed adjacent to the lower portion thereof in the vertical direction.

The blade gasket mounting groove 150 may be formed as a certain groove at one end portion (lower end portion) of the blade frame 120 in a width direction such that the blade gasket 170 formed to extend in a length direction (horizontal direction) is insertion-mounted therein.

In particular, the blade gasket 170 may be provided such that one side thereof is mounted in the first mounting groove 150 and the other side thereof is in contact with an outer peripheral surface of the fixing groove at an upper portion of another blade frame disposed adjacent to a lower portion thereof to cover at least a partial area of the fixing groove.

An amount of air flow between the solar cell modules is suppressed by the blade gasket 170, thereby improving the airtightness of a solar cell louver assembly.

When the solar cell panel 110 is mounted in the fixing groove 130 of the blade frame 120, at least partial areas of the solar cell panel 110 may be mounted to protrude further than both end portions of the blade frame 120 in a length direction.

That is, a length of the solar cell panel 110 in the length direction may be formed to be greater than a length of the blade frame 120 in the length direction.

In particular, partial areas of the solar cell panel 110, in which the first and second terminals 111a and 111b are provided, may be provided to protrude outward from both end portions of the blade frame 120.

In addition, when the two blade frames 120 (120a and 120b) are disposed adjacent to each other in the vertical direction, for convenience of description, it will be described that the blade frame at an upper side is referred to as a first blade frame 120a, and the blade frame disposed at a lower side is referred to as a second blade frame 120b.

The first and second protrusions 125 and 126 of the first blade frame 120a may be provided to be respectively inserted into the first and second grooves 123 and 124 of the second blade frame 120b so that the base frames 121 of the first and second blade frames 120a and 120b may be positioned to be approximately coplanar with each other in the vertical direction.

FIG. 27 shows views illustrating a sequence in which the solar cell panel unit 100 is mounted on the blade frame 120 according to the second embodiment of the present invention.

First, silicone or waterproof insulating silicone may be applied on at least a partial area of the base frame 121 on the front surface of the blade frame 120, and then the solar cell panel 110 may be insertion-mounted in the fixing groove 130.

After the solar cell panel 110 is inserted as shown in FIG. 27C (see the order of the numbers), silicone is cured to fix the solar cell panel 110 to the blade frame 120.

FIGS. 28 and 29 shows views illustrating the first cap 200 in which the first electrode terminal 270 is detachably mounted according to the second embodiment of the present invention.

Referring to FIGS. 28 and 29, the one pair of first caps 200 may be mounted on both end portions of the solar cell panel unit 100.

In addition, the one pair of first caps 200 each include a first gasket 113 for sealing a space between the solar cell panel unit 100 and the first cap 200 in a state in which the first electrode terminal 270 is insertion-mounted in the first cap 200.

In addition, each of the one pair of first caps 200 additionally includes the screw portion 2430 for firmly fixing the first cap 200 to the solar cell panel unit 100.

Here, the screw portion 2430 may be, for example, a flat head tapping screw but is not limited thereto.

Specifically, the first mounting part 200a of each first cap 200 has a first surface 201 facing the solar cell panel unit 100 and a second surface 202 in a direction opposite to the first surface.

The first mounting part 200a of the first cap 200 includes a first protruding member 210 formed to protrude to a certain height from the first surface 201 and provided to be inserted into at least a partial area of the first hollow chamber 1211.

In addition, the first mounting part 200a of the first cap 200 includes a second protruding member 211 formed to protrude to a certain height from the first surface 201 and provided to be inserted into at least a partial area of the second hollow chamber 1212.

Furthermore, the first mounting part 200a of the first cap 200 includes a third protruding member 212 formed to protrude to a certain height from the first surface 201 and provided to be inserted into at least a partial area of the third hollow chamber 1213.

The first to third protruding members 210, 211, and 212 may be respectively inserted into the first hollow chamber 1211, the second hollow chamber 1212, and the third hollow chamber 1213 so that the first cap 200 may be fixed to the solar cell panel unit 100.

Here, a second through-hole 243 passing through the first cap 200 may be formed between the first protruding member 210 and the second protruding member 211.

The second through-hole 243 may be a through-hole into which the screw portion 2430 for fixing the first cap 200 to the blade frame 120 is inserted.

The second through-hole 243 may be formed at a position corresponding to the first through-hole 2431a of the screw fixing portion 2431 of the blade frame 120.

In addition, the first cap 200 includes the second mounting part 200b formed to extend from the first mounting part 200a and coupled to the second cap.

The second mounting part 200b may be formed to be shorter than the first mounting part 200a in a length direction of the first mounting part 200a.

The second through-hole 243 may be a through-hole passing through the first and second mounting parts 200a and 200b of the first cap 200.

Accordingly, the screw portion 2430 may sequentially pass through the second mounting part 200b of the first cap 200 and the second surface 2020 and the first surface 201 of the first mounting part to be inserted into the first through-hole 2431a, thereby firmly fixing the first cap 200 to the solar cell panel unit 100.

In addition, a first insertion groove 220, into which at least a partial area of the solar cell panel 110 mounted in the fixing groove 130 is inserted, is formed in the first surface 201 of the first mounting part 200a.

The first insertion groove 220 may be formed to be recessed inward from the first surface 201 toward the second surface 202.

In addition, third and fourth grooves 231 and 232, which are formed to be recessed inward and correspond to the first and second grooves 123 and 124 of the upper end portion of the blade frame 120, may be formed in an upper end portion of the first cap 200.

Furthermore, third and fourth protrusions 233 and 234, which are formed to protrude outward and correspond to the first and second protrusions 125 and 126 of the lower end portion of the blade frame 120, may be provided at a lower end portion of the first cap 200.

The first insertion groove 220 includes a first terminal insertion portion 2201 having a certain space formed therein such that the first electrode terminal 270 is inserted therein.

In addition, the first insertion groove 220 includes a first terminal fixing portion 221 having an open side such that the first electrode terminal 270 is fit-coupled to be fixed in the first cap.

The first terminal fixing portion 221 may be provided at a position corresponding to the first terminal insertion portion 2201 so that, when the first electrode terminal 270 is mounted in the first terminal fixing portion 221, at least a partial area of the first electrode terminal 270 may pass through the first terminal insertion portion 2201 to be positioned inside the second mounting part.

As an example, the first terminal fixing portion 221 may be positioned to be collinear with the first hollow portion 241 to be described below.

The first terminal fixing portion 221 may be formed to protrude to a certain height from a bottom surface 220a of the first insertion groove 220 at a position corresponding to the first terminal insertion portion 2201.

In particular, a cross-sectional shape of both end portions of the first terminal fixing portion 221 may be formed as an approximately "c" shape, and thus, in a state in which the first electrode terminal 270 is fit-coupled to the first terminal fixing portion 221, the both end portions of the first terminal fixing portion 221 may be provided to surround at least a partial area of both end portions 273a and 273b of the third terminal portion 273 of the first electrode terminal.

Here, the first gasket 113 may be inserted into the first insertion groove 220 and fit-coupled and assembled therein to shield at least a partial area thereof.

Since the first surface 201 of the first cap 200 is formed to have an approximately flat surface, in a state in which at least a partial area of the solar cell panel is mounted in the first insertion groove 220, the first surface may be provided in close contact with and shield an open side surface of the blade frame.

In addition, the second mounting part 200b provided to be coupled to the second cap 30 may be provided on the second surface 202 of the first cap 200.

The second mounting part 200b includes the first hollow portion 241 in which at least a partial area of the terminal housing is accommodated and a first hollow portion through-hole 2401 formed in an inner peripheral surface of the first hollow portion 241 such that the fourth terminal portion of the second electrode terminal is inserted therein.

At least a partial area of the first electrode terminal 270 may be provided to be collinear with the first hollow portion 241.

In particular, the fourth terminal portion of the second electrode terminal may sequentially pass through the first hollow portion 241 and the first hollow portion through-hole 2401 and may be inserted into the first space S1 of the third terminal portion positioned inside the second mounting part and to be electrically connected to the third terminal portion.

That is, since the first hollow portion through-hole 2401 and the first space S1 of the third terminal portion may be positioned to be collinear with each other, when the fourth terminal portion is inserted, the fourth terminal portion is inserted into the first space S1, and thus the first electrode terminal and the second electrode terminal may to be electrically connected.

One side of the first hollow portion 241 may be open such that the second electrode terminal 310 provided in the second cap 30 is inserted therein.

That is, the first hollow portion may be open toward one end portion 200ba (lower side) of the second mounting part 200b.

Here, the first hollow portion through-hole 2401 may be connected to fluidly communicate with the first terminal insertion portion 2201 provided inside the first cap 200.

Therefore, in a state in which the first electrode terminal 270 is inserted into the first terminal fixing portion 221, the first terminal portion 271 is positioned to be exposed to the outside toward the solar cell panel 110, and the third terminal portion 273 is positioned to not be exposed at a space inside the first hollow portion 241.

In addition, first mounting grooves 250, which are recessed inward from both side surfaces of the first cap 200 by a certain degree, may be formed in both sides of the second mounting part 200b in a width direction.

In addition, the first cap 200 includes a first mounting member 260 provided to protrude outward from a side surface thereof.

The first mounting member 260 may be provided at the lower end portion of the first cap 200 and may be provided to protrude outward from the side surface thereof.

The first mounting member 260 may be provided with a downward inclined surface.

In addition, the first cap 200 has a second mounting groove 261 recessed inward from a side surface thereof.

The second mounting groove 261 may be provided on a different side surface from the first mounting member 260 and may be bent one or more times to have an approximately "L" shape.

FIG. 30 shows views illustrating a state in which the first electrode terminal and the first gasket are mounted in the first cap according to the second embodiment of the present invention. FIG. 31 shows views for describing a state in which the first electrode terminal and the first gasket are mounted in the solar cell panel 110 according to the second embodiment of the present invention.

Referring to FIGS. 30 and 31, the first gasket 113 includes a first sealing portion 1131 which is formed to extend in a length direction and has a length corresponding to the first insertion groove 220 and a second sealing portion 1133 which is formed to extend outward from the first sealing portion 1131 and is provided to surround the first terminal fixing portion 221.

The first sealing portion 1131 of the first gasket 113 shields the bottom surface 220a of the first insertion groove 220 and includes a panel sealing groove 1132 which surrounds one end portion of the solar cell panel 110 in the length direction and is recessed inward such that the one end portion of the solar cell panel 110 is fit-coupled thereto.

A second terminal insertion portion 1134 may be formed to pass between the first sealing portion 1131 and the second sealing portion 1133 to fluidly communicate with the first terminal insertion portion 2201 into which the first electrode terminal 270 is inserted.

Accordingly, in the first cap 200, in a state in which the first electrode terminal 270 is fixedly inserted into the first terminal fixing portion 221, the first gasket 113 may be inserted into the first insertion groove 220 to more firmly fix the first electrode terminal in the first cap 200.

In this case, the first terminal portion 271 of the first electrode terminal 270 may pass through the second terminal insertion portion 1134 of the first gasket 113 and positioned to be exposed to the outside.

In a state in which the first cap 200 is mounted on the solar cell panel unit 100, the first terminal portion 271 exposed to the outside as described above may be in physical contact with and electrically connected to the terminal portion 111 of the solar cell panel 110.

When the first gasket 113 formed as described above is mounted in the first cap 200 and fit-coupled to the solar cell panel unit 100, four surfaces of the solar cell panel 110 and the solar cell panel unit 100 are sealed to improve waterproof performance, thereby improving the waterproof and sealing properties between the solar cell panel unit 100 and the first cap 200.

In particular, when the first cap 200 is fixedly coupled to the solar cell panel unit 100, a fixing force can be further improved by an additional fixing force of the screw portion.

Meanwhile, FIGS. 32 and 33 show views illustrating the second cap 30 according to the second embodiment of the present invention. FIG. 34 is a cross-sectional view illustrating electrical connections of the first to third electrode terminals in a state in which the first cap, the second cap, and the connector part are mounted on the solar cell module according to the second embodiment of the present invention.

Referring to FIGS. 32 to 34, the second cap 30 may accommodate the first electrode terminal 270 and the second electrode terminal 310 electrically connected to first electrode terminal 270, and may be provided as a plurality of second caps 30 such that the first caps 200 are mounted thereon.

Here, the second electrode terminal and the terminal housing 312 surrounding at least a partial area of the second electrode terminal may be detachably mounted in the second cap 30.

The second cap 30 has a first surface 31 facing the first cap 200 and a second surface 32 in a direction opposite to the first surface.

In addition, the second cap 30 includes a third mounting part 320 having a certain space therein such that the first cap 200 is slide-insertion-mounted therein.

The third mounting part 320 may be formed to protrude to a certain height from the first surface such that both end portions thereof in a width direction surround at least a partial area of the first cap, and both end portions thereof in a length direction may be open.

The third mounting part 320 includes one pair of first coupling protrusions 321 provided to be fixedly slide-inserted into the first coupling grooves 250 of the first cap 200.

The third mounting part 320 includes a second terminal fixing portion 330 for detachably fixing the second electrode terminal 310.

When the first cap 200 is slide-inserted in a length direction of the second cap 30, the second electrode terminal fixed to the second terminal fixing portion may be inserted into the first hollow portion 241 and the first hollow portion through-hole 2401 of the third mounting part 320 to be electrically connected to the first electrode terminal.

The second terminal fixing portion 330 is provided such that the terminal housing 312 formed integrally with the second electrode terminal 310 is detachably fit-inserted and fixed therein.

The second terminal fixing portion 330 includes one pair of first mounting protrusions 332 provided to be fit-inserted into the mounting groove 3125 of the terminal housing 312 integrally formed with the second electrode terminal.

The one pair of first mounting protrusions 332 may be provided apart from each other by a certain interval and formed to protrude inward from the third mounting part 320 so as to have a certain space 331 (also referred to as "first insertion portion") therein.

In addition, the second terminal fixing portion 330 includes a second mounting protrusion 334 provided to surround and fix at least a partial area of the terminal housing 312.

The second mounting protrusion 334 is formed to protrude outward from the first surface 31 of the second cap 30 and have a certain space 333 (also referred to as "second insertion portion") therein.

One side of each of the certain spaces 331 and 333 may be open so that the terminal housing 312 formed integrally with the second electrode terminal may be inserted into the spaces 331 and 333.

In this case, the one pair of first mounting protrusions 332 may be fit-coupled to the mounting groove 3125 of the terminal housing 312 so that at least a partial area of the second housing portion 3122 may be fixedly seated in the first insertion portion 331.

At the same time, the remaining partial area of the second housing portion 3122 of the terminal housing 312 and the head portion 3123 may be inserted into the second insertion portion 333 and fixed by the second mounting protrusion 334.

Accordingly, the second electrode terminal 310 formed integrally with the terminal housing 312 may be detachably fixed in the second cap 30.

In a state in which the second electrode terminal 310 is fixed in the second cap 30 as described above, the first area of the fourth terminal portion 3101 of the second electrode terminal 310 may be provided to be exposed to the outside.

In particular, in a state in which the second electrode terminal 310 is fixed in the second cap 30 as described above, when the first cap 200 is mounted on the second cap 30, the first housing portion 3121 and the first area of the fourth terminal portion 3101 fixed in the second cap 30 may be inserted into the first hollow portion 241 of the first housing 3121 so that the second terminal portion 272 of the first electrode terminal and the fourth terminal portion 3101 of the second electrode terminal, which pass through the first hollow portion through-hole 2401 to be positioned inside the second mounting part, may be electrically connected.

In this case, a sealing force is improved by the first O-ring O1 mounted on the first O-ring mounting portion 3124 inserted into the first hollow portion 241 to prevent the penetration of moisture into the hollow portion 241 and the second mounting part, thereby improving waterproof performance.

A fitting groove 328 formed such that the first mounting member 260 of the first cap is fixedly inserted therein may be formed in a side surface of the third mounting part 320 at a position corresponding to the first mounting member 260.

A second coupling protrusion 329, which is inserted into the second mounting groove 261 of the first cap 200 to fix the first cap and the second cap, is included on a side surface of the third mounting part 320.

The second coupling protrusion 329 may be provided to correspond to a shape of the second mounting groove 261 and may be provided in an approximately "L" shape, but the present invention is not limited thereto.

In addition, the second cap 30 includes the fourth mounting part 340 which is mounted on the frame unit 50 and is provided such that the connector part 70 is mounted thereon.

The fourth mounting part 340 includes a rotation member 350 having a certain fifth hollow portion 341 therein.

The rotation member 350 includes a first stepped portion 351 formed to protrude from the second surface 32 and a first fixing portion 352 further protruding from the first stepped portion 351.

For example, the first fixing portion 352 may be provided in a hollow cylindrical shape.

The fifth hollow portion of the fourth mounting part 340 may be formed inside the first fixing portion 352, and the third electrode terminal may be provided to be inserted into the fifth hollow portion.

In particular, at least a partial area of the second electrode terminal may be provided to be positioned in the fifth hollow portion 341 of the fourth mounting part.

Specifically, the head portion 3123 of the terminal housing formed integrally with the second electrode terminal 310 and the fifth terminal portion 3102 exposed outward from the head portion 3123 may be positioned to be exposed at a space inside the fifth hollow portion 341 of the fourth mounting part.

Meanwhile, FIG. 35 shows views illustrating a fixing member 400 according to the second embodiment of the present invention.

Referring to FIG. 35, the second cap 30 includes the fixing member 400 mounted at a side of the fourth mounting part 340 of the second cap 30 and provided to rotatably support the second cap 30.

The fixing member 400 may be insertion-mounted in a frame through-hole 510 of the inner frame 500 to be described below to rotatably support the second cap 30.

The fixing member 400 is inserted into the frame through-hole 510 to assist the second cap 30 in rotating when the second cap 30 rotates and concurrently serve to reduce friction.

As an example, when the fixing member 400 is not mounted, the second cap 30 made of plastic may be easily worn due to friction with the frame through-hole of the inner frame made of aluminum.

The fixing member 400 may include a second stepped portion 410 fixedly inserted into the frame through-hole 510 to correspond to a shape of the frame through-hole 510 of the inner frame 500 and may have a fixing member through-hole 420 passing through a central portion of the second stepped portion such that the rotation member 350 of the second cap 30 is insertion-mounted therein.

The second stepped portion 410 of the fixing member 400 may be mounted to pass through the frame through-hole 510 of the inner frame 500 to be exposed to the outside.

In this case, the fourth mounting part 340 of the second cap 30 may be mounted to the fixing member 400, and the first fixing portion 352 passes through the fixing member through-hole 420 to be exposed at the space between the inner frame 500 and the outer frame 600.

That is, the first fixing portion 352 may be positioned in the space between the inner frame and the outer frame.

In addition, the fixing member 400 may surround and support at least partial areas of the first stepped portion 351 and the first fixing portion 352.

Meanwhile, FIGS. 36 and 37 show views for describing the frame unit 50 according to the second embodiment of the present invention.

Referring to FIGS. 36 and 37, the frame unit 50 includes the inner frame 500 provided such that each of the plurality of second caps 30 is rotatably mounted in a length direction and the outer frame 600 surrounding the inner frame 500.

The frame unit 50 may have a certain space, and the plurality of solar cell modules 10 may each disposed in the certain space in the length direction and may be rotatably mounted.

More specifically, the inner frame 500 is formed to extend in the length direction (vertical direction) and includes a plurality of frame through-holes 510 formed apart from each other by a certain interval in the length direction.

The inner frame 500 may be provided at each end portion of the solar cell module 10.

Here, one pair of rod bars (not shown) may be provided at both sides of the inner frame 500 with the frame through-holes 510 therebetween to rotate the solar cell module 10, and a plurality of protruding bar fixing holes (not shown), which are formed such that one pair of protruding bars 739 provided in the connector part 70 are fixedly inserted therein, may be formed at positions corresponding to the one pair of protruding bars 739.

The inner frame 500 may have one pair of first fitting grooves 520 formed to extend in the length direction.

The one pair of first fitting grooves 520 may be formed in both end portions of the inner frame 500 in a width direction.

The outer frame 600 includes one pair of side frames 610 formed to extend in a length direction and provided to surround side surfaces of the inner frames and upper and lower frames 620 and 630 connecting both end portions of the one pair of side frames 610 in the length direction.

Each of the side frames 610 may include first insertion protrusions 611 inserted into the first fitting grooves 520.

Each of the side frames 610 may be provided with a certain space 601 such that the connector part 70 may be disposed therein in a state in which the inner frame 500 is mounted.

In addition, the outer frame 600 includes assembly members 650 for connecting the side frame and the upper frame or the side frame and the lower frame.

The assembly member 650 may be provided with an approximately "]" shape, at least a partial area thereof may be inserted into the upper frame or the lower frame, and the remaining partial area thereof may be inserted into the side frame to connect the upper frame and the side frame or the lower frame and the side frame.

In addition, the outer frame 600 includes one pair of guide members 660 mounted on the upper and lower frames 620 and 630 and one pair of guide slit members 670 mounted on the guide members 660.

The upper and lower frames 620 and 630 each include one pair of second insertion protrusions 640 provided such that the guide members 660 are fit-coupled thereto.

The one pair of guide members 660 each have a second fitting groove 661 into which each of the one pair of second insertion protrusions 640 is inserted and a third fitting groove 662 into which the guide slit member 670 is inserted and fit-coupled thereto.

The first and second fitting grooves 520 and 661 may be slide-insertion-coupled to the first and second insertion protrusions 620 and 640, respectively.

Each of the guide slit members 670 may be provided with third and fourth grooves 671 and 672 having shapes corresponding to the first and second grooves of the blade frame.

In a state in which the plurality of solar cell modules 10 are mounted on the frame unit 50, the guide slit member 670 may be provided in contact with each of an upper end portion of the solar cell panel unit 100 positioned at an uppermost side and a lower end portion of the solar cell panel unit 100 positioned at a lowermost side.

In particular, the first and second protrusions 125 and 126 of the blade frame may be insertion-mounted in the third and fourth grooves of the guide slit member mounted on the lower frame.

In addition, the outer frame 600 may include an external connector 680 for outputting electricity output through the connector part 70 to an external unit.

The external connector 680 may be fixedly mounted, for example, on the side frame and provided to be electrically connected to the connector part 70.

In particular, the external connector 680 may be provided at each of an upper end portion and a lower end portion of the outer frame to be electrically connected to the solar cell module 10 positioned at the uppermost side and the solar cell module 10 positioned at the lowermost side.

In addition, in one or more solar cell modules 10, since two adjacent solar cell modules 10 are connected in series by the connector part 70, a final electrode may electrically connect the solar cell module 10 positioned at the uppermost side and the solar cell module 10 positioned at the lowermost side to obtain electricity through the external connector 680.

FIGS. 38 and 39 show perspective views illustrating the connector part 70 according to the second embodiment of the present invention.

Referring to FIGS. 38 and 39, the mounting member 730 includes a fifth mounting part 732 provided to be insertion-mounted in the fifth hollow portion 341 of the rotation member 350 of the second cap 30.

A second through-hole 731 may be formed in a central portion of the fifth mounting part 732, and one pair of first fixing pieces 7321 provided to be inserted into and fixedly caught in the first fixing portion 352 may be provided at both sides of the fifth mounting part 732 with the second through-hole 731 interposed therebetween.

Accordingly, a fixing groove (not shown) may be formed inside the first fixing portion 352 such that the one pair of first fixing pieces 7321 are fixedly caught therein.

In addition, the fifth mounting part 732 includes a third O-ring mounting portion 7322 which is recessed inward in a circumferential direction thereof to be inserted into the first fixing portion 352 and to improve a sealing force between the second cap 30 and the mounting member 730.

Accordingly, a third O-ring O3 is mounted on the third O-ring mounting portion 7322 and fit-coupled inside the first fixing portion 352 of the second cap 30, thereby improving a sealing force.

In addition, the mounting member 730 includes a sealing mounting part 760 which is connected to fluidly communicate with the second through-hole 731 of the fifth mounting part 732 and into which the sealing portion 722 of the third electrode terminal 710 is inserted.

The third electrode terminal 710 and at least a partial area of the connection portion 720 connected thereto may pass through the sealing mounting part 760 to be insertion-mounted in the second through-hole 731 inside the fifth mounting part 732.

In a state in which the third electrode terminal 710 is mounted inside the fifth mounting part 732, the sealing portion 722 of the third electrode terminal is inserted into the sealing mounting part 760, thereby preventing the penetration of moisture into the mounting member 730.

The connection portion 720 may electrically connect the one pair of third electrode terminals to electrically connect two adjacent solar cell modules 10.

When the connector part 70 is mounted on the second cap, the fifth mounting part 732 may be fixedly inserted into the fifth hollow portion 341 of the second cap, and the fifth terminal portion 3102 of the second electrode terminal 310 exposed to the fifth hollow portion 341 may be inserted into the certain second space S2 inside the sixth terminal portion 711 of the third electrode terminal positioned inside the fifth mounting part 732 so that the second electrode terminal and the third electrode terminal may be electrically connected.

In this case, the second O-ring O2 may be fit-coupled to the fifth mounting part 732.

In addition, the connector part 70 includes the one pair of protruding bars 739 provided to rotate the solar cell module 10 at a certain angle.

The one pair of protruding bars 739 are provided to protrude outward from a first surface 7301 of the mounting member 730 and may be positioned apart from each other by a certain interval so as to face each other with the fifth mounting part 732 interposed therebetween.

FIG. 40 shows views illustrating a sequence in which the solar cell module 10 is assembled (mounted) according to the second embodiment of the present invention.

First, in a state in which the first electrode terminal 270 is fixedly inserted into the first terminal fixing portion 221 provided in the first cap 200, the first gasket 113 is mounted in the first insertion groove 220 of the first cap 200.

As described above, in a state in which the first electrode terminal is mounted in the first cap 200, the first cap 200 is mounted on the solar cell panel unit 100, and the screw portion 2430 is allowed to pass through the second through-hole 243 formed in the first cap and is inserted into the screw fixing portion 2431 provided in the blade frame 120 to firmly fix the first cap 200 to the solar cell panel unit 100, thereby completing the assembly of the solar cell module 10.

FIG. 41 shows views illustrating a sequence in which the terminal housing and the injection-molded second electrode terminal are assembled (mounted) in the second cap 30 according to the second embodiment of the present invention.

The terminal housing and the injection-molded second electrode terminal are fixedly inserted into the second terminal fixing portion 330 provided in the second cap 30.

After that, although not shown, the fixing member 400 is mounted to the rotation member 350 of the second cap 30 in which the second electrode terminal is mounted so that the rotation member 350 is mounted in the frame through-hole 510 of the inner frame 500.

Here, after the fixing member 400 is mounted in the frame through-hole 510 of the inner frame 500, the second cap 30 may be insertion-mounted in the fixing member through-hole 420 of the fixing member 400.

Next, FIG. 42 shows views illustrating a sequence in which the connector part 70 is assembled according to the second embodiment of the present invention.

The third electrode terminals electrically connected to the connection portion 720 are inserted into the second through-holes 731 inside the one pair of mounting members 70.

FIGS. 43 and 44 are views for describing a sequence in which the solar cell module 10 is mounted according to the second embodiment of the present invention. FIG. 45 is a view illustrating a state in which the solar cell module is mounted on the second cap and the connector part is mounted on the second cap according to the second embodiment of the present invention. FIG. 46 is a view illustrating a state in which a solar cell louver assembly is connected in series according to the second embodiment of the present invention.

Referring to FIGS. 43 to 46, the second cap 30 may be in a state of being rotated at a certain angle in a state of being mounted on the inner frame 500.

In the above state, the solar cell module 10 may be slide-insertion-mounted on the second cap 30 downward.

That is, the first electrode terminal 270 and the second electrode terminal 310 may be provided to be inserted in the length direction of the inner frame.

In a state in which the solar cell module is mounted on the second cap as described above, the connector part 70 may be mounted to the rotation member of the second cap.

The connector part 70 of the present invention is a component for connecting the solar cell modules 10 in series, and an arrangement of the connector part 70 for connecting the solar cell modules 10 in series is as follows.

Referring to FIGS. 18, 35, and 43 to 46, for convenience of description, when the first solar cell module 11 and the second solar cell module 12 are alternately disposed in a vertical direction of the frame unit, the first solar cell module 11 disposed under the second solar cell module 12 may be referred to as a third solar cell module, and the second solar cell module disposed under the third solar cell module may be referred to as a fourth solar cell module.

In this case, based on a direction from the top to the bottom, a connection of a right end portion and a left end portion of the first to fourth solar cell modules will be described.

For example, in order for a plurality of solar cell modules 10 and 10' to be electrically connected to each other and connected in series, the connector part 70 is disposed at the right end portions of the first solar cell module 11 and the second solar cell module 12 to electrically connect the right end portions of the first and second solar cell modules.

In this case, the connector part 70 is disposed at left end portions of the second solar cell module 12 and another first solar cell module (third solar cell module 11') positioned under the second solar cell module to electrically connect the left end portions of the second solar cell module 12 and the third solar cell module 11'.

In addition, the connector part 70 is disposed at right end portions of the third solar cell module 11' and a fourth solar cell module 12' to electrically connect the right end portions of the third and fourth solar cell modules.

Such a configuration is repeated to install the connector parts, thereby electrically connecting the plurality of solar cell modules in series.

That is, the connector parts 70 may be alternatively connected to the left end portion and the right end portion for serial connection.

Since such connection can be made in the space between the inner frame and the outer frame, electrical wires are not exposed to the outside.

In addition, since the louver assembly of the present invention can be assembled in the same manner as in a conventional louver window, assembly is easier.

In addition, the louver assembly can serve as a louver window, and concurrently, the series-connected solar cell panels can generate electricity.

As described above, according to the present invention, in order to solve a problem in that, in a conventional louver assembly, productivity is lowered due to electrically connected electrode terminals being produced through insert injection molding, a structure of a first cap is provided such that a first electrode terminal is detachably assembled inside the first cap, a structure of a second cap is provided such that a terminal housing and an insert injection-molded second electrode terminal are detachably assembled inside the second cap, and a third electrode terminal is provided to be detachably assembled in a connector part, thereby lowering the difficulty of insert injection molding to improve productivity.

In particular, a first gasket, an O-ring, and a sealing portion are used to improve a sealing force at portions to which electrode terminals are electrically connected, thereby further improving waterproof performance.

The invention claimed is:

1. A solar cell louver assembly comprising:
a plurality of solar cell modules which each include a solar cell panel unit including a first terminal provided at a first end portion thereof and a second terminal provided at a second end portion thereof, a pair of first electrode terminals, one of the pair of first electrode terminals being electrically connected to the first terminal and the other of the pair of the first electrode terminals being electrically connected to the second terminal, and a pair of first caps to surround the first electrode terminals, one of the pair of first caps being mounted on the first end portion of the solar cell panel unit and the other of the pair of first caps being mounted on the second end portion of the solar cell panel unit;
a plurality of second caps each including a second electrode terminal electrically connected to a respective one of the first electrode terminals;
a frame unit provided such that each of the plurality of second caps is rotatably mounted in a length direction; and
a plurality of connector parts for connecting the plurality of solar cell modules together in series;
wherein, the plurality of solar cell modules are arranged adjacently along the length direction within the frame unit,
wherein, in a state that the first and second end portions of each solar cell module are mounted on respective ones of the plurality of second caps mounted within the frame unit,
wherein, the connector parts each include a pair of third electrode terminals configured to electrically connect respective second electrode terminals of respective second caps mounted on two solar cell modules adjacent to each other along the length direction of the frame unit,
wherein, each of the first caps has a first surface facing the solar cell panel unit and a second surface in a direction opposite to the first surface, has a first insertion groove recessed inward from the first surface toward the second surface, into which at least a partial area of the solar cell panel unit is inserted.

2. The solar cell louver assembly of claim 1, wherein:
in a state in which one of the first caps is mounted on a respective one of the plurality of the second caps, the respective second electrode terminal is provided in contact with the respective first electrode terminal; and
in a state in which one of the connector parts is mounted on a respective pair of the second caps, the third electrode terminals are provided in contact with the respective second electrode terminals.

3. The solar cell louver assembly of claim 2, wherein:
one terminal of the first and second electrode terminals is provided with a space into which the other terminal thereof is inserted; and
when one of the first caps is mounted on a respective one of the plurality of second caps, one terminal of the first and second electrode terminals is inserted into the other terminal thereof.

4. The solar cell louver assembly of claim 3, wherein:
each first electrode terminal includes a plurality of first electrode rods forming a space into which the respective second electrode terminal is inserted;
at least one of the plurality of first electrode rods is bent one or more times; and
the respective second electrode terminal is provided in contact with a bent portion of the at least one of the plurality of first electrode rods or to be inserted into the space between bent portions of the at least one of the plurality of first electrode rods.

5. The solar cell louver assembly of claim 4, wherein each first electrode terminal includes a first connection portion electrically connected to a solar cell panel unit and a second connection portion in contact with a bypass diode.

6. The solar cell louver assembly of claim 5, wherein the plurality of first electrode rods, the first connection portion, and the second connection portion are formed integrally.

7. The solar cell louver assembly of claim 3, wherein the first electrode terminal and the second electrode terminal are provided to be inserted in a length direction of an inner frame.

8. The solar cell louver assembly of claim 2, wherein:
one terminal of the second and third electrode terminals is provided with a space into which the other terminal thereof is inserted; and
when one of the connector parts is mounted on a respective pair of the plurality of second caps, one terminal of the second and third electrode terminals is inserted into the other terminal thereof.

9. The solar cell louver assembly of claim 8, wherein:
each second electrode terminal includes a plurality of second electrode rods forming a space into which the respective third electrode terminal is inserted;
at least one of the plurality of second electrode rods is bent one or more times; and
the respective third electrode terminal is provided in contact with a bent portion of the at least one of the plurality of second electrode rods or to be inserted into the space between the bent portions of the at least one of the plurality of second electrode rods.

10. The solar cell louver assembly of claim 9, wherein:
the frame unit includes an inner frame on which each of the plurality of second caps is rotatably mounted in the length direction and an outer frame surrounding the inner frame; and
when each of the second caps is mounted on the inner frame, the respective plurality of second electrode rods are provided such that at least partial areas thereof are exposed at a space between the inner frame and the outer frame.

11. The solar cell louver assembly of claim 2, wherein each connector part includes:
a connection member configured to surround each of the respective third electrode terminals; and
one pair of mounting members connected to the connection member, positioned at vertical end portions of the third electrode terminals to expose the third electrode terminals to the outside, and provided to be mounted in the second cap.

12. The solar cell louver assembly of claim 1, wherein:
each of the first caps has a first coupling part provided on the second surface to be connected to a respective one of the plurality of second caps;
a first connection portion and a second connection portion of the first electrode terminal are positioned in the first insertion groove; and a plurality of first electrode rods are provided to be positioned in the first coupling part.

13. The solar cell louver assembly of claim 1, wherein:
each of the second caps includes a first mounting part having a certain space therein such that the respective first cap is slide-insertion-mounted therein and a second mounting part provided in a direction opposite to the first mounting part such that the respective connector part is mounted thereon;
each second electrode terminal includes a third connection portion formed to extend from a plurality of second electrode rods and electrically connected to a first electrode rod of the respective first electrode terminal;
the third connection portion is provided to be exposed outside the first mounting part; and
the plurality of second electrode rods are provided to be positioned in the second mounting part.

14. The solar cell louver assembly of claim 1, wherein:
each third electrode terminal includes a fourth connection portion electrically connected to a second electrode rod of the respective second electrode terminal and a fifth connection portion formed to extend from the fourth connection portion and configured to electrically connect the two solar cell modules adjacent in a length direction of an inner frame;
the fourth connection portion is exposed to an outside toward a second mounting part; and
the fifth connection portion is provided to be positioned at a side of a connection member.

15. A solar cell louver assembly comprising:
a plurality of solar cell modules which each include a solar cell panel unit including a first terminal provided at a first end portion thereof and a second terminal provided at a second end portion thereof, a pair of first electrode terminals, one of the pair of first electrode terminals being electrically connected to the first terminal and the other of the pair of the first electrode terminals being electrically connected to the second terminal, and a pair of first caps to surround the first electrode terminals, one of the pair of first caps being mounted on the first end portion of the solar cell panel unit and the other of the pair of first caps being mounted on the second end portion of the solar cell panel unit;
a plurality of second caps each including a second electrode terminal electrically connected to a respective one of the first electrode terminals and a terminal housing configured to surround at least a partial area of the second electrode terminal;
a frame unit provided such that each of the plurality of second caps is rotatably mounted in a length direction; and
a plurality of connector parts for connecting each the plurality of solar cell modules together in series;
wherein, the plurality of solar cell modules are arranged adjacently along the length direction within the frame unit,
wherein, in a state that the first and second end portions of each solar cell module are mounted on one respective ones of the plurality of second caps mounted within the frame unit,
wherein, the connector parts each include a pair of third electrode terminals configured to electrically connect respective second electrode terminals of respective second caps mounted on two solar cell modules adjacent to each other along the length direction of the frame unit,
wherein:
each first electrode terminal is detachably mounted inside the respective first cap; and
each second electrode terminal is formed integrally with the respective terminal housing through insert injection molding and is detachably mounted inside the respective second cap,
wherein, each of the first caps has a first surface facing the solar cell panel unit and a second surface in a direction opposite to the first surface, has a first insertion groove recessed inward from the first surface toward the second surface, into which at least a partial area of the solar cell panel unit is inserted.

16. The solar cell louver assembly of claim 15, wherein:
in a state in which one of the first caps is mounted on a respective one of the plurality of second caps, the respective second electrode terminal is provided in contact with the respective first electrode terminal; and
in a state in which one of the connector parts is mounted on a respective pair of the plurality of second caps, the third electrode terminals are provided in contact with the respective second electrode terminal.

17. The solar cell louver assembly of claim 16, wherein:
one terminal of the first and second electrode terminals is provided with a space into which the other terminal thereof is inserted; and
when the first cap is mounted on the second cap, one terminal of the first and second electrode terminals is inserted into the other terminal thereof.

18. The solar cell louver assembly of claim 16, wherein:
one terminal of the second and third electrode terminals is provided with a space into which the other terminal thereof is inserted; and
when one of the connector parts is mounted on a respective pair of the plurality of second caps, one terminal of the second and third electrode terminals is inserted into the other terminal thereof.

19. The solar cell louver assembly of claim 15, wherein:
each of the first caps includes a first mounting part mounted on the respective solar cell panel unit and a second mounting part mounted on the respective second cap in a direction opposite to the first mounting part;
each solar cell panel unit includes a solar cell panel including the one pair of first and second terminal portions and a blade frame on which the solar cell panel is mounted;
the first mounting part has a first insertion groove into which at least a partial area of the respective solar cell panel is inserted; and
the first insertion groove includes a first terminal fixing portion provided such that the respective first electrode terminal is detachably inserted and fixed therein and a first terminal insertion portion is provided to connect the first terminal fixing portion and the second mounting part to communicate with each other.

20. The solar cell louver assembly of claim 19, wherein each of the first caps further includes a first gasket that is detachably inserted into the first insertion groove to shield at least a partial area of the first insertion groove and is provided to surround and seal one end portion of the respective solar cell panel.

21. The solar cell louver assembly of claim 19, wherein, in a state in which each first electrode terminal is fixedly inserted into the respective first terminal fixing portion, at least a partial area of the first electrode terminal is positioned to be exposed outside the first mounting part, and the remaining partial area of the first electrode terminal is provided to be positioned in a space inside the second mounting part through the first terminal insertion portion.

22. The solar cell louver assembly of claim 19, wherein:
each first electrode terminal includes a first terminal portion electrically connected to the respective terminal portion of the solar cell panel, a second terminal portion formed apart from the first terminal portion by a certain distance and electrically connected to the respective second electrode terminal, and a third terminal portion configured to connect the first terminal portion and the second terminal portion; and
in a state in which the first electrode terminal is inserted into the respective first terminal fixing portion, the first terminal portion is positioned to be exposed outside the first terminal fixing portion, and the second terminal portion is positioned to be exposed outside the second mounting part.

23. The solar cell louver assembly of claim 15, wherein:
each of the second caps includes a third mounting part having a certain space therein such that the first cap is slide-insertion-mounted therein and a fourth mounting part provided in a direction opposite to the third mounting part such that the connector part is mounted thereon;
the third mounting part includes a second terminal fixing portion provided such that the second electrode terminal formed integrally with the terminal housing is detachably inserted and fixed therein; and
the fourth mounting part includes a rotation member which communicates with the third mounting part and is provided such that at least a partial area of the second electrode terminal fixed to the second terminal fixing portion is positioned therein.

24. The solar cell louver assembly of claim 23, wherein, in a state in which each second electrode terminal is fixedly inserted into the respective second terminal fixing portion, at least a partial area of the second electrode terminal is positioned to be exposed to an outside, and the remaining partial area of the second electrode terminal is positioned to be exposed at a space inside the rotation member.

25. The solar cell louver assembly of claim 23, wherein the second electrode terminal formed integrally with the terminal housing through the insert injection molding includes a fourth terminal portion of which at least a partial area is exposed to an outside toward a second terminal portion of the respective first electrode terminal and a fifth terminal portion which is formed to extend from the fourth terminal portion and of which at least a partial area is exposed to an outside toward the respective third electrode terminal; and
in a state in which the second electrode terminal is fixedly inserted into the second terminal fixing portion, the fourth terminal portion is positioned to be exposed outside the third mounting part, and the fifth terminal portion is positioned to be exposed outside the fourth mounting part.

26. The solar cell louver assembly of claim 15, wherein:
each connector part includes one pair of mounting members configured to surround the respective third electrode terminals and provided to be mounted in the respective second cap;
each mounting member includes a fifth mounting part provided such that at least a partial area thereof is inserted into a rotation member of the second cap; and
the third electrode terminal includes a connection portion inserted into each of the fifth mounting parts to electrically connect the third electrode terminals so as to electrically connect two adjacent solar cell modules.

27. The solar cell louver assembly of claim 26, wherein:
each third electrode terminal includes a sixth terminal portion electrically connected to a fifth terminal portion and a seventh terminal portion formed to extend from the sixth terminal portion and electrically connected to the respective connection portion; and
the third electrode terminal is positioned to be exposed at a space inside the fifth mounting part.

28. The solar cell louver assembly of claim 26, wherein, in a state in which each second cap in which the respective second electrode terminal is assembled is mounted on an inner frame, the respective first electrode terminal is provided to be inserted in a length direction of the inner frame, and the respective third electrode terminal is provided to be inserted in a direction perpendicular to the length direction of the inner frame.

29. The solar cell louver assembly of claim 15, wherein:
the frame unit includes an inner frame and an outer frame surrounding the inner frame; and
when the plurality of second caps are mounted on the inner frame, the respective connector parts are provided to be disposed in a space between the inner frame and the outer frame.

* * * * *